(12) United States Patent
Liu et al.

(10) Patent No.: US 12,544,481 B2
(45) Date of Patent: Feb. 10, 2026

(54) WATER-BASED TISSUE ADHESIVES

(71) Applicant: ALEO BME, Inc., State College, PA (US)

(72) Inventors: Chao Liu, State College, PA (US); Jinshan Guo, State College, PA (US); Chen Chen, State College, PA (US); John Jay Round, State College, PA (US); Wei Song, State College, PA (US)

(73) Assignee: ALEO BME, Inc., State College, PA (US)

( * ) Notice: Subject to any disclaimer, the term of this patent is extended or adjusted under 35 U.S.C. 154(b) by 1214 days.

(21) Appl. No.: 16/652,944

(22) PCT Filed: Oct. 1, 2018

(86) PCT No.: PCT/US2018/053702
§ 371 (c)(1),
(2) Date: Apr. 1, 2020

(87) PCT Pub. No.: WO2019/070561
PCT Pub. Date: Apr. 11, 2019

(65) Prior Publication Data
US 2020/0254136 A1    Aug. 13, 2020

Related U.S. Application Data

(60) Provisional application No. 62/664,739, filed on Apr. 30, 2018, provisional application No. 62/566,730, filed on Oct. 2, 2017.

(51) Int. Cl.
*C09J 201/00* (2006.01)
*A61L 15/58* (2006.01)

(52) U.S. Cl.
CPC ........... *A61L 15/585* (2013.01); *C09J 201/00* (2013.01)

(58) Field of Classification Search
None
See application file for complete search history.

(56) References Cited

U.S. PATENT DOCUMENTS

| | | | | |
|---|---|---|---|---|
| 2003/0235685 A1* | 12/2003 | Lofton | ................... | B82Y 30/00 428/327 |
| 2005/0074482 A1* | 4/2005 | Goldman | ................ | A61L 15/58 424/443 |
| 2009/0247651 A1 | 10/2009 | Kapiamba et al. | | |
| 2010/0055370 A1* | 3/2010 | Diehl | ..................... | C09J 133/02 524/502 |
| 2010/0266649 A1* | 10/2010 | Maitra | ..................... | A61K 8/19 424/59 |
| 2012/0309870 A1* | 12/2012 | Thunhorst | ................ | C09D 7/68 977/773 |

FOREIGN PATENT DOCUMENTS

| WO | 03049637 A2 | 6/2003 |
|---|---|---|
| WO | 2006021054 A1 | 3/2006 |

OTHER PUBLICATIONS

Gogoi et al.; "Biobased Biodegradable Waterborne Hyperbranched Polyurethane as an Ecofriendly Sustainable Material," 2014, ACS; ACS Sustainable Chemistry & Engineering, vol. 2, pp. 2730-2738. (Year: 2014).*
Zhou et al.; "Various nanoparticle morphologies and surface properties of waterborne polyurethane contolled by water," 2016, NPG; Scientific Reports, vol. 6, No. 34574, pp. 1-13. (Year: 2016).*
Liebler et al.; "Organ Repair, Hemostasis, and In Vivo Bonding of Medical Devices by Aqueous Solution of Nanoparticles," 2014, Wiley; Angewandte Chemie International Edition vol. 53, No. 25, pp. 6369-6373. (Year: 2014).*
Sun et al.; "Facile Preparation of Mussel-Inspired Polyurethane Hydrogel and Its Rapid Curing Behavior," 2014, ACS; Applied Materials & Interfaces, vol. 6, pp. 12495-12504. (Year: 2014).*
Abouelmagd et al.; "Tannic Acid-Mediated Surface Functionalization of Polymeric Nanoparticles," 2016, Acs; Acs Biomaterials Science & Engineering, vol. 2, pp. 2294-2303. (Year: 2016).*
Honakar, Hengameh; "Waterborne polyurethanes: A review," first published online May 16, 2017, Taylor & Francis; Journal of Dispersion Science and Technology, vol. 39, No. 4, pp. 507-516. (Year: 2017).*
Li et al.; "Bioinspired super-strong aqueous sythetic tissue adhesives," 2022, Elsevier; Matter, vol. 5, Issue 3, pp. 933-956. (Year : 2022).*
International Search Report, Dec. 20, 2018, Entire document.

\* cited by examiner

*Primary Examiner* — Tigabu Kassa
*Assistant Examiner* — Ivan A Greene
(74) *Attorney, Agent, or Firm* — Maynard Nexsen PC; John P. Zimmer

(57) ABSTRACT

An adhesive composition described herein comprises an aqueous solvent; and a population of first nanoparticles dispersed in the aqueous solvent, the first nanoparticles comprising a negative or positive charge, and an average size in three dimensions of 1 nm to 1000 nm. In some embodiments, a population of second nanoparticles is dispersed in the aqueous solvent, the second nanoparticles comprises a negative or positive charge opposite the charge of the population of first nanoparticles. In some embodiments, the population of first nanoparticles comprise an average first size in three dimensions, and the population of second nanoparticles comprise an average second size in three dimensions that is different from the average first size of the first nanoparticles.

20 Claims, 22 Drawing Sheets

| A \ B | ⊕ (circle with 4 ⊕) | ⊕—⊕ (chain with 2 ⊕) | F1⊕ (circle with 4 ⊕/F1) | F1⊕ (chain with F1/⊕) |
|---|---|---|---|---|
| ⊖ (circle with 4 ⊖) | A, B = WPND | A = chitosan (CS), poly(L-lysine) (PLL), ε-poly-lysine (ε-PL), polyethylenimine (PEI), polyallylamine et.al. B = WPND | A, B = WPND; F1 = catechol groups, alkyne, -COC≡CH, -COCR=CH₂, -N₃, -Si-H, double bond, et. al. | A = CS, PLL, ε-PL, PEI, polyallylamine et.al. B = WPND; F1 = catechol groups, alkyne, -COC≡CH, -COCR=CH₂, -Si-H, -N₃, double bond, et. al. |
| ⊖—⊖ (chain with 3 ⊖) | A = WPND; B = ionized citrate-based polymer (ICBP), carboxymethyl cellulose (CMC), carboxymethyl chitosan (CMCS), carboxylmethyl starch (CMS), sodium alginate (SA), chondroitin sulfate, succinyl gelatin (SG), et. al. | A = CS, PLL, ε-PL, PEI, polyallylamine et.al. B = ICBP, CMC, CMCS, CMS, SA, chondroitin sulfate, succinyl gelatin et. al. | A = WPND; B = ICBP, CMC, CMCS, CMS, SA, chondroitin sulfate, SG, et. al. F1 = catechol groups, alkyne, -COC≡CH, -N₃, -COCR=CH₂, -Si-H, double bond, et. al. | A = CS, PLL, ε-PL, PEI, polyallylamine et.al. B = ICBP, CMC, CMCS, CMS, SA, chondroitin sulfate, SG, et. al. F1 = catechol groups, alkyne, -COC≡CH, -N₃, -COCR=CH₂, -Si-H, double bond, et. al. |
| F2⊖ (circle with 4 ⊖/F2) | A, B = WPND; F1, F2 = catechol groups, alkyne, -COC≡CH, -N₃, -COCR=CH₂, -Si-H, double bond, et. al. F1 and F2 are pairable. | A = CS, PLL, ε-PL, PEI, polyallylamine et.al. B = WPND; F2 = catechol groups, alkyne, -COC≡CH, -N₃, -COCR=CH₂, -Si-H, double bond, et. al. | A, B = WPND; F1, F2 = catechol groups, alkyne, -COC≡CH, -N₃, -COCR=CH₂, -Si-H, double bond, et. al. F1 and F2 are pairable. | A = CS, PLL, ε-PL, PEI, polyallylamine et.al. B = WPND; F1, F2 = catechol groups, alkyne, -COC≡CH, -N₃, -COCR=CH₂, -Si-H double bond, et. al. F1 and F2 are pairable. |
| F2⊖ (chain with F2/⊖) | A = WPND; B = ICBP, CMC, CMCS, CMS, SA, chondroitin sulfate, succinyl gelatin, et. al. F2 = catechol groups, alkyne, -COC≡CH, -N₃, -COCR=CH₂, -Si-H, double bond, et. al. | A = CS, PLL, ε-PL, PEI, polyallylamine et.al. B = ICBP, CMC, CMCS, CMS, SA, chondroitin sulfate, succinyl gelatin, et. al. F2 = catechol, alkyne, -COC≡CH, -N₃, -COCR=CH₂, -Si-H, double bond, et. al. | A = WPND; B = ICBP, CMC, CMCS, CMS, SA, chondroitin sulfate, succinyl gelatin, et. al. F1, F2 = catechol, alkyne, -COC≡CH, -N₃, -COCR=CH₂, -Si-H, double bond, et. al. F1 and F2 are pairable | A = CS, PLL, ε-PL, PEI, polyallylamine et.al. B = ICBP, CMC, CMCS, CMS, SA, chondroitin sulfate, succinyl gelatin, et. al. F1, F2 = catechol, alkyne, -COC≡CH, -N₃, -COCR=CH₂, -Si-H, double bond, et. al. F1 and F2 are pairable |

FIG. 3

| | Crosslinking mechanisms | Tissue physical bnding | Tissue chemical bonding |
|---|---|---|---|
| No functional groups | Ion interaction | Mechanical interlocking | No |
| F1 or F2 = catechol group | Ion interaction + catechol group oxidation & intermoclecuar reaction | Mechanical interlocking | Mussel-/tannin-inspired tissue bonding |
| F1 or F2 = normal double bond, such as allyl | Ion interaction + UV/redox crosslinking | Mechanical interlocking | No |
| F1 or F2 = -COCR=CH$_2$ | Ion interaction + UV/redox crosslinking | Mechanical interlocking | Micheal addition |
| F1/F2 = -COCR=CH$_2$, the other = -NH$_2$ or -SH | Ion interaction + UV/redox or Mecheal addition | Mechanical interlocking | Micheal addition |
| F1/F2 = alkyne, the other = -N$_3$ | Ion interaction + Click reaction | Mechanical interlocking | No |
| F1/F2 = -COC≡CH, the other = -N$_3$ | Ion interaction + Click reaction | Mechanical interlocking | amino-yne click reacion |
| F1/F2 = -COC≡CH | Ion interaction | Mechanical interlocking | amino-yne click reacion |
| F1/F2 = -Si-H, the other = -COCR=CH$_2$ | Ion interaction + hydrosilylation reaction | Mechanical interlocking | Micheal addition |

FIG. 15

WATER-BASED TISSUE ADHESIVES

CROSS-REFERENCE TO RELATED APPLICATIONS

This application is a U.S. national stage filing under 35 U.S.C. § 371 of International PCT Application No. PCT/US2018/053702, filed Oct. 1, 2018, which claims priority under 35 U.S.C. § 119 to U.S. Provisional Patent Application No. 62/566,730, filed Oct. 2, 2017, and to U.S. Provisional Patent Application No. 62/664,739, filed Apr. 30, 2018, each of which is hereby incorporated by referenced in its entirety.

FIELD

The invention is generally related to water-based adhesives, and, more specifically, to water-based tissue adhesives.

BACKGROUND

Traditional tissue adhesives, especially the adhesives derived from industry-based adhesives, such as cyanoacrylates based (Dermabond®, Indermil®) and polyurethane-based (TissuGlu®) tissue adhesive, often employed harsh chemical reactions that generate risk of tissue injury due to the exothermal property intrinsic to the chemical reaction. Alternatives to the industry-based adhesives have been developed with a focus on milder chemical/physical reactions to cure and to bond to tissue. One such approach has been to explore a nature-inspired strategy in adhesive product development.

For example, the most commonly used tissue adhesive is a biologically-derived fibrin glue (Tisseel®, Evicel®). Fibrin glues mimic the last stage of blood clotting, during which fibrinogen is converted to fibrin clot through a complex coagulation cascade. While fibrin glues are considered the gold standard for dura repair, it has several notable disadvantages. These disadvantages include weak wet tissue adhesion strength, a risk for viral transmission and allergic reactions, and expensive and troublesome production and preparation processes.

Other nature-inspired adhesives include injectable citrate-based bioadhesives (iCMBAs) and antimicrobial iCMBAs inspired from the strong adhesive capabilities of blue mussels. Blue mussels secrete a bioadhesive that uses catechol groups to chemically react with amine, thiol, and hydroxyl groups under basic conditions in water. iCMBAs showed 2.5-13.0 fold stronger aqueous adhesion strength compared to fibrin glue. However, iCMBAs have a relatively slow curing rate (~10 min), low cohesive strength (69-242 KPa), and high swelling ratios (500-3,500%), which can result in a quick decrease of adhesive and cohesive strengths.

Consequently, there is a need for improved nature-inspired tissue adhesives.

SUMMARY

In an aspect, an adhesive composition comprises an aqueous solvent; and a population of first nanoparticles dispersed in the aqueous solvent, the first nanoparticles comprising: a negative or positive charge, and an average size in three dimensions of 1 nm to 1000 nm.

In some embodiments, an adhesive composition described herein can comprise a population of second nanoparticles dispersed in the aqueous solvent, the second nanoparticles differing from the first nanoparticles. A population of second nanoparticles described herein can comprise a negative or positive charge opposite the charge of the population of first nanoparticles.

In some instances, a population of first nanoparticles described herein can comprise an average first size in three dimensions, and a population of second nanoparticles described herein can comprise an average second size in three dimensions that is different from the average first size. An average first size in three dimensions can be in a range of 100 nm to 1000 nm in some cases. An average second size in three dimension can be less than 100 nm in some cases. In some instances, an average first size in three dimensions can be 140 nm to 300 nm, and an average second size in three dimension can be less than 100 nm. In some embodiments, the difference between an average first size and an average second size can be at least 30 nm. In other embodiments, a difference between an average first size and an average second size can be between 30 nm to 900 nm.

In some embodiments described herein, a first nanoparticle and a second nanoparticle can be spherical or substantially spherical. In some cases, a first nanoparticle and a second nanoparticle can be non-spherical in shape, including rod-like, cubical, conical, rectangular, pyramidal, prismatic, and other geometric shapes. In some embodiments, populations of a first nanoparticle and a second nanoparticle described herein can comprise a single average shape, or can comprise two or more different shapes.

In some embodiments, a population of first nanoparticles and a population of second nanoparticles can each have an average zeta potential of −10 mV to −65 mV, or 10 mV to 65 mV. In some instances, a population of first nanoparticles and a population of second nanoparticles described herein each have an average zeta potential of −10 to −65 mV or +10 to +65 mV, or −20 to −60 mV or +20 to +60 mV.

In some embodiments described herein, a first nanoparticle is formed from a polymer. A first nanoparticles described herein can be formed from a polyurethane, a polyester, or a polyacrylate.

A second nanoparticle described herein can be formed from a polymer. In some instances, a second nanoparticle described herein can be formed from a polyurethane, a polyester, or a polyacrylate.

In some embodiments, a first nanoparticle can have a first functional group attached to an exterior surface of the first nanoparticle. A first functional group described herein can comprise a dopamine group, a tannin group, a clickable group, an N-Hydroxysulfosuccinimide group, a maleimide group, an ethyleneically unsaturated group, an aldehyde group, or a hydrosilane group. A clickable group described herein can be an azide group or alkyne group. An ethyleneically unsaturated group described herein can be an allyl group, acrylate group, or methacrylate group.

In some embodiments, a second nanoparticle described herein can have a second functional group attached to an exterior surface of the second nanoparticle. A second functional group can in some cases be selectively reactive with a first functional group attached to an exterior surface of a first nanoparticle. A second functional group described herein can be a dopamine group, a tannin group, a clickable group, an N-Hydroxysulfosuccinimide group, a maleimide group, an ethyleneically unsaturated group, an aldehyde group, or a hydrosilane group. A clickable group described herein can comprise an azide group or alkyne group. An ethyleneically unsaturated group described herein can be an allyl group, acrylate group, or methacrylate group.

In some embodiments described herein, a solids content of the composition can be up to 55% by weight solids, based on the total weight of the composition.

A composition described herein can in some instances have a dynamic viscosity of 10,000 cP or less.

In some instances, an adhesive composition described herein can form a mechanical interlocking system through ionic crosslinking, covalent crosslinking, tissue crosslinking, or any combination thereof.

In some embodiments, an adhesive composition described herein comprises a cosmetically acceptable agent comprising one or more of: a structuring agent, a gelling agent, a filler, an emulsifier, a solid or liquid fatty agent, or any combination thereof. In some instances, the cosmetically acceptable agent comprises a colorant, a pigment, a photoprotective agent, a secondary film-former, a cosmetically active agent or a cosmetic adjuvant, or any combination thereof. The cosmetic adjuvant can be an emollient, a moisturizer, a fiber, a preservative, a chelator, a fragrance, a neutralizing agent, or any combination thereof. The filler can be a polyamide particle, a nylon fiber, a polyethylene powder, a microsphere-based acrylic copolymer, a melamine-formaldehyde resin particle, a urea-formaldehyde resin particle, a poly(tetrafluoroethylene) particle, an ethylene-acrylate copolymer powder, an expanded powder, a starch powder, a silicone resin microbead, or any combination thereof.

In some embodiments, an adhesive composition described herein can be a non-compressed foundation powder or stick, a compressed foundation powder or stick, a cosmetic paste, mascara, lipstick, lip gloss, lip balm, nail polish, or a cosmetic cream.

In some embodiments, adhesive composition described herein can be tissue adhesives for tissue closure, or adhesive to secure meshes or films used in the body, or tissue sealant and hemostatic agents, or other applications, such as drug delivery, layer-by-layer coating, wound dressing, plant seed coating, liquid bandage, 3D printing, endoscopic mucosal resection (EMR), and cosmetic applications. Cosmetic applications can include methods of application of an adhesive composition described herein to the skin, lips, eyes, hair, nails, or teeth of an individual with the purpose to enhance, modify, or otherwise alter an aesthetic quality.

A method of adhering biological materials is described herein in some embodiments, where the method comprises disposing an adhesive composition described herein in between a first surface of a first biological material and a second surface of a second biological material; wherein the adhesive composition adheres the first surface of the first biological material to the second surface of the second biological material.

In some embodiments described herein, a method of adhering a cosmetic composition to keratinous tissue comprises disposing an adhesive composition described herein on one or more keratinous tissue surfaces.

BRIEF DESCRIPTION OF THE FIGURES

The invention will now be described by way of examples, with reference to the accompanying figures, of which:

FIG. 3 is a table listing of exemplary polymeric and nanomeric A and B components, and different combinations of AB formulations for adhesive compositions;

FIG. 15 is a table showing the different crosslinking and tissue bonding mechanisms using different functional groups described in FIG. 3;

DETAILED DESCRIPTION

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of this invention. Numerous modifications and adaptations will be readily apparent to those of ordinary skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

English ivy is known for its ability to climb surfaces and impose adhesive forces so strong that it can tear bricks from walls and wear away building facades. The powerful mechanism through which it is able to accomplish this feat has only been recently elucidated. The plant secretes negatively charged nano-spherical glycoprotein particles that intercalate and aggregate on a target surface. These nanoparticles form a penetrating film that is further strengthened via cross-linking by ion interaction with calcium ions, thus enabling mechanical interlocking between the roots of English ivy and the surface to which it clings.

In some embodiments described herein in more detail, synthetic waterborne polymers, such as waterborne polyurethanes (WPU), polyester dispersions (PED), polyacrylate emulsions (PAE), and other waterborne polymer nano-dispersion (WPND) systems, can possess positive and negative charges, and can provide somewhat analogous functions as the nano-spherical glycoprotein particles secreted by English ivy. For example, ionic crosslinking of these synthetic waterborne polymers can be realized through ion interaction with multivalent counter ions, polymer solutions or another synthetic waterborne polymers with opposite charged ions.

Figure 1:
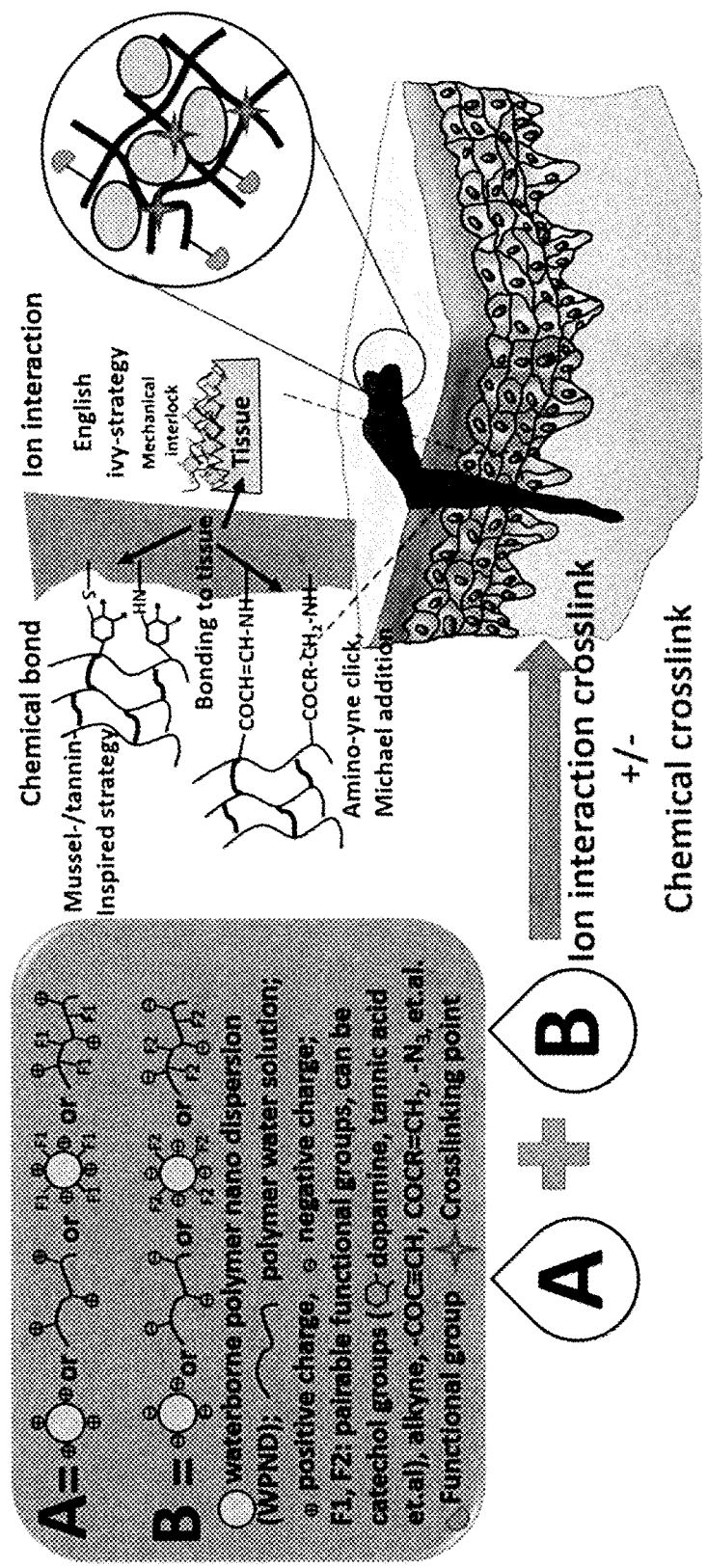
FIG. 1 is an illustrative view a nature-inspired chemical and mechanical tissue adhesive mechanism.

As described in some embodiments herein, ionic crosslinkable AB formulation systems can be formed with one or two or more components composed of WPND, or with two components comprised of different polymer solutions with opposite charges. For example, as shown in FIG. 1, the A and B components of an AB formulation system can mimic the mechanical interlock mechanism of English ivy through ionic crosslinking of the waterborne polymers. This ionic crosslinking of waterborne polymers can in some instances enhance the mechanical strength, adhesion strength, water resistance (reduce water absorption), and/or durability of the formed adhesives. Moreover, being primarily a physical interaction, ionic crosslinking extirpates the negative issues caused by chemical reaction-induced crosslinking, such as toxicity and exothermic problems existing in many currently available tissue adhesives, including cyanoacrylate-based adhesives (Dermabond®, Indermil®, LiquiBand®) and polyurethane-based tissue adhesives (TissuGlu®).

Figure 22A:
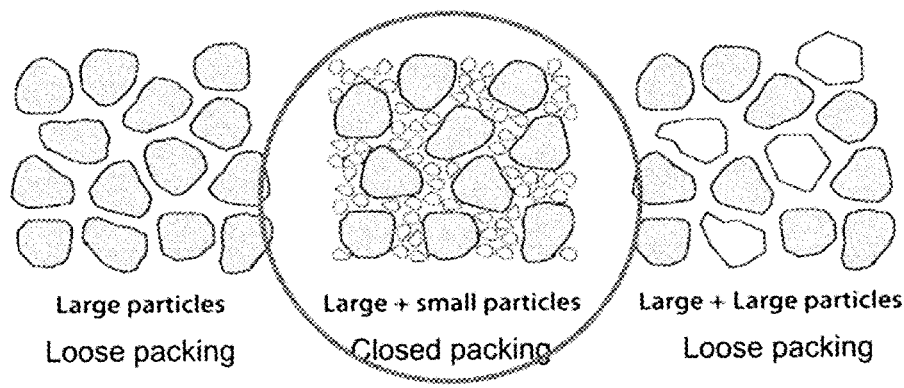
FIG. 22A shows packing densities of mismatched particle sizes.

In some instances, some ionic crosslinkable AB formulation systems described herein can be formed from one, two, or more components comprised of nanoparticles with different charges. Oppositely charged nanoparticles described herein can sometimes form ionic crosslinking that enhances the mechanical strength, adhesion strength, water resistance (reduce water absorption), and/or durability of the formed adhesives. Moreover, in some embodiments, the mechanical properties of the nanoparticles described herein can be enhanced using a bimodal, tri-modal, or multi-modal approach, where the nanoparticles have two or more different average particle sizes that can increase the particle packing density of the nanoparticles. As illustrated in FIG. 22A, by using size-mismatched particle distributions, nanoparticles can be packed to maximize packing density, allowing for increased intercalation and aggregation of the particles on a tissue surface. In some embodiments, oppositely charged waterborne polymers can be used in place of, or in combination with, the oppositely charged nanoparticles, and can exhibit the same or similar desirable adhesion and physical properties.

One shortcoming of the mechanical interlocking English ivy adhesion mechanism is the lack of ability to chemically bond to biological tissues or materials. This can in some instances limit the adhesion strength of the ionic crosslinkable AB formulations when used on biological tissues. In some embodiments described herein, this shortcoming can be reduced or eliminated by functionalizing the nanoparticles or waterborne polymers with certain tissue bonding or crosslinking functional groups. As described in some embodiments herein, blue-mussel or tannin-inspired catechol-containing species or gallotannin species can be introduced into an AB formulation by dopamine or its derivatives, Tannic acid ("TA", a type of plant derived polyphenol), or gallotannin species. The oxidized catechol hydroxyl groups or gallotannin groups can in some cases not only enable the system to form covalent bonds with available nucleophile groups on biological surfaces, such as $-NH_2$, $-SH$, $-OH$, and $-COOH$ groups, but can also trigger intermolecular crosslinking between the nanoparticles or polymers themselves in some cases, rendering improved cohesion properties to the nanoparticle or polymer network, as shown for instance in FIG. 1.

Other chemical reactions or functional groups can also be introduced into the AB formulations, either for chemically reacting with tissue, such as spontaneous amino-yne click reaction (FIG. 2A), Michael addition (FIG. 2B), diol-yne click reaction (FIG. 2C), diol-azide click reaction (FIG. 2D), N-hydroxysuccinimide (NHS) activated carboxyl group, and aldehyde; or for chemical crosslinking of polymer network, such as click reaction (e.g. copper-catalyzed 1,3-dipolar azide-alkyne cycloaddition (CuAAC)), and hydrosilylation reaction; or for bioactive molecules, such as collagen mimetic peptide p15.

The adhesive composition described herein can be used in a variety of tissue adhesive applications, such as wound closure, sealants, and hemostatic agents. Additionally, adhesive compositions described herein can be used to cover psoriasis, a bite or sting, a burn, a sore, a hemorrhoid, an anal sphincter muscle tear, a cut, or a scrape. However, the adhesive compositions are not limited solely to tissue-based applications, but can in some instances also be used in drug delivery, layer-by-layer coatings, wound dressings, plant seed coatings, liquid bandages, 3D printing, endoscopic mucosal resections (EMR), and cosmetic applications.

Accordingly, in some of the embodiments described in more detail herein, exemplary waterborne adhesive compositions overcome one or more of the disadvantages of conventional tissue adhesives through an ionic crosslinking mechanical interlocking mechanism, and in some cases, in combination with reactive surface functionalities.

I. ADHESIVE COMPOSITIONS

I(a). Nanoparticle-Based Adhesive Compositions

In an aspect, an adhesive composition comprises a population of first nanoparticles dispersed in an aqueous solvent. In some embodiments, the adhesive composition comprises a population of second nanoparticles dispersed in the aqueous solvent, the second nanoparticles differing from the first nanoparticles. A first and second nanoparticle described herein can comprise a waterborne polymer nano-dispersion (WPNDs). In some cases, a first and second nanoparticle can be a waterborne polyurethane (WPU), a polyester dispersion (PED), a polyacrylate emulsion (PAE), or other WPND systems not inconsistent with the objectives of this disclosure. A first nanoparticle can be comprised of the same type of material as a second nanoparticle in some instances. In other cases, a first nanoparticle can be comprised of a different material than a second nanoparticle.

A first and/or a second nanoparticle described herein can have an average size in three dimensions of 1 nm to 1000 nm, 1 nm to 900 nm, 1 nm to 800 nm, 1 nm to 700 nm, 1 nm to 600 nm, 1 nm to 500 nm, 1 nm to 400 nm, 1 nm to 300 nm, 1 nm to 200 nm, 70 nm to 1000 nm, 90 min to 1000 nm, 100 nm to 1000 nm, 125 nm to 1000 nm, 150 nm to 1000 nm, 175 nm to 1000 nm, 200 nm to 1000 nm, 225 nm to 1000 nm, 250 nm to 1000 nm, 275 nm to 1000 nm, 300 nm to 1000 nm, 325 nm to 1000 nm, 350 nm to 1000 nm, 375 nm to 1000 nm, 400 nm to 1000 nm, 425 nm to 1000 nm, 450 nm to 1000 nm, 475 nm to 1000 nm, 500 nm to 1000 nm, 550 nm to 1000 nm, 600 nm to 1000 nm, 650 nm to 1000 nm, 700 nm to 1000 nm, 750 nm to 1000 nm, 800 nm to 1000 run, 850 nm to 1000 nm, 900 nm to 1000 nm, 70 nm to 900 nm, 70 nm to 800 nm, 70 nm to 700 nm, 70 nm to 650 nm, 70 nm to 600 nm, 70 nm to 550 nm, 70 nm to 500 nm, 70 nm to 450 nm, 70 nm to 400 nm, 70 nm to 350 nm, 70 nm to 300 nm, 80 nm to 280 nm, 90 nm to 260, 100 nm to 260 nm, 100 nm to 220 nm, 100 nm to 200 nm, 90 nm or more, 100 nm or more, 120 nm or more, 140 nm or more, 160 nm or more, 180 nm or more, 200 nm or more, 220 nm or more, 1 nm to 100 nm, 10 nm to 100 nm, 20 nm to 100 nm, 30 nm to 100 nm, 40 nm to 100 nm, 50 nm to 100 nm, 60 nm to 100 nm, 70 nm to 100 nm, 80 nm to 100 nm, 90 nm to 100 nm, 40 nm to 80 nm, 50 nm to 70 nm, 60 nm to 80 nm, 70 nm to 80 nm, 10 nm or less, 20 nm or less, 40 nm or less, 60 nm or less, 70 nm or less, 80 nm or less, 90 nm or less, 100 nm or less, 110 nm or less, 120 nm or less, 130 nm or less, or 140 nm or less, 1 nm to 90 nm, 1 nm to 80 nm, 1 nm to 70 nm, 1 nm to 60 nm, 1 nm to 50 nm, 1 nm to 40 nm, 1 nm to 30 nm, 1 nm to 20 nm, 1 nm to 10 nm, 50 nm to 300 nm, 100 nm to 250 nm, 100 nm to 225 nm, 250 nm or less, 225 nm or less, 200 nm or less, 175 nm or less, 150 nm or less, 125 nm or less, 100 nm or less, 85 nm or less, 70 nm or less, or 55 nm or less.

In some preferred embodiments, an adhesive composition described herein can comprise a bimodal average particle size distribution of components. For example, in some embodiments, a population of first nanoparticles described herein can comprise an average first size distribution in three dimensions and a population of second nanoparticles described herein can have an average second size distribution in three dimensions that is different from the average first size. In some embodiments, a population of first nanoparticles or a population of second nanoparticles can be bimodal, where approximately half of the population of first nanoparticles or population of second nanoparticles can have an average first size distribution in three dimensions, and the second half can have an average second size distribution in three dimensions that is different from the average first size. An average first size in three dimensions can be 70 nm to 1000 nm, 90 nm to 1000 nm, 100 nm to 1000 nm, 125 nm to 1000 nm, 150 nm to 1000 nm, 175 nm to 1000 nm, 200 nm to 1000 nm, 225 nm to 1000 nm, 250 nm to 1000 nm, 275 nm to 1000 nm, 300 nm to 1000 nm, 325 nm to 1000 nm, 350 nm to 1000 nm, 375 nm to 1000 nm, 400 nm to 1000 nm, 425 nm to 1000 nm, 450 nm to 1000 nm, 475 nm to 1000 nm, 500 nm to 1000 nm, 550 nm to 1000 nm, 600 nm to 1000 nm, 650 nm to 1000 nm, 700 nm to 1000 nm, 750 nm to 1000 nm, 800 nm to 1000 nm, 850 nm to 1000 nm, 900 nm to 1000 nm, 70 nm to 900 nm, 70 nm to 800 nm, 70 nm to 700 nm, 70 nm to 650 nm, 70 nm to 600 nm, 70 nm to 550 nm, 70 nm to 500 nm, 70 nm to 450 nm, 70 nm to 400 nm, 70 nm to 350 nm, 70 nm to 300 nm, 80 nm to 280 nm, 90 nm to 260, 100 nm to 260 nm, 100 nm to 220 nm, 100 nm to 200 nm, 90 nm or more, 100 nm or more, 120 nm or more, 140 nm or more, 160 nm or more, 180 nm or more, 200 nm or more, or 220 nm or more. An average second size in three dimension can be 1 nm to 100 nm, 10 nm to 100 nm, 20 nm to 100 nm, 30 nm to 100 nm, 40 nm to 100 nm, 50 nm to 100 nm, 60 nm to 100 nm, 70 nm to 100 nm, 80 nm to 100 nm, 90 nm to 100 nm, 40 nm to 80 nm, 50 nm to 70 nm, 60 nm to 80 nm, 70 nm to 80 nm, 10 nm or less, 20 nm or less, 40 nm or less, 60 nm or less, 70 nm or less, 80 nm or less, 90 nm or less, 100 nm or less, 110 nm or less, 120 nm or less, 130 nm or less, or 140 nm or less.

In some instances, an average first size distribution in three dimension is in a range of 100 nm to 220 nm, and an average second size distribution in three dimensions is in a range of 50 nm to 100 nm, or less than 100 nm.

In some bimodal average size distributions, an average first size in three dimensions can be greater than an average second size in three dimensions. In some embodiments, the difference between the average first size and the average second size can be at least 30 nm, at least 50 nm, at least 75 nm, at least 100 nm, at least 125 nm, at least 150 nm, at least 175 nm, at least 200 nm, at least 225 nm, at least 250 nm, at least 275 nm, at least 300 nm, at least 400 nm, at least 500 nm, at least 600 nm, at least 700 nm, at least 800 nm, at least 900 nm, between 30 nm and 900 nm, 30 nm and 700 nm, 30 nm and 500 nm, 30 nm and 300 nm, 30 nm and 275 nm, 30 nm and 250 nm, 30 nm and 225 nm, 30 nm and 200 nm, 30 nm and 175 nm, 30 nm and 150 nm, 30 nm and 125 nm, 30 nm and 100 nm, 30 nm and 90 nm, 30 nm and 80 nm, 30 nm and 70 nm, 30 nm and 60 nm, 35 nm to 65 nm, 40 nm to 60 nm, 35 nm to 55 nm, or 40 nm to 50 nm.

In some preferred embodiments, positively charged nanoparticles described herein can have an average first size in three dimensions, and negatively charged nanoparticles described herein can have an average second size in three dimensions, where the average first size is greater than the average second size. In other embodiments, negatively charged nanoparticles described herein can have an average first size in three dimensions, and positively charged nanoparticles described herein can have an average second size in three dimensions where the average first size is greater than the average second size.

Populations of nanoparticles described herein are not limited to single or bimodal average size distributions, but can also comprise a tri-modal, or higher multi-modal average size distributions. In these multi-modal embodiments, plurality of populations of nanoparticles described herein can comprise an average first size, average second size, average third size, and so on, where each average size is different from the other average sizes. An average size in some multi-modal embodiments can comprise one or more of the average first and second sizes previously described herein, and differences between each of the average sizes can be one or more of the differences previously described between the average first size and the average second size.

A nanoparticle described herein can be any shape not inconsistent with the objectives of this disclosure. In some cases, a nanoparticle is spherical or substantially spherical. In other cases, a nanoparticle described herein is non-spherical in shape, such as rod-like, cubical, conical, rectangular, pyramidal, prismatic, and other geometric shapes. Populations of some of the nanoparticles described herein can comprise a single average shape, or can comprise two or more different shapes.

In some embodiments, an adhesive composition described herein can comprise a population of first nanoparticles having a bimodal average particle size distribution, where each of the bimodal first nanoparticles have the same charge. For example, each of the different sized first nanoparticles can have an overall positive or a negative charge. As described in more detail below, a system having bimodal first nanoparticles with the same charge can be applied to a surface, and the two different sized particles can intercalate and aggregate onto the surface of the tissue, and form a mechanical interlocking structure through a covalent crosslinking or a physical crosslinking mechanism.

In some preferred embodiments, an adhesive composition described herein can comprise a population of first nanoparticles described herein having a first charge, and a population of second nanoparticles described herein having a second charge that is opposite of the first charge. In some instances, a population of first nanoparticles can comprise a component A having either a negative or positive charge, and a population of second nanoparticles can comprise a component B having a negative or positive charge opposite opposite that of component A. Taken together, populations of component A and component B described herein can comprise a negative and positive charge that together form an AB formulation. For some embodiments described herein, component A can be a nanoparticle having a first charge, such as a positive charge (e.g. $A^+$), and component B can be a nanoparticle having a second charge different from the first charge, such as a negative charge (e.g. $B^-$). However, the particular charge assigned to A and B can be either charge, such as $A^+B^-$ or $A^-B^+$, so long as each of the A and B components has an opposite charge than the other component.

In some embodiments, component A can have a charge opposite that of component B, such that when components A and B are mixed together, an ionic crosslink(s) is formed between the nanoparticles. As shown in FIG. 1, when an adhesive composition described herein is applied to a tissue surface, nanoparticles comprising components A and B intercalate and aggregate onto the surface of the tissue, and form a mechanical interlocking structure through an ionic crosslinking mechanism.

The charges of a nanoparticle described herein, such as a first nanoparticle, second nanoparticle, both a first and a second nanoparticle, and nanoparticles comprising A and B components can be obtained in any manner not inconsistent with the objectives of this disclosure. FIG. 3 illustrates exemplary variations of negatively and positively charged A and B components, where the circular icons represent nanoparticle-based A and B components and the serpentine lines represent waterborne polymer-based A and B components. These waterborne polymer-based components are discussed in more detail below in Section I(b), but can comprise citrate-based polymers, such as poly(1,8-octanediol citrate) (POC), POC-click, biodegradable photoluminescent polymers (BPLP), injectable mussel-inspired bioadhesive (iCMBA), or other chemical groups, which can be converted into negatively charged polymers by treating the side carboxyl groups derived from citric acid into $—COO^-$ ion, or by introducing citrate molecules or diols with negative charges, and used as either an A component or a B components. The negatively charged citrate-based polymers can have their negative charges further enhanced by using negatively charged diol such as β-Glycerophosphate (β-GP) to react with citric acid and/or other monomers.

Positively charged nanoparticles of the A and B components can be obtained in some instances by reacting citrate-based polymers with a positively chargeable diol such as N-methyldiethanolaimine (MDEA) (see Formula B5 below) and N-Ethyldiethanolamine (see Formula B6 below) with citric acid and/or other monomers. A charged citrate-polymer described herein can be made into nanoparticles used as either an A or a B component.

In some embodiments described herein, a surface of the nanoparticles can be functionalized, where components A and B are functionalized with chemically pairable functional groups. The term "pairable functional groups" means that the two functional groups can react with each other in a selective manner, or are at least compatible to each other. For example, in some cases two pairable functional groups are separately introduced on a first nanoparticle and a second nanoparticle, and when these nanoparticles are in close contact (such as through ionic crosslinking), the two pairable functional groups react with each other to form a covalent crosslink between the first and second nanoparticles. Components A and B with pairable, clickable functional groups, such as the combination of component A with alkyne and component B with azide group, can provide click crosslinking as a secondary crosslinking mechanism to ion interaction crosslinking Click crosslinking can improve the lap shear strength and water resistance of the obtained tissue adhesives (see Example 9). The residual clickable functional groups, alkyne or azide groups, can be used to conjugate functional molecules, such as collagen mimetic peptide p15 or antimicrobial polymers/small molecules, through click reaction to provide biofunctions to the obtained tissue adhesives, which is described in more detail herein.

Figure 4:
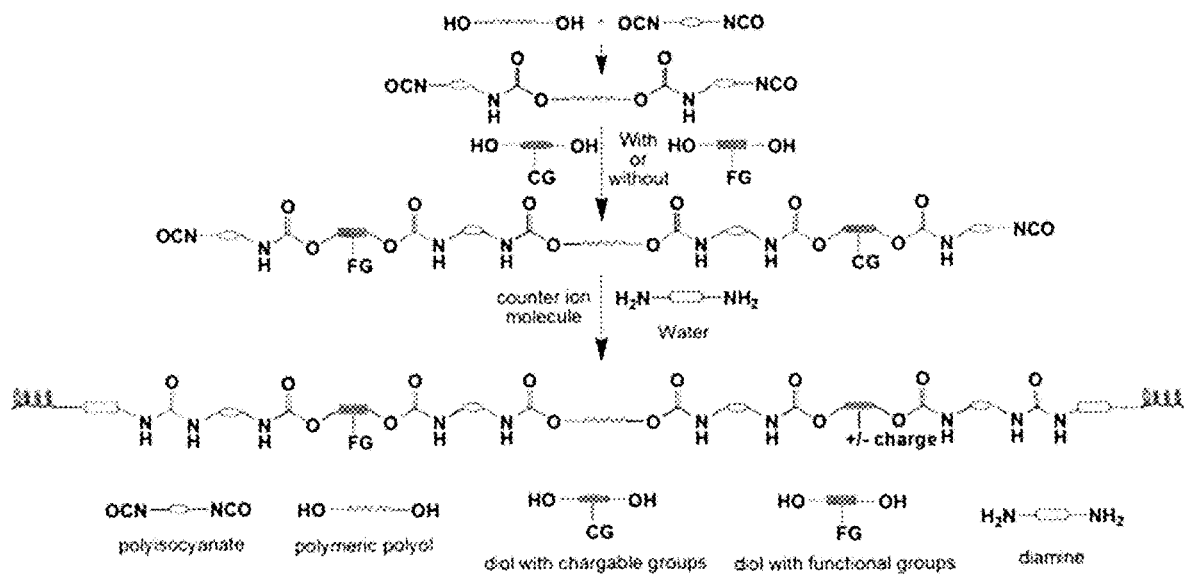
FIG. 4 shows a synthesis of positively or negatively charged waterborne polyurethanes (WPU) with/without functional groups.
Figure 5:
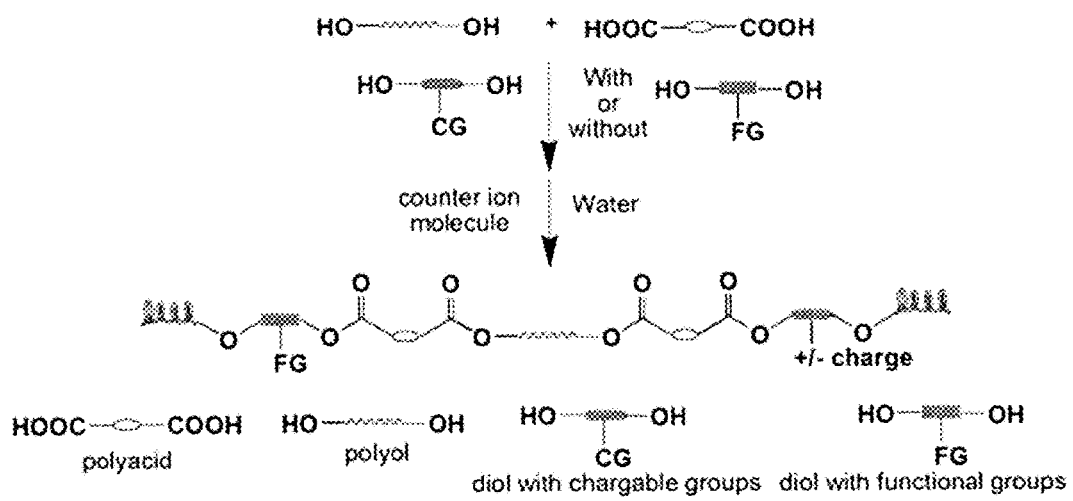
FIG. 5 shows the synthesis of positively or negatively charged polyester dispersions (PED) with/without functional groups.

Syntheses of exemplary first and second nanoparticles with positive or negative charges, with/without functional groups are described in the following figures using WPU, PED, and PAE as non-limiting examples. WPU and PED are synthesized through step-polymerization between polyisocyanates or polyols and polyacids. FIG. 4 shows the synthesis of positively or negatively charged WPU with/without functional groups, and FIG. 5 shows the synthesis of positively or negatively charged PED with/without functional groups. Positive or negative charges can be introduced by including di-/poly-ols or di-/poly-acids with ionizable groups in the polymerization, such as dimethylol propionic acid (DMPA, for WPU or PED with negative charge), N-methyl-diethanolamine (MDEA, for WPU or PED with positive charge), β-glycerophosphate disodium (β-GP), N,N-bis(2-hydroxy-ethyl)-2-aminoethanesulfonic acid (BES), or BES sodium salt. Functional groups can be catechol-containing species, clickable functional groups (such as alkyne, azide, and —COC≡CH), double bond (allyl, —COCR=CH$_2$, R=—H or —CH$_3$), silicon-hydrogen bond (—Si—H), or other functional groups, such as those described in FIG. 3.

Polyisocyanates described herein for WPU synthesis can comprise hexamethylene diisocyanate (HDI), isophorone diisocyanate (IPDI), bis(4-isocyanatocyclohexyl) methane, or other aliphatic polyisocyanates suitable for bio-related applications. Aromatic polyisocyanates may also be used as appropriate. In some embodiments, the polyisocyanates for WPU synthesis can be represented by Formula (A1), Formula (A2), Formula (A3), Formula (A4), and/or Formula (A5). In some instances, HDI and IPDI, either individually or in combination, are used for WPU synthesis.

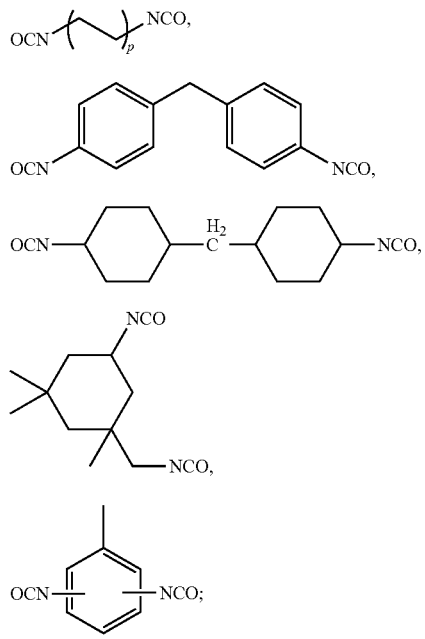

wherein p is an integer ranging from 1 to 10, 1 to 9, 1 to 8, 1 to 7, 1 to 6, 1 to 5, 1 to 4, 1 to 3, 2 to 10, 3 to 10, 4 to 10, 5 to 10, 6 to 10, 7 to 10, 8 to 10, 2 to 8, or 4 to 6.

An amount of a polyisocyanate described herein that is used in WPU synthesis can be 15% to 65% by weight based on the weight of polyurethane solid. In some embodiments, the polyisocyanate is 20% to 60%, 25% to 55%, 30% to 50%, 35% to 45%, 20% to 50%, 20% to 40%, 20% to 30%, 30% to 60%, 40% to 60%, or 50% to 60% by weight based on the weight of polyurethane solid.

In some embodiments described herein, the polyol can be a biodegradable polymeric diol with multiple hydroxyl terminal groups, such as poly(ε-caprolactone) (ε-PCL), poly (lactic acid) (PLA), poly(lactic-co-glycolic acid) (PLGA), poly(butylene succinate) (PBS), poly(butylene adipate) (PBA), poly(ethylene glycol) (PEG), poly(propylene glycol) (PPG), poly(tetramethylene ether glycol) (also named poly (tetrahydrofuran) (poly(THF))), polydimethylsiloxane (PDMS), or small weight average molecular weight polyols, such as octanediol, butanediol, or glycerin. In some embodiments described herein, the polyol is a difunctional compound, although in some instances small amounts of tri-/tetra-functional compounds can be used.

An weight average molecular weight of a polymeric polyol can be 200 to 5000 Da, 200 to 4000 Da, 200 to 3000 Da, 200 to 2000 Da, 200 to 1000 Da, 500 to 3000 Da, 1000 to 2000 Da, 1000 Da or greater, 1500 Da or greater, 2000 Da or greater, 3000 Da or greater, 4000 Da or greater, or 5000 Da or greater.

A polymeric diol described herein can be used in WPU synthesis from about 20% to 80% by weight based on the weight of polyurethane solid. In some embodiments, a polymeric diol can be used in WPU synthesis from about 20% to 70%, 30% to 70%, 40% to 70%, 50% to 70%, 60% to 70%, 20% to 60%, 20% to 50%, 20% to 40%, 20% to 40, or 30% to 60% by weight based on the weight of polyurethane solid.

A polymeric diol described herein can be used in PED synthesis from about 0% to 80% based on the weight of polyester solid. In some embodiments, a polymeric diol can be used in PED synthesis from 0% to 70%, 0% to 60%, 0% to 50%, 0% to 40%, 0% to 30%, 0% to 20%, 0% to 10%, 10% to 70%, 20% to 60%, 30% to 50%, 10% to 60%, 10% to 50%, 10% to 40%, 10% to 30%, 10% to 20%, 15% to 50%, 20% to 50%, 25% to 50%, 35% to 50%, or 40% to 50% based on the weight of polyester solid.

In some embodiments described herein, a polyol can be a low weight average molecular weight diol for use in PED synthesis. Exemplary low weight average molecular weight diols can comprise 1,2-ethylene glycol, diethylene glycol, triethylene glycol, tetraethylene glycol, 1,2-propylene glycol, dipropylene glycol, tripropylene glycol, 1,3-propanediol, 1,3-butanediol, 1,4-butanediol, 1,5-pentane diol, 1,6-hexanediol, neopentyl glycol, 1,4-cyclohexanedimethanol, 1,4-cyclohexanediol, butenediol, butynediol, or 1,8-octanediol. In some instances, the low weight average molecular weight diols are usable individually or in combinations of two or more, such as a combination of 1,4-butanediol, 1,2-propylene glycol, 1,3-butaine diol, 1,5-pentane diol, and 1,6-hexane diol.

A low weight average molecular weight diol used in PED synthesis can be 10% to 50%, 15% to 45%, 15% to 40%, 15% to 35%, 15% to 30%, 15% to 25%, 15% to 20%, 20% to 45%, 25% to 45%, 30% to 45%, 35% to 45%, 40% to 45%, 20% to 40%, 25% to 40%, 30% to 40%, 20% to 35%, 20% to 30%, 15% or less, 20% or less, 25% or less, 30% or less, 35% or less, 40% or less, or 45% or less by weight based on the weight of the polyester solid.

In some embodiments, polyols with chargeable groups for WPU or PED synthesis can be represented by exemplary Formulas B1-B6 as follows:

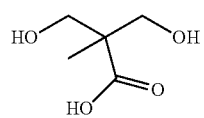

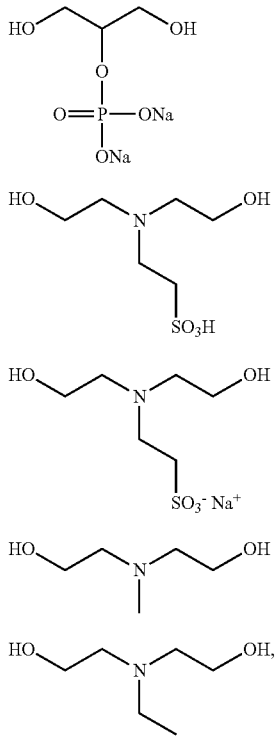

where weight average weight percentage of a chargeable diol described herein for use in WPU or PED can be in a range of 1% to 20.0%, 1% to 15%. 1% to 10%, 1% to 8%, 1%, to 6%, 5% to 20%, 8% to 20%, 10% to 20%, 15% to 20%, or 5% to 15%.

A polyol with an ionizable group described herein can be, when used in WPU synthesis, present in the range of 0.5% to 10% by weight based on the weight of polyurethane solid. In some instances, a polyol used in WPU synthesis can be present in a range of 1% to 5%, 1% to 4%, 1% to 3%, 2% to 8% 3$ to 8%, 4% to 8%, 5% to 8%, or 6% to 8%. A polyol with an ionizable group can be used in PED synthesis from a range of 2% to 40%, 2% to 35%, 2% to 30%, 2% to 25%, 5% to 25%, 2% to 20%, 2% to 15%, 2% to 10%, 10% to 30%, 15% to 30%, 20% to 30%, or 25% to 35% based on the weight of polyester solid.

In some embodiments described herein, polyacids used in PED synthesis comprise natural-derived polyacids, such as lactic acid, citric acid, malic acid, and other non-toxic polyacids, such as succinic acid, adipic acid, and other non-toxic polyacids not inconsistent with the objectives of this disclosure.

A polyacid described herein can be used in PED synthesis in the range of 2% to 65%, 5% to 50%, 10% to 45%, 15% to 40%, 20% to 35%, 20% to 35%, 25% to 30%, 2% to 10% 2% to 15%, 2% to 20%, 2% to 25%, 2% to 30%, 2% to 35%, 2% to 40, 5% to 60% 10% to 60%, 15% to 60%, 20% to 60%, 30% to 60%, 35% to 60%, or 40% to 60% by weight based on the weight of solid polymer.

Nanoparticles described herein can have an average zeta potential of −10 mV to −65 mV, −10 mV to −60 mV, −10 mV to −50 mV, −10 mV to −45 mV, −10 mV to −40 mV, −10 mV to −35 mV, −10 mV to −30 mV, −10 mV to −25 mV, −10 mV to −20 mV, −10 mV to −15 mV, −15 mV to −65 mV, −20 mV to −65 mV, −25 mV to −65 mV, −30 mV to −65 mV, −35 mV to −65 mV, −40 mV to −65 mV, −45 mV to −65 mV, −50 mV to −65 mV, −55 mV to −65 mV, −25 mV to −50 mV, −35 mV to −45 mV, at least −10 mV, at least −25 mV, at least −35 mV, at least −45 mV, at least −55 mV, approximately −30 mV, or less than −30 mV. In some embodiments described herein, nanoparticles can have an average zeta potential of 10 mV to 65 mV, 10 mV to 60 mV, 10 mV to 50 mV, 10 mV to 45 mV, 10 mV to 40 mV, 10 mV to 35 mV, 10 mV to 30 mV, 10 mV to 25 mV, 10 mV to 20 mV, 10 mV to 15 mV, 15 mV to 65 mV, 20 mV to 65 mV, 25 mV to 65 mV, 30 mV to 65 mV, 35 mV to 65 mV, 40 mV to 65 mV, 45 mV to 65 mV, 50 mV to 65 mV, 55 mV to 65 mV, 25 mV to 50 mV, 35 mV to 45 mV, at least 10 mV, at least 25 mV, at least 35 mV, at least 45 mV, at least 55 mV, approximately 30 mV, or more than 30 mV.

In some embodiments, the nanoparticles can be functionalized with a catechol-containing species or gallotannin-based species to introduce a tissue chemical bonding ability that is in addition to, and distinct from, the mechanical interlocking mechanism of the ionic crosslinking. A catechol-containing species described herein can comprise any catechol-containing species not inconsistent with the objectives of this disclosure. In some cases, a catechol-containing species, such dopamine that contains an amino group, or tannic acid that contains multiple (25 in total) phenol groups, can be introduced into WPU or PED through a reaction between isocyanate and —NH$_2$/—OH (for WPU) or the reaction between —COOH and —NH2/—OH (for PED or PEA). For example, in some cases, a catechol-containing species can comprise an alcohol/amine moiety, a carboxylic acid moiety, or a natural-derived compound such as tannic acid or other tannin molecules. Further, in some instances, a catechol-containing species comprises a hydroxyl moiety that is not part of the catechol moiety. In some embodiments, a catechol-containing species comprises dopamine. In other embodiments, a catechol-containing species comprises L-3, 4-dihydroxyphenylalanine (L-DOPA) or D-3,4-dihydroxyphenylalanine (D-DOPA). In other embodiments, a catechol-containing species comprises garlic acid or caffeic acid. In some cases, a catechol-containing species comprises 3, 4-dihydroxyhydrocinnamic acid. In some cases, a catechol-containing species comprises natural-based compound such as tannic acid or other tannin. Moreover, in some embodiments, a catechol-containing species is coupled to the backbone of the WPU or PED polymer through a urea or an amide bond. In other embodiments, a catechol-containing species is coupled to the backbone of the polymer through a urethane or ester bond. A catechol-containing species described herein can be represented by Formula (C):

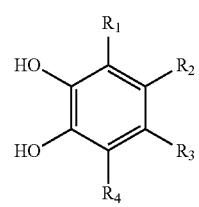

wherein $R_1$ can be OH, and $R_1$, $R_2$, $R_3$, and $R_4$ can independently be —H, —CH$_2$(CH$_2$)$_x$YH, —CH$_2$(CHR$_5$)YH, (Y can be —O— or —NH—) or —CH$_2$(CH$_2$)$_x$COOH; $R_5$ is —COOH or —(CH$_2$)$_y$COOH; one or more groups of $R_1$, $R_2$, $R_3$, and $R_4$ can also be polymer chains; x is an integer ranging from 0 to 10; and y is an integer ranging from 1 to 10.

A gallotannin species described herein can comprise any gallotannin species not inconsistent with the objectives of this disclosure. In some cases, a gallotanin can be introduced into WPU or PED through a reaction between isocyanate and —$NH_2$/—OH (for WPU) or the reaction between —COOH and —NH2/—OH (for PED). Examples of gallotannins suitable for incorporation onto the nanoparticles include tannic acid, gallic acid, flavone, phloroglucinol, pseudo tannins, ellagitannin, pyrogallol ellagic acid, digallic acid, aglycones, glucogallin, digalloyl glucoses, trigalloyl glucoses, tetragalloyl glucoses pentagallolyl glucoses, gallolyl quinic acids, digallolyl quinic acids, trigallolyl quinic acids, galloyl shikimic acids, or any combination thereof.

A catechol-containing or gallotannin-containing molecule used in WPU synthesis can be in the range of 0% to 20%, 0% to 15%, 0% to 10%, 1%, 2%, 3%, 4%, 5%, 6%, 7%, 8%, 9%, 10%, 11%, 12%, 13% 14%, 15%, 16%, 17%, 18%, 19%, 20%, 1% to 10%, 2% to 10% 3% to 10%, 4% to 10%, 5% to 10%, 6% to 10%, 7% to 10%, 8% to 10%, 5% or less, or 10% or less by weight based on the weight of polyurethane solid. A catechol-containing or gallotannin molecule used in PED or PEA synthesis can be in the range of 0% to 70%, 0% to 60%, 0% to 50%, 0% to 40%, 0% to 30%, 0% to 20%, 0% to 10%, 30% or less, 25% or less, 20% or less, 15% or less, 10% or less, 5% or less, 5% to 25%, 5% to 20%, 5% to 15%, 5% to 10%, 10% to 30%, or 20% to 30% by weight based on the weight of solid polymer.

Figure 2A:
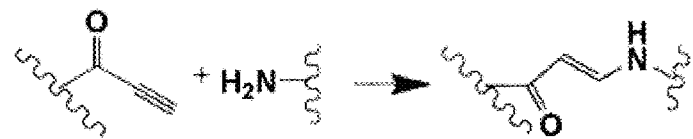
FIG. 2A is a chemical reaction scheme of a spontaneous amino-yne click reaction.
Figure 2B:
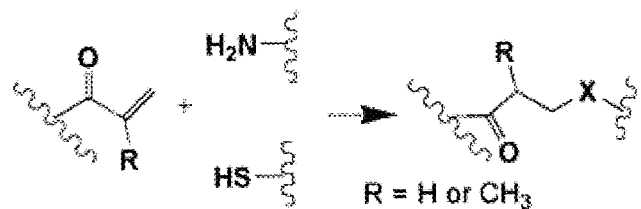
FIG. 2B is a chemical reaction scheme of a Michael addition.

Referring to FIG. 2A, an exemplary method is disclosed for making small molecular clickable diols with alkyne or azide groups suitable for being introduced into waterborne polymer backbones by step-growth polymerization to produce clickable waterborne polyurethanes (WPUs) or polyester dispersions (PEDs) with side-chain alkyne or azide groups. A schematic formula of non-limiting, exemplary functional diols which can be used in functional WPU and PED (including citrate-based polymers) synthesis is shown below with Formulas D1-D9:

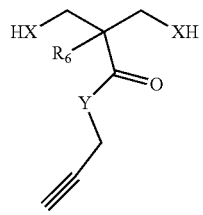
D1

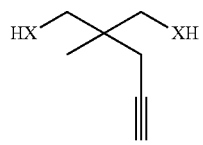
D2

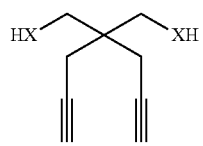
D3

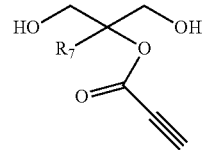
D4

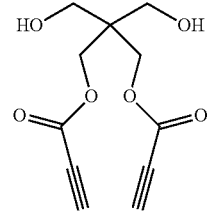
D5

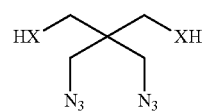
D6

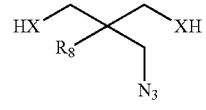
D7

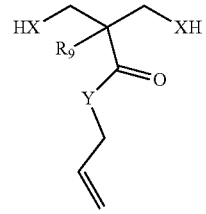
D8

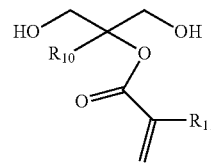
D9 wherein X and Y independently are —O— or —NH—; $R_6$, $R_7$, $R_8$, $R_9$, and $R_{10}$ independently are —$CH_3$ or —$CH_2CH_3$; and $R_{11}$ is —H or —$CH_3$.

A diol with a functional group described herein can be used in WPU synthesis in a range of 0% to 15%, 0% to 10%, 0% to 5%, 2% to 10%, 2% to 8%, 2% to 6%, 2% to 4%, 5% to 10%, 10% or less, 8% or less, 5% or less, 3% or less, 2% or less, or 1% or less by weight based on the weight of polyurethane solid. A diol with functional group described herein can be used in PED synthesis in a range of 0% to 40%, 0% to 30%, 0% to 20%, 0% to 10%, 1% to 20%, 1% to 15%, 1% to 10%, 1% to 5%, 5% to 25%, 5% to 20%, 5% to 15%, 5% to 10%, 2% or less, 4% or less, 6% or less, 8% or less, 10% or less, 12% or less, 14% or less, 16% or less, 18% or less, or 20% or less by weight based on the weight of polyester solid.

Figure 2C:
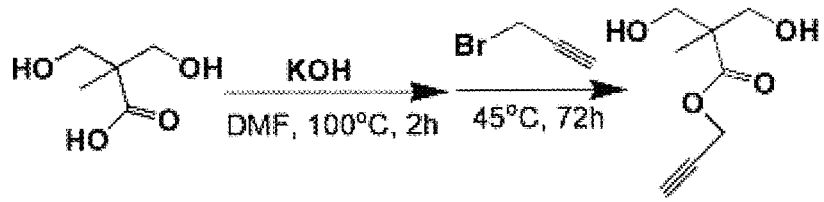
FIG. 2C is a chemical reaction scheme of a diol-yne click reaction.

Referring to FIG. 2C, an exemplary syntheses of a clickable diol with alkyne group is shown using propargyl 2,2-bis(hydroxylmethyl)propionate as an example, although as described herein, the clickable diol with an alkyne group is not limited solely to this species, but can be any clickable diol with an alkyne group that is not inconsistent with the objectives of this disclosure. For example, as shown below in Example 1, a different clickable diol with azide group, 2,2-Bis(azidomethyl)propane-1,3-diol, was prepared to show the diversity of clickable diols and alkyne groups possible.

In some embodiments, an adhesive composition can comprise a single valent or multivalent ion salt that operates as a counter ion to the negatively or positively charged nanoparticles. Tertiary amines, such as trimethylamine (TEA), dimethylaminoethanol (DMAE), and inorganic bases can be used to transfer the side carboxyl groups on WPU, PED, or PAE into negative ions, while acids such as hydrochloric acid, acetic acid, can be used to treat tertiary amine groups on WPU, PED, or PAE into positive ions. Exemplary counter ion salts can represented below by Formulas E1-E5, each of which can in some instances be used to ionize WPU, PED, or PAE polymers:

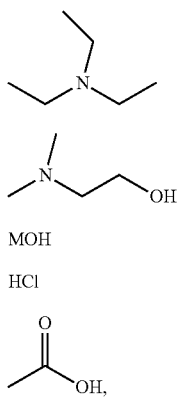

E1

E2

E3

MOH E4

HCl E5 wherein M is $Na^+$ or $K^+$.

Counter ion molecules described herein, when used in WPU, generally do not exceed the amount of polyol with an ionizable group (expressed as mole equivalents). For example, the counter ion molecules described herein for WPU use can be present in the range of 0.1% to 5%, 0.1% to 4%, 0.1% to 3%, 0.1% to 2.5%, 0.1% to 2%, 0.1% to 1%, 0.2% to 2.5%, 0.3%, to 2.5%, 0.4% to 2.5%, 0.5% to 2.5%, 0.6% to 2.5%, 0.7% to 2.5%, 0.8% to 2.5%, 0.9% to 2.5%, or 1% to 2.5% by weight based on the weight of polyurethane solid. Counter ion molecules described herein, when used in PED or PAE, can in some instances not exceed the amount of polyol or polyacid with ionizable group (expressed as mole equivalents). In other instances, the counter ion molecules, when used in PED, can sometimes exceed the amount of polyol or polyacid with an ionizable group. In some embodiment, the counter ion molecules used in PED are present in a range of 1% to 40%, 1% to 30%, 1% to 20%, 1% to 10%, 1% or less, 3% or less, 5% or less, 7% or less, 9% or less, 10% or less, 12% or less, 14% or less, 16% or less, 18% or less, or 20% or less by weight based on the weight of solid polyester.

A solid content of WPU or PED aqueous dispersions can be up to 55% by weight of the total composition, such as 10% to 55%, 15% to 50%, 20% to 45%, 25% to 45%, 10% to 50% 10% to 45%, 10% to 40%, 10% to 35%, 10% to 30%, 10% to 25%, or 10% to 20% by weight of the total composition.

Figure 6:
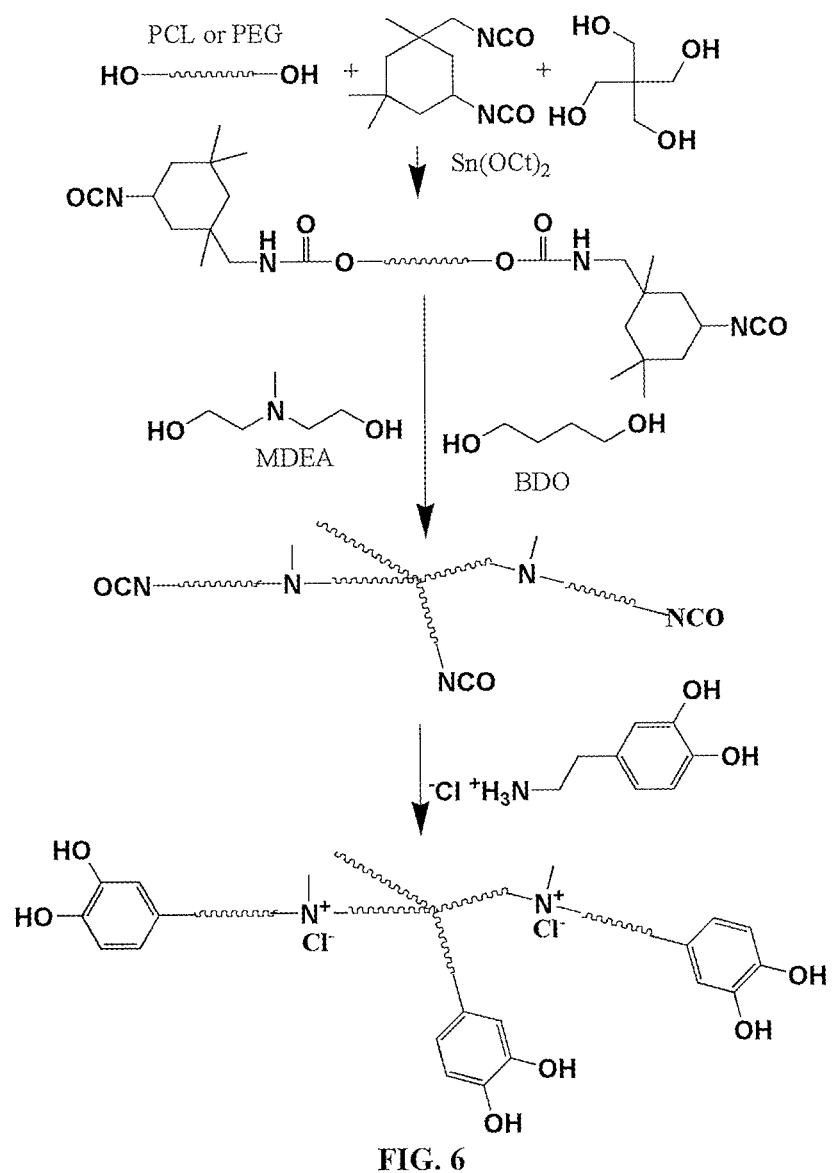
FIG. 6 shows a synthesis of dopamine modified waterborne polyurethane (WPU) with a positive charge ($WPU^+$-DP)

In an embodiment shown in FIG. 6, dopamine modified WPU having a positive charge (WPU$^+$-DP) is synthesized by capping a terminal isocyanate (—NCO) groups of a branched polyurethane with dopamine hydrochloride. The released hydrochloric acid (HCl) could react with the tertiary amine on the polymer chain (introduced by MDEA (Formula B5)) and form into quaternary ammonium hydrochloride salt. In some cases, no additional HCl is needed to make the obtained polymer become waterborne. The detailed formulation and synthesis process of WPU$^+$-DP is described in Example 2.

Figure 7:
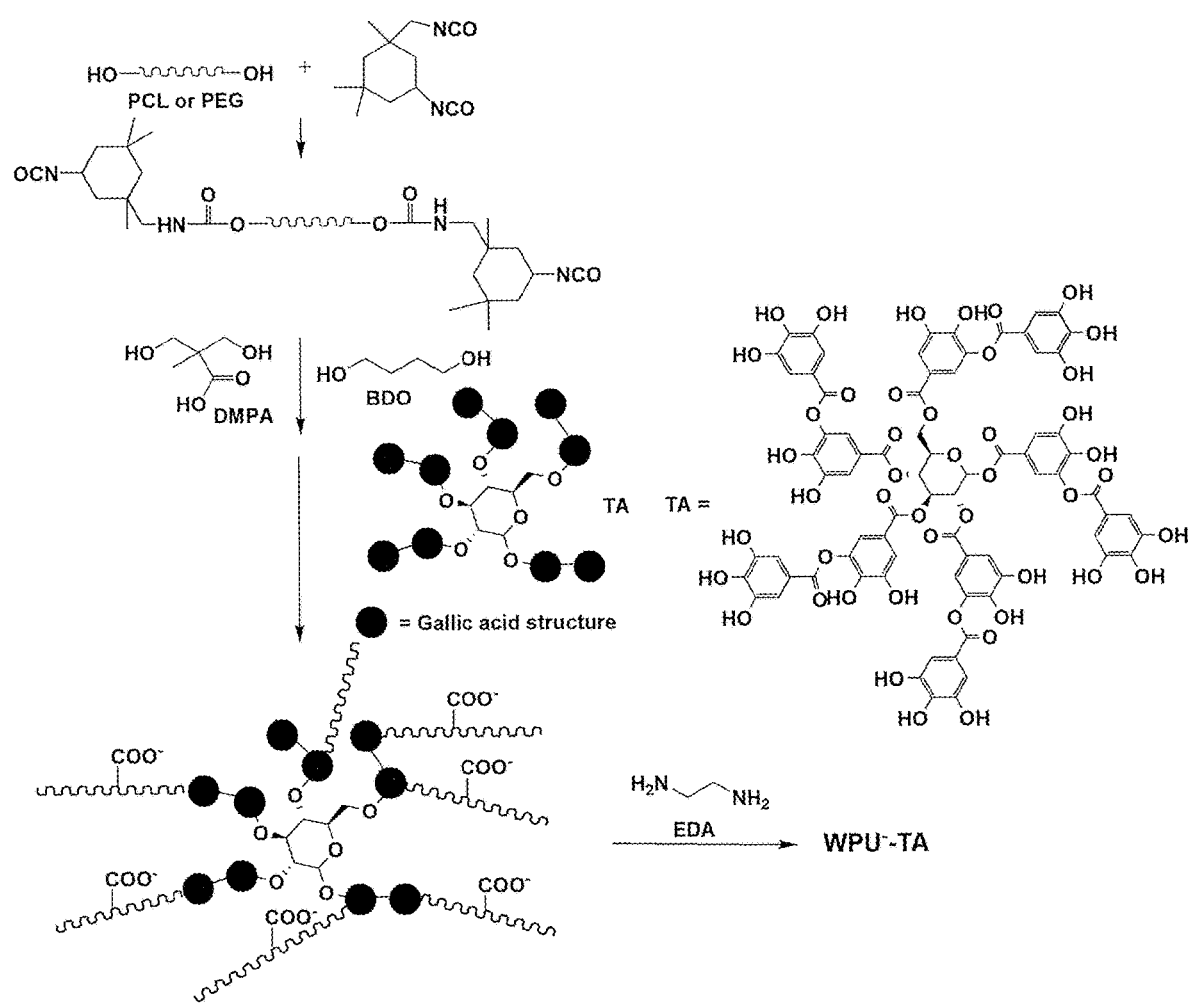
FIG. 7 shows a synthesis of tannic acid (TA) modified WPU with a negative charge ($WPU^-$-TA)

In another embodiment, as shown in FIG. 7, tannic acid (TA), a special form of tannin derived from plants such as oak wood and tea leaf, is introduced into WPU through the reaction between —NCO and the phenol group on TA to make a tannic acid modified WPY having a negative charge (WPU$^-$-TA). TA also serves as a branching agent to make the obtained WPU a branched polymer. The detailed formulation and synthesis process of WPU$^-$-TA is described in Example 3.

Figure 8:
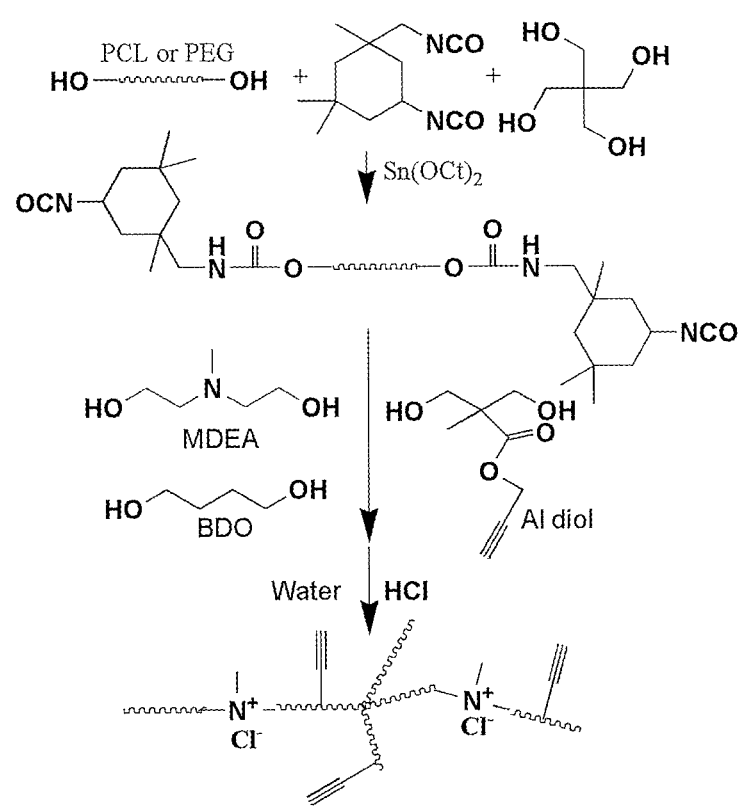
FIG. 8 shows a synthesis of an alkyne functional WPU with a positive charge ($WPU^+$-Al)

In another embodiment, as shown in FIG. 8, a clickable diol with an alkyne group (the synthesis process is shown in FIG. 2A) is introduced into WPU with a positive charge to obtain WPU$^+$-Al. The detailed formulation and synthesis process of WPU$^+$-Al is described in Example 4.

Figure 2D:
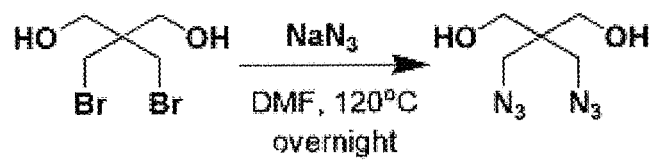
FIG. 2D is a chemical reaction scheme of a diol-azide click reaction.
Figure 9:
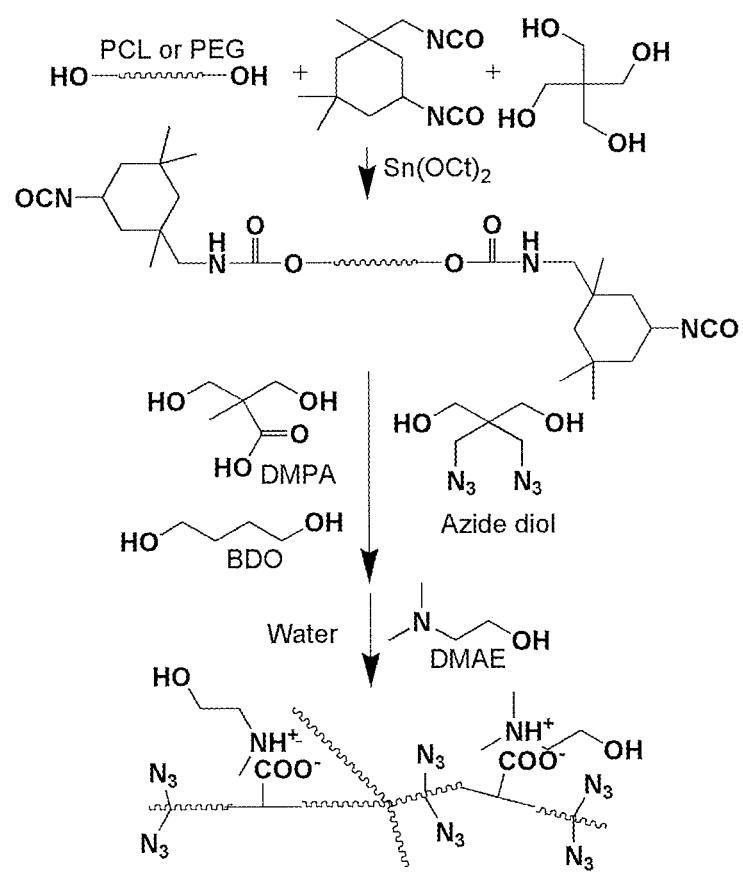
FIG. 9 shows a synthesis of an azide functional WPU with a negative charge ($WPU^-$-$N_3$).

In yet another embodiment, as shown in FIG. 9, a clickable diol with azide groups (the synthesis process is shown in FIG. 2D) is introduced into WPU with negative charge to obtain WPU$^-$-N$_3$. The detailed formulation and synthesis process of WPU$^-$-N$_3$ is described in Example 5.

In some instances, a clickable diol described herein with an alkyne group can also be introduced into WPU with negative charge to obtain WPU$^-$-Al, and clickable diol with azide group can also be introduced into WPU with positive charge to obtain WPU$^+$-N$_3$.

A clickable WPU described herein can have a tissue chemical reactive ability, such as where the WPU has a clickable diol with —COC≡CH (propiolate) groups. Using Formula D5 as an example, a clickable diol with pripiolate groups can be synthesized (FIG. 10) and subsequently introduced into either WPU$^+$ or WPU$^-$ (FIG. 11). The synthesis of WPU$^-$ with propiolate groups (WPU$^-$-PL) is described in Example 6.

Figure 12:
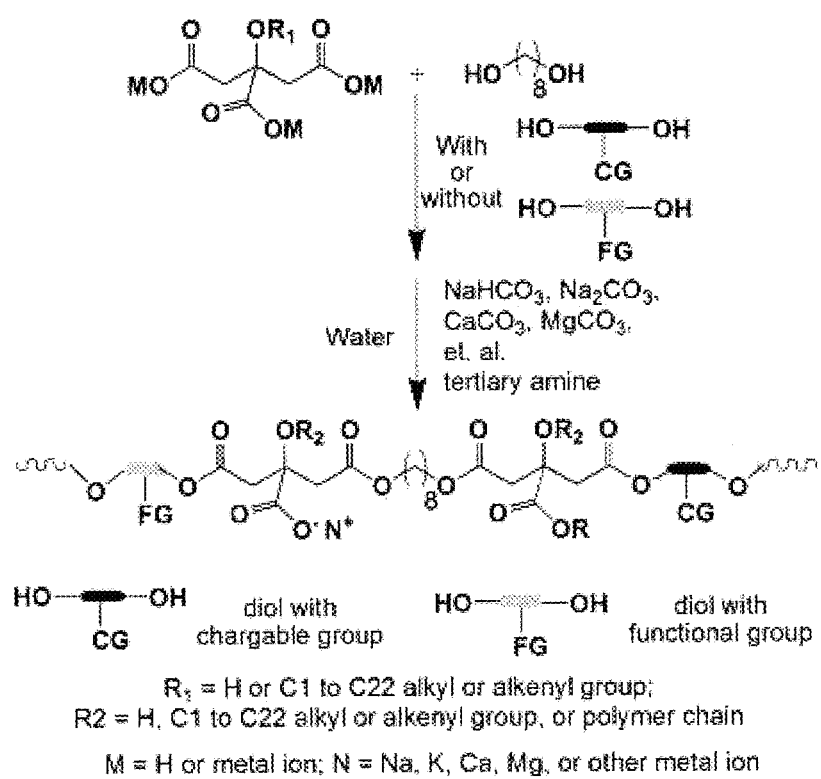
FIG. 12 shows a synthesis of negative charged waterborne or water-soluble citrate-based polymers (CBPs) with/without functional groups

In an embodiment shown in FIG. 12, citrate-based polymers can be converted into waterborne or water soluble polymers by converting the carboxyl groups from citric acid into —COO— ions, or by introducing citrate molecules or a diol described herein with negative charges. A citric acid or citrate monomer used in a synthesis described herein can be citric acid, C1 to C22 alkoxylated or alkenoxylated citric acid with the —OH group modified, metal citrate mono-/tri-basic salts, citrate slats with monovalent metal cation such as $Na^+$ or $K^+$, or divalent metal cation such as $Ca^{2+}$ or $Mg^{2+}$. Exemplary chemical structures of citrate molecules are expressed below in Formulas F1-F5:

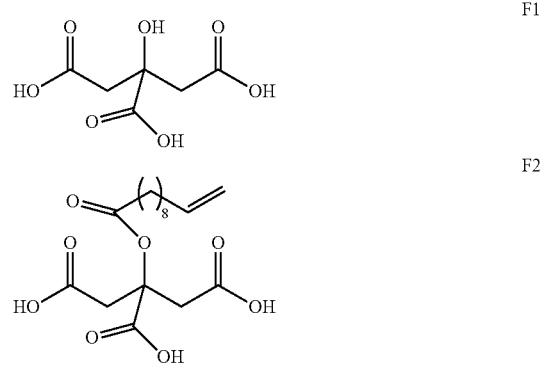

F1

F2

-continued

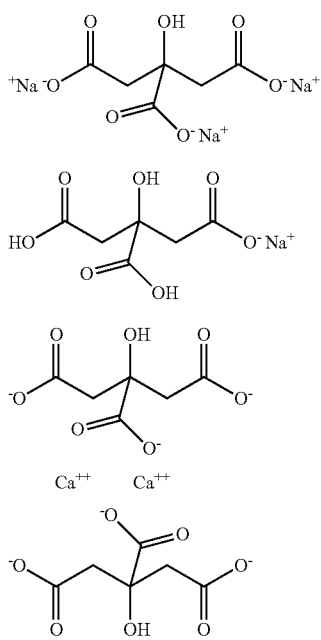

F3

F4

F5

As previously described, negatively charged diols used in citrate-based polymer synthesis can be one or more of those depicted in Formulas B2-B4, including β-glycerophosphate disodium salt (β-GP, B2), BES (B3), and BES sodium salt (B4).

Figure 13:
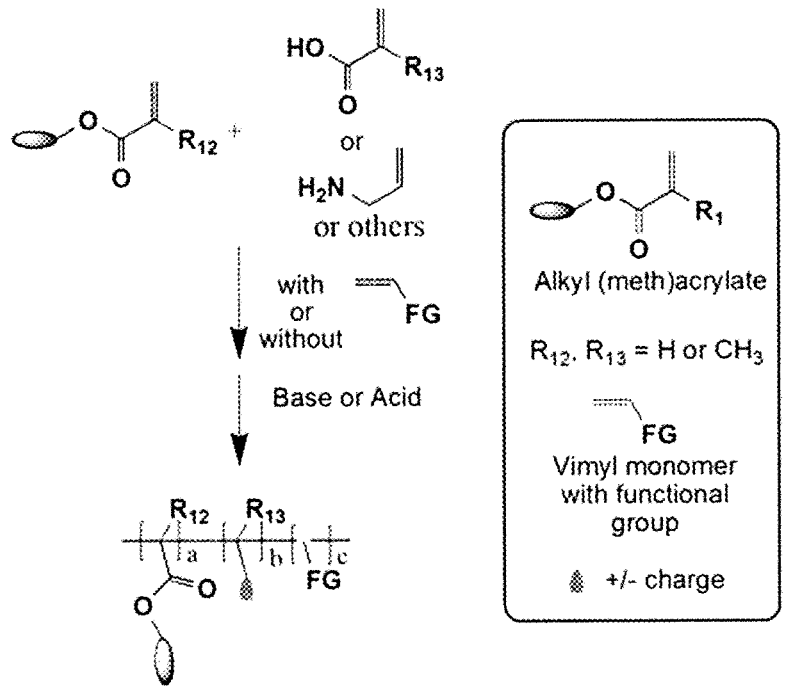
FIG. 13 shows a synthesis of positive or negative charged polyacrylate emulsions (PAE) with or without functional groups.

A polyacrylate emulsion (PAE) according to embodiments described herein, can be synthesized through free radical polymerization of alkyl acylate monomers, acrylic acid (for PAEs with negative charge) or allylamine (for PAEs with positive charge), 3-sulfopropyl (meth)acrylate potassium salt, or other vinyl monomers with ionizable groups, with/without vinyl monomers with functional groups. In some embodiments, PAE can be synthesized using the synthetic scheme shown in FIG. 13, where functional groups (FG) can be clickable functional groups, such as alkyne and azide, or other functional groups described herein.

Suitable alkyl methacrylates can be any alky methacrylate that are not inconsistent with the objectives of this disclosure. Non-limiting examples include methyl methacrylate, ethyl methacrylate, or propyl methacrylate, lauryl methacrylate, and mixtures thereof. The alkyl methacrylate can be used in PAE synthesis in amounts ranging from 20% to 60%, 25% to 55%, 30% to 50%, 35% to 45%, 32% to 48%, 34% to 46%, 36% to 44%, 38% to 42%, 30% to 45%, 30% to 40%, 30% to 35%, 35% to 50%, or 40% to 50% by weight based on the weight of the polyacrylate solid.

Suitable of alkyl acrylate can be any alkyl acrylate not inconsistent with the objectives of this disclosure. Non-limiting examples include methyl acrylate, ethyl acrylate, propyl acrylate, butyl acrylate, pentyl acrylate, hexyl acrylate, and ethyl hexyl acrylate, and mixtures thereof. In some cases, the alkyl acrylate is ethyl acrylate, butyl acrylate, ethyl hexyl acrylate, or combinations thereof. The alkyl acrylate used in PAE synthesis can be 20% to 65%, 25% to 60%, 30% to 55%, 35% to 50%, 40% to 45%, 20% to 60%, 20% to 55%, 20% to 50%, 20% to 45%, 20% to 40%, 20% to 35%, 20% to 30%, 20% to 25%, 25% to 65%, 30% to 65%, 35% to 65%, 40% to 65%, 45% to 65%, 50% to 65%, or 55% to 65% weight based on the weight of the polyacrylate solid.

Acrylic acid/methacrylic acid (for PAE with negative charge) or allylamine (for PAE with positive charge) can be used in PAE synthesis in a range of 1% to 5%, 2% to 5%, 3% to 5%, 1% to 4%, 1% to 3%, or 2% to 4% by weight based on the weight of total polyacrylate solid.

In some embodiments described herein, functional group vinyl monomers with chargeable groups can be vinyl monomers with metal sulfonate salt or metal phosphate salt, such as sodium p-styrene sulfonate.

Different functional group vinyl monomers having schematic formula G1-G6 can also be used in some embodiments described herein:

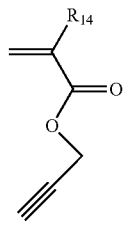

G1

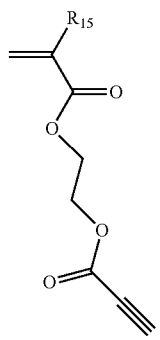

G2

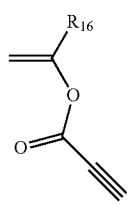

G3

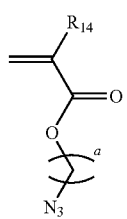

G4

-continued

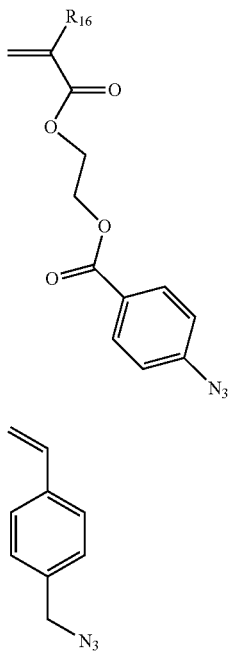

G5

G6 where $R_{14}$, $R_{15}$, $R_{16}$, $R_{17}$, and $R_{18}$ are independently H or $CH_3$; and a=2 or 3.

The vinyl monomer containing a functional group can be used in PAE synthesis in about 1% to 25%, 2% to 20%, 3% to 15%, 4% to 15%, 5% to 15%, 6% to 15%, 7% to 15%, 8% to 15%, 9% to 15%, 10% to 15%, or 15% or less by weight based on the weight of total polyacrylate solid.

The aqueous dispersions of polyacrylate particles can have a solid content of up to 65% by weight of the total composition, such as 1% to 65%, 5% to 65%, 10% to 65%, 15% to 65%, 20% to 65%, 25% to 65%, 30% to 65%, 35 to 55%, 40% to 50%, 1% to 10%, 10% to 20%, 20% to 30%, 40% to 50%, or 50% to 60% by weight of the total composition.

An adhesive composition described herein can have low dynamic viscosity. Low dynamic viscosity can in some cases enhance the ability of the nanoparticles to penetrate into rough substrate surfaces to form the mechanical interlocked particles through particle coalescence or interdiffusion along with solvent evaporation. As previously described herein, populations of nanoparticles can be mixed, coalesced, or diffused together to create a polymeric film that mechanically interlocks through ionic interaction with, with or without covalent bonds, to a surface to which the adhesive composition is applied. In some embodiments, the adhesive composition has a dynamic viscosity of 10,000 cP or less, 9,000 cP or less, 8000 cP or less, 7000 cP or less, 6000 cP or less, 5000 cP or less, 4000 cP or less, 3000, cP or less, 2000 cP or less, between 1000 cP to 10,000 cP, 1000 cP to 9,000 cP, 1000 cP to 8,000 cP, 1000 cP to 7,000 cP, 1000 cP to 6,000 cP, 1000 cP to 5,000 cP, 1000 cP to 4,000 cP, 1000 cP to 3,000 cP, 1000 cP to 2,000 cP, 2,000 cP to 10,000 cP, 3,000 cP to 10,000 cP, 4,000 cP to 10,000 cP, 5,000 cP to 10,000 cP, 6,000 cP to 10,000 cP, 7,000 cP to 10,000 cP, 8,000 cP to 10,000 cP, 9,000 cP to 10,000 cP, 2,000 cP to 8,000 cP, or 4,000 cP to 6,000 cP.

While different functional groups have been described here in various embodiments for forming charged nanoparticles, or covalent crosslinkers, the functional groups are not limited solely to those embodiments. In some embodiments described herein, the functional groups can have a therapeutic effect or mechanism, and can be used as the sole functional group on the nanoparticle, or in combination with any of the other functional describes described herein. In some instances, nanoparticles described herein can be functionalized with antimicrobial components, such as antibacterials, antivirals, antifungals, antiparasiticals, or any combination thereof. Inclusion of such antimicrobial components can provide benefits in wound healing and sterilization when the adhesive composition is applied to tissue. In some embodiments, an antimicrobial component can be included in an adhesive composition described herein as a separate element in the composition rather than being linked to a nanoparticle. Exemplary antibacterials include aminoglycoside, ansamycin, carbacephem, carbapenems, cephalosporins, glycopeptides, lincosamides, lipopeptides, macrolides, monobactams, nitrofurans, oxazolidinones, penicillins, antimicrobial polypeptides (amp), sulfonamides, tetracylcines, or any combination thereof. Exemplary antivirals include adamantane antivirals, antiviral boosters, antiviral interferons, chemokine receptor antagonists, integrase strand transfer inhibitors, neuraminidase inhibitors, non-nucleoside reverse transcriptase inhibitors, non-structural protein 5a (ns5a) inhibitors, nucleoside reverse transcriptase inhibitors, protease inhibitors, purine nucleosides, or any combination thereof. Exemplary antifungals include clotrimazole, econazole nitrate, miconazole, terbinafine, fluconazole, ketoconazole, amphotericin, or any combination thereof. Exemplary antiparasiticals include ephenium, diethylcarbamazine, ivermectin, niclosamide, piperazine, praziquantel, pyrantel, pyrvinium, benzimidazoles, albendazole, flubendazole, mebendazole, thiabendazole, or any combination thereof.

Moreover, in some instances, a nanoparticle itself can possess intrinsic antimicrobial properties. As described in more detail in Example 11, WPU with positive ($WPU^+$) or negative ($WPU^-$) charge was also found to possess intrinsic antimicrobial property, which is believed to be caused by the surface charge of WPU nanoparticles destroying the cell membrane of bacteria. Referring to Example 11, both $WPU^+$ and $WPU^-$ dispersions exhibited certain antimicrobial property against both Gram-positive and Gram-negative bacteria, *Staphylococcus aureus* (*S. aureus*, ATCC No. 6538) and *Escherichia coli* (*E. coli*, ATCC No. 8739).

The aqueous solvent comprises water, either as a sole solvent, or in combination with other water-soluble solvents, such as low weight average molecular weight alcohols (methanol, ethanol, propanol, butanol, and the like), low weight average molecular weight acids (acetic acid and the like), and/or low weight average molecular weight nitrogen-based solvents (acetonitrile, triethylamine, and the like). In some embodiments, water comprises 10%, 20%, 30%, 40%, 50%, 60%, 70% or 80% of the composition.

Additionally, one particular condition is not included in Table 3 but represents another embodiment described herein. Namely, one of the components of the AB formulation can be a salt solution which is able to precipitate the other component (e.g., WPND or polymer solution) out of water. The salt may have an ion with multivalent charge, such as $Mg^{2+}$, $Ca^{2+}$, or $Fe^{3+}$ for metal ion, phosphate or tripolyphosphate for negative charge ion. The salt concentration can be in the range of 0.01% to 5% by weight of the total composition. In some instances, the salt concentration can be in the range of 0.1% to 2% by weight of the total composition.

I(b). Polymer-Based Adhesive Compositions

In another aspect, an adhesive composition described herein comprises a population of first waterborne polymers dispersed in an aqueous solvent. In some preferred embodiments, an adhesive composition comprises a population of second nanoparticles dispersed in the aqueous solvent, the second nanoparticles differing from the first nanoparticles. The population of first and second waterborne polymers can in some cases be a waterborne (water-soluble) polymer with positive or negative charges on the polymer chains. The first and second waterborne polymers can be a natural-based or synthetic polymer with positive or negative charges. The first waterborne polymer can be comprised of the same type of material as the second waterborne polymer in some instances. In other cases, a first waterborne polymer can be comprised of a different material than a second waterborne polymer.

In some instances, a waterborne polymer described herein can comprise a negative or positive charge to form an AB formulation, similar to the AB formulation previously described herein for nanoparticles. For instance, in some embodiments described herein, component A can be a first waterborne polymer having a first charge, such as a positive charge (e.g. $A^+$), and component B can be a second waterborne polymer having a second charge different from the first charge, such as a negative charge (e.g. $B^-$). However, as previously discussed, the particular charge assigned to components A and B can be either charge, such as $A^+B^-$ or $A^-B^+$, so long as each of the A and B components has an opposite charge than the other component. In some embodiments described herein, a first waterborne polymer comprising component A and a second waterborne polymer comprising component B are in the same class (material composition) of waterborne polymers, with the only difference being the charged functional groups. In other embodiments, the first waterborne polymer component A and the second waterborne polymer component B are comprised of different classes (material composition) of waterborne polymers having opposite charges.

Analogous to the nanoparticles previously discussed, a first waterborne polymer will have a charge opposite that of a second waterborne polymer, such that when a first waterborne polymer and a second waterborne polymer are mixed together, an ionic crosslink(s) is formed between the polymers. As shown in FIG. 1, when an adhesive composition described herein is applied to a tissue surface, a first and second waterborne polymer composition can intercalate and aggregate onto the surface of the tissue, and form a mechanical interlocking structure through an ionic crosslinking mechanism.

The charges of a first and second waterborne polymer can be obtained in any manner not inconsistent with the objectives of this disclosure. FIG. 3 illustrates exemplary variations of negatively and positively charged first and second waterborne polymers, where the circular icons represent the nanoparticle-based A and B components discussed in Section I(a) above, and the serpentine lines represent the waterborne polymer-based A and B components being discussed in this section. In some embodiments, the charges can be introduced onto a first and second polymeric A and B components in any manner described in Section I(a).

Referring to FIG. 3, a waterborne polymer described herein with positive charges can in some embodiments comprise chitosan, poly(L-lysine) (PLL), ε-polylysine (ε-PL), polyethylenimine (PEI), or polyallylamine (PAA). The concentration of the waterborne polymer with positive charges solution used as one component of the AB formulation is in the range of 0.1% to 50%, 1% to 50%, 5% to 50%, 10% to 50%, 15% to 50%, 20% to 50%, 25% to 50%, 30% to 50%, 35% to 50%, 40% to 50%, 5% to 40%, 10% to 30%, 15% to 25%, or 10% to 20% by weight of the total composition.

In some embodiments, a waterborne polymer described herein can comprise a weight average molecular weight of 1,000 to 5,000 Da (1 k to 5 k), 5,000 to 200,000 Da (5 k to 200 k), 5 k to 150 k, 5 k to 125 k, 5 k to 100 k, 5 k to 90 k, 5 k to 80 k, 5 k to 70 k, 5 k to 60 k, 5 k to 50 k, 5 k to 40 k, 5 k to 30 k, 5 k to 20 k, 10 k to 100 k, 10 k to 75 k, 10 k to 50 k, 10 k to 25 k, 20 k to 150 k, 30 k to 150 k, 40 k to 150 k, 50 k to 150 k, 60 k to 150 k, 70 k to 150 k, 80 k to 150 k, 90 k to 150 k, 100 k to 150 k, or 100 k to 200 k, or 200 k to 400 k.

Again referring to FIG. 3, a waterborne polymer with negative charges can be an ionized citrate-based polymer, carboxymethyl cellulose (CMC), carboxymethyl chitosan (CMCS), carboxymethyl starch (CMS), sodium alginate (SA), chondroitin sulfate, succinyl gelatin (SG). A concentration of a waterborne polymer with negative charges solution used as one component of the AB formulation is in the range of 0.1% to 50%, 1% to 50%, 5% to 50%, 10% to 50%, 15% to 50%, 20% to 50%, 25% to 50%, 30% to 50%, 35% to 50%, 40% to 50%, 5% to 40%, 10% to 30%, 15% to 25%, or 10% to 20% by weight of the total composition.

In some embodiments, an ionized citrate-based polymer can have a weight average molecular weight of 800 to 6 k Da, 800 to 5 k Da, 800 to 4 k Da, 800 to 3 k Da, 800 to 2 k Da, 800 to 1.5 k Da, 800 to 1 k Da, 1 k to 6 k Da, 1.5 k to 6 k Da, 2 k to 6 k Da, 3 k to 6 k Da, 4 k to 6 k Da, or 5 k to 6 k Da. In some embodiments, natural polymers such as CMC, CMCS, CMS, SA, SG, and chondroitin sulfate, can have a weight average molecular weight of 50 k to 400 k Da, 50 k to 200 k Da, 100 k to 200 k Da, 200 k to 300 k Da, at least 50 k Da, at least 100 k Da, at least 150 k Da, at least 200 k Da, at least 250 k Da, at least 300 k Da, at least 350 k Da, at least 400 k Da, or greater than 400 k Da.

Functional groups, such as clickable functional groups (alkyne, azide, —COC≡CH), double bond (allyl, —COCR=$CH_2$, R=H or $CH_3$), and —Si—H, can also be introduced into a positive or negative charged waterborne polymers in any manner previously discussed above in Section I(a). An exemplary listing of different functional groups is also described in FIG. 3. A weight percentage of these functional groups can be in any range not inconsistent with the objectives of this disclosure. Exemplary ranges include 0% to 20%, 0% to 18%, 0% to 16%, 0% to 14%, 0% to 12%, 0% to 10%, 0% to 8%, 0% to 6%, 0% to 4%, 1% to 20%, 2% to 20%, 4% to 20%, 6% to 20%, 8% to 20%, 10% to 20%, 12% to 20%, 14% to 20%, 16% to 20%, 18% to 20% by weight of the total composition.

In some embodiments described herein, the functional groups on a first waterborne polymer and a second waterborne polymer described herein can be pairable in a similar or same manner as described above in Section I(a). That is, "pairable" means that different functional groups on a first waterborne polymer and a second waterborne polymer can react with each other (including, in some instances, in a selective or preferred manner, relative to other possible reactions within the composition, to form a covalent or ionic bond) or at least are compatible to each other, or do not affect to each other for reactions.

When both components in an AB formulation described herein are water-soluble polymer solutions with opposite charges, with/without functional groups, a waterborne polymer concentration of components A and B combined can be in the range of 1% to 100%, 1% to 90%, 1% to 80%, 1% to 70%, 1% to 60%, 1% to 50%, 1% to 40%, 1% to 30%, 1% to 20%, 1% to 10%, 10% to 45%, 10% to 40% 10% to 35%, 10% to 30%, 10% to 25%, 10% to 20%, 15% to 50%, 20% to 50%, 25% to 50%, 30% to 50%, 35% to 50%, or 40% to 50% by weight of the total composition.

In some embodiments, an adhesive composition can comprise a single valent or multivalent ion salt that operates as a counter ion to the negatively or positively charged nanoparticles, such as the exemplary counter ion salts are represented by Formulas E1-E5 in Section I(a), each of which can in some instances be used to ionize a waterborne polymer described herein. The solid content of aqueous dispersions of a waterborne polymer can be up to 55% by weight of the total composition, such as 10% to 55%, 15% to 50%, 20% to 45%, 25% to 45%, 10% to 50%, 10% to 45%, 10% to 40%, 10% to 35%, 10% to 30%, 10% to 25%, or 10% to 20% by weight of the total composition.

An adhesive composition with a waterborne polymer described herein can have a low dynamic viscosity such as the low dynamic viscosity described in Section I(a).

In some instances, waterborne polymers described herein can be functionalized with antimicrobial components, such as antibacterials, antivirals, antifungals, antiparasiticals, or combinations thereof described in Section I(a), or a composition described herein comprising a waterborne polymer can comprise an antimicrobial component unbound to the waterborne polymer.

The aqueous solvent comprises water, either as the sole solvent, or in combination with other water-soluble solvents, such as low weight average molecular weight alcohols (methanol, ethanol, propanol, butanol, and the like), weight average low molecular weight acids (acetic acid and the like), and/or weight average low molecular weight nitrogen-based solvents (acetonitrile, triethylamine, and the like). In some embodiments, water comprises 10%, 20%, 30%, 40%, 50%, 60%, 70% or 80% by weight of the total composition.

Additionally, one particular condition is not included in Table 3, but represents another embodiment described herein. Namely, one of the components of the AB formulation can be a salt solution which is able to precipitate the other component (such as a WPND or polymer solution) out of water. The salt can have an ion with multivalent charge, such as $Mg^{2+}$, $Ca^{2+}$, or $Fe^{3+}$ for metal ion, phosphate or tripolyphosphate for negative charge ion. When present, the salt concentration can be in the range of 0.01% to 5%. In some instances, the salt concentration can be 0.1% to 2%.

Figure 14:
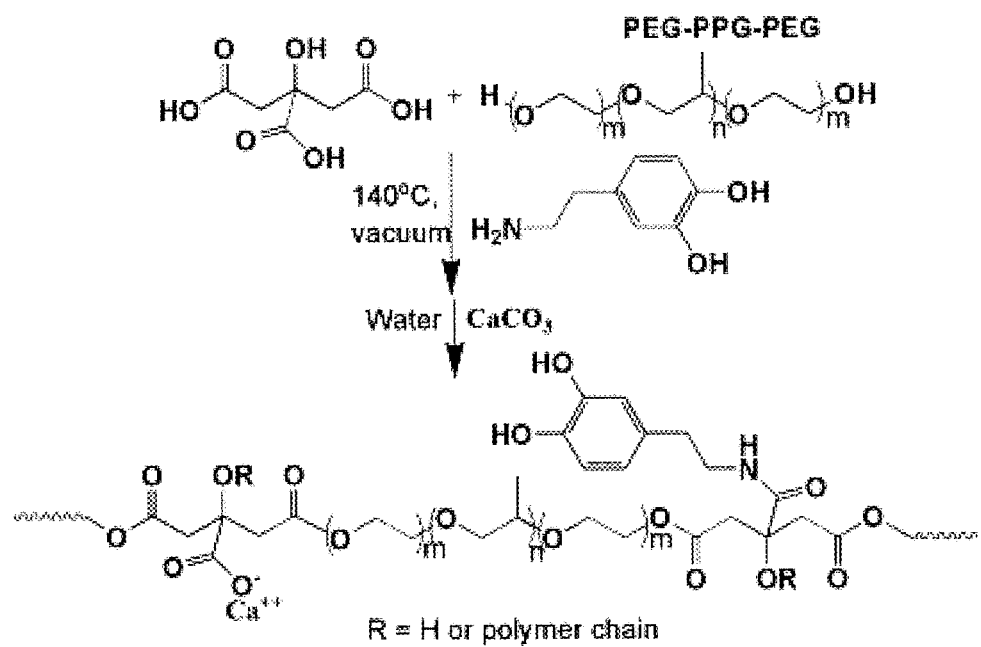
FIG. 14 shows an exemplary synthesis of waterborne iCMBA with a calcium ion (iCMBA-$Ca^{2+}$)

FIG. 14 shows an exemplary synthesis of waterborne iCMBA with a calcium ion (iCMBA-$Ca^{2+}$). iCMBA-EPE-$Ca^{2+}$ (iCMBA-$Ca^{2+}$ using PEG-PPG-PEG diol) was synthesized by polycondensation of citric acid (CA), poly(ethylene glycol)-poly(propylene glycol)-poly(ethylene glycol) (PEG-PPG-PEG) diol, and dopamine, followed by treating with calcium carbonate ($CaCO_3$). The detailed method for this synthesis can be found in Example 7.

I(c). Multi-Component Adhesive Compositions

In another aspect, an adhesive composition described herein comprises a population of first nanoparticles dispersed in an aqueous solvent; and a population of second nanoparticles dispersed in the aqueous solvent, the second nanoparticles differing in type from the first nanoparticles. The first and second nanoparticles can have a structure described in Section I(a). For instance, as illustrated in FIG. 3, the first nanoparticle can be a WPND, such as WPU, PED, or PAE, and the second nanoparticle can be a different WPND. As an example, in some cases, when the first nanoparticle is a WPU, the second nanoparticle can be PED or PAE, when the first nanoparticle is a PED, the second nanoparticle can be WPU or PAE, and so forth.

The first and second nanoparticles also can have opposite charges, such that the first and second nanoparticles can have ionic crosslinking. The first and second nanoparticles can be charged in any manner described above in Sections I(a).

Moreover, in some embodiments described herein, the first and second nanoparticles can have pairable functional groups, where functional groups on the first nanoparticles are pairable with functional groups on the second nanoparticles. In some embodiments, the first nanoparticles can have a first functional group attached to an exterior surface of the first nanoparticles, and the second nanoparticles can have a second functional group attached to an exterior surface of the second nanoparticles. The second functional group can be selectively reactive with a first functional group attached to an exterior surface of the first nanoparticles, and can form a covalent bond crosslinking the first nanoparticle to the second nanoparticle.

For example, the first nanoparticle could be functionalized with an alkyne group, and the second nanoparticle could be functionalized with an azide group. When the first nanoparticle is ionically crosslinked with the second nanoparticle by virtue of their opposite charges, the close proximity of the alkyne and azide groups will initiate a "click" reaction therebetween, forming a covalent bond between the nanoparticles. Thus, the first and second nanoparticles will be mechanically interlocked through both ionic and covalent crosslinking.

Additionally, as described above in Section I(a), a first and a second nanoparticles can be functionalized with a tissue-binding functional group, such as catechol-based or gallotannin-based moiety. The first and second nanoparticles can solely have the tissue-binding functional group in some embodiments, or can have a combination of the tissue-binding functional groups and pairable functional groups. In these instances, the adhesive composition will form both ionic and covalent crosslinking between the nanoparticles, as well as covalent crosslinking of the particles to the tissue. However, in some instances, the first and second nanoparticles only possess opposite charges for forming ionic crosslinking, and do not have any functional groups.

In another aspect similar to the first and second nanoparticles, an adhesive composition described herein comprises a population of first waterborne polymers dispersed in an aqueous solvent; and a population of second waterborne polymers dispersed in the aqueous solvent, the second waterborne polymers differing from the first waterborne polymers. The first and second waterborne polymers can have a structure described in Section I(b), with any of the charges, pairable functional groups, tissue-binding functional groups, and other characteristics described in Section I(a).

As described in Section I(b) and shown in FIG. 3, the first waterborne polymer can be a waterborne polymer, such as iCBP, CMC, CMCS, CMS, SA, or SG, and the second waterborne polymer can be a different waterborne polymer. As an example, in some cases, when the first waterborne polymer is an iCBP, the second waterborne polymer can be CMC, CMCS, CMS, SA, or SG; when the first waterborne polymer is a SG, the second waterborne polymer can be iCBP, CMC, CMCS, CMS, or SA, and so forth.

Analogous to the first and second nanoparticles, a first and a second waterborne polymer also can have opposite charges, such that the first and second waterborne polymers can form ionic crosslinking. The first and second waterborne polymers can be charged in any manner described above in Sections I(a) and I(b).

Additionally, in some embodiments described herein, the first and second waterborne polymers can have pairable functional groups as described above for the first and second nanoparticles, where functional groups on the first waterborne polymers are pairable with functional groups on the second waterborne polymers.

Additionally, the first and second waterborne polymers can, in some embodiments, be functionalized with a tissue-binding functional group, such as catechol-based or gallotannin-based moiety, as described above in Sections I(a) and I(b).

Finally, in another aspect, an adhesive composition described herein can comprise a combination of a population of nanoparticles according to Section I(a) dispersed in an aqueous solvent; and a population of waterborne polymers according to Section I(b) dispersed in the aqueous solvent. Both the nanoparticles and the waterborne polymers can be charged, where the nanoparticles can have an opposite charge than that of the waterborne polymer. When combined, the nanoparticles and the waterborne polymers can be ionically crosslinked.

In some embodiments described herein, the nanoparticles and the waterborne polymers can have pairable functional groups, where functional groups on the nanoparticles are pairable with functional groups on the waterborne polymers. When the respective nanoparticles and waterborne polymers are in close proximity, such as through ionic crosslinking, these pairable groups can selectively react to form covalent crosslinking, as described for instance in Sections I(a) and I(b).

In some embodiments described herein, the nanoparticles and the waterborne polymers can be functionalized with a tissue-binding functional group, such as a catechol-based or gallotannin-based moiety. In some instances, only one of the nanoparticle or waterborne polymer is functionalized with the tissue-binding functional group. In other instances, both of the nanoparticle and waterborne polymer are functionalized with the tissue-binding functional group. In some cases, the nanoparticles are functionalized with one type of tissue-binding functional group, and the waterborne polymers are functionalized with a different type of tissue-binding functional group.

While the adhesive compositions above are described in terms of two separate components, the adhesive compositions are not limited to only two separate components. In some embodiments, an adhesive composition described herein can have one, two, three, four, five, six, or more separate components. For example, the adhesive compositions described herein can have first, second, third, and so on nanoparticle or waterborne polymers having complementary charges and functional groups.

II. METHODS OF USING ADHESIVE COMPOSITIONS

In another aspect, methods of using an adhesive composition of Sections I(a) to I(c) are described herein. In some embodiments, a method of adhering biological materials comprises: disposing any adhesive composition described in Sections I(a) to I(c) in between a first surface of a first biological material and a second surface of a second biological material.

The disposed composition adheres the first surface of the first biological material to the second surface of the second biological material.

In some embodiments, nanoparticles of Section I(a) are crosslinked to themselves through an ionic crosslinking, covalent crosslinking, or both. In some embodiments, waterborne polymers of Section I(b) are crosslinked to themselves through ionic crosslinking, covalent crosslinking, or both.

In some embodiments, first nanoparticles of Section I(a) are crosslinked to second nanoparticles of Section I(a), or the first polymer of Section I(b) is crosslinked to the second polymer of Section I(b) through ionic crosslinking, covalent crosslinking, or both. In some cases, nanoparticles of Section I(a) are crosslinked to waterborne polymers of Section I(b) through ionic crosslinking, covalent crosslinking, or both.

In some instances, the method of adhering biological materials comprises forming a crosslink between any adhesive composition described in Sections I(a) to I(c) using the tissue-adhering functional group.

FIG. 15 is a table showing various ionic crosslinking, tissue mechanical interlocking, and the tissue chemical bonding combinations possible using the different combinations of functional groups shown in FIG. 3.

The step of disposing the composition in between the first surface and the second surface or in the open region can be carried out in some cases by injecting the composition from a single syringe. In other cases, the step of disposing the composition in between the first surface and the second surface or in the open region can be carried out by injecting a first portion of the composition from a first syringe and injecting a second portion of the composition from a second syringe. The first and second portions of the compositions can be injected simultaneously or sequentially.

In some embodiment, the step of disposing the composition in between the first surface and the second surface is carried out by disposing a first portion of the composition on the first surface of the first biological material and disposing a second portion of the composition on the second surface of the second biological material, followed by contacting the first and second surfaces with one another.

When the biological materials are adhered with the adhesive composition, an adhesive composition described herein can form a water-tight seal between the first surface and the second surface, or a water-tight seal over the open region.

In some embodiments, a method of performing abdominoplasty comprises disposing an adhesive composition of Sections I(a) to I(c) in between a first surface of a first layer of abdominal tissue and a second surface of a second layer of abdominal tissue, wherein the composition adheres the first surface of the first abdominal tissue to the second surface of the second layer of abdominal tissue.

In some embodiments, a method of performing mastectomy comprises disposing the composition of an adhesive composition of Sections I(a) to I(c) in between a first surface of a first layer of breast tissue and a second surface of a second layer of breast tissue, wherein the composition adheres the first surface of the first breast tissue to the second surface of the second layer of breast tissue.

In some embodiments, a method of adhering a biological material to an implant comprises disposing the composition of an adhesive composition of Sections I(a) to I(c) in between a first surface of a first biological material or a first surface of a first medical implant and a second surface of a second medical implant or a second surface of a second biological material, respectively, wherein the composition adheres the first surface to the second surface.

In some embodiments, a method of treating a skin disease, disorder, or condition comprises applying the composition of an adhesive composition of Sections I(a) to I(c) in to a surface of skin of a patient in need thereof.

In some embodiments, a method of dressing a skin wound of a patient in need thereof comprises applying the composition of an adhesive composition of Sections I(a) to I(c) in to the wound, thereby forming a liquid bandage from the composition.

In some embodiments, a method of treating transsphenoidal leaks comprises disposing the composition of an adhesive composition of Sections I(a) to I(c) in in a cranial space corresponding to a transsphenoidal leak, wherein the composition forms a water-tight seal of the leak.

In some embodiments, a method of delivering a therapeutic factor to a biological environment comprises disposing the composition of any of embodiments 1-27 in the biological environment, wherein the composition further comprises a therapeutic factor dispersed in the aqueous solvent of the composition.

In some embodiments, a method of sealing an open region of dura matter and an open region of a skull of a patient in need thereof comprises disposing the composition of any of embodiments 1-27 in the open region of the dura matter and the open region of the skull, wherein the composition forms a water-tight seal of the open region of the dura matter and the open region of the skull.

While various methods of using adhesive compositions described herein have been discussed in the context of tissue-based applications, the adhesive compositions are not solely limited to this area, but can also be used in drug delivery, layer-by-layer coatings, wound dressings, plant seed coatings, liquid bandages, 3D printing, endoscopic mucosal resections (EMR), and cosmetic applications.

III. COSMETIC ADHESIVES

In another aspect, a cosmetic composition comprises an aqueous solvent; an adhesive composition of any of Sections I(a) to I(c) dispersed in the aqueous solvent; and a cosmetically acceptable agent comprising one or more of a structuring agent, a gelling agent, a powder, a filler, an emulsifier, a solid or liquid fatty agent, or any combination thereof; wherein the first polymer is negatively or positively charged; and wherein the first polymer can be a particulate or a non-particulate.

The structuring agents generally function to thicken or increase the viscosity of the composition, and generally comprise waxes and non-wax polymers. Various examples of structuring agents include polyorganosiloxane-containing polymers, non-silicone-polyamide copolymers, waxes, and mixtures thereof, or any other structuring agents not inconsistent with the goals of this disclosure. The polyorganosiloxane-containing polymers can have a weight-average molecular mass of 300 to $3 \times 10^6$, comprising from 1 to about 15,000 organosiloxane units. The non-silicon polyamide copolymers include ester-terminated polyamides (ETPAs), tertiary-amide-terminated polyamides (ATPAs), ester-terminated polyester-amides (ETPEAs), tertiary amide-terminated polyester-amides (ATPEA), polyalkyleneoxy-terminated polyamides (PAOPAs), polyether-polyamides (PEPAs), or any other polyamide not inconsistent with the goals of this disclosure. The waxes include those of natural animal, plant or mineral origin, such as beeswax, carnauba wax, candelilla wax, ouricury wax, Japan wax, cork fiber wax, sugar cane wax, paraffin wax, lignite wax, microcrystalline waxes, lanolin wax, montan wax, ozokerites and hydrogenated oils such as hydrogenated jojoba oil as well as waxes of synthetic origin, for instance polyethylene waxes derived from the polymerization of ethylene, waxes obtained by Fischer-Tropsch synthesis, fatty acid esters and glycerides, silicone waxes, waxes referenced in the Codex alimentary, or any combination thereof.

The gelling agent can be either a hydrophilic or a hydrophobic gelling agent that is polymeric or mineral-based, where a gel is formed through chemical reticulation or physical reticulation. Exemplary hydrophobic gelling agents include modified clays or mineral thickeners such as fumed silica, or any other hydrophobic gelling agent not inconsistent with the goals of this disclosure. Exemplary hydrophilic gelling agents include polysaccharides and gums, polysaccharide resins such as starch or cellulose and their derivatives, polyvinylpyrrolidone (PVP), polyvinyl alcohol, cross-linked polyacrylic acids and acrylates, hydrophobically-modified acrylates, polyacrylamides, or any combination thereof, or any other hydrophilic gelling agent not inconsistent with the goals of this disclosure The solid or liquid fatty agent can be a volatile or nonvolatile oil such as a linear or branched hydrocarbon-based oil that may optionally include oxygen, nitrogen, sulfur, and/or phosphorous atoms; silicone oils; and fluoro oils. Examples of hydrocarbon-based oils include caprylic acid, capric acid, lauric acid, myristic acid, palmitic acid, stearic acid, oleic acid, ricinoleic acid, linoleic acid, linolenic acid, arachidic acid, gadoleic acid, behenic acid, erucic acid, brassidic acid, cetoleic acid, lignoceric acid, nervonic acid, paraffin, petroleum jelly, polydecenes, hydrogenated polyisobutene, saturated or unsaturated fatty acids of plant origin or any combination thereof, or any other fatty agent not inconsistent with the goals of this disclosure. Also included are synthetic esters and ethers, such as purcellin oil, octyl palmitate, isopropyl lanolate, 2-octyldodecyl stearate, 2-octyldodecyl erucate or isostearyl isostearate; hydroxylated esters, such as isostearyllactate, octyl hydroxystearate, octyldodecyl hydroxystearate, diisostearyl malate, triisocetyl citrate or heptanoates, octanoates or decanoates of fatty alcohols, polyol esters, pentaerythritol esters, $C_{10}$-$C_{17}$ alkyl benzoates or any combination thereof, or any other synthetic ester or ether not inconsistent with the goals of this disclosure.

The silicone oils generally comprise organo-silicone oils having alkyl or alkoxy groups with 1 to 10 carbon atoms, such as dimethicones, octamethylcyclotetrasiloxane, decamethylcyclopentasiloxane, dodecamethylcyclohexasiloxane, heptamethylhexyltrisiloxane, heptamethyloctyltrisiloxane, hexamethyldisiloxane, octamethyltrisiloxane, decamethyltetrasiloxane, dodecamethylpentasiloxane, or mixtures thereof, or any other silicone oil not inconsistent with the goals of this disclosure.

Exemplary fluoro oils include nonafluoromethoxybutane, perfluoro-methylcyclopentane, combinations thereof, or any other fluoro oil not inconsistent with the goals of this disclosure.

The emulsifiers can be either non-ionic amphiphilic lipids or anionic amphiphilic lipids. The nonionic amphiphilic lipids can be silicone surfactants, lipids fluid up to 50° C., mixed esters of fatty acids and alcohols of glycerol, fatty acid esters and ethers of sugars, or other nonionic amphiphilic lipids not inconsistent with the goals of this disclosure.

The anionic amphiphilic lipids can be alkyl ether citrates, alkoxylated alkenyl succinates, alkoxylated glucose alkenyl succinates, alkoxylated methylglucose alkenyl succinates, or any other anionic amphiphilic lipid not inconsistent with the goals of this disclosure.

In some embodiments, the cosmetically acceptable agent further comprises a colorant, a pigment, a photoprotective agent, a secondary film-former, a cosmetically active agent or a cosmetic adjuvant, or any combination thereof. The colorant and pigment can be any colorant or pigment know to the skilled artisan that is not inconsistent with the goals of this disclosure. The photoprotective agent can be an ultraviolet blocking agent, such as are used in common sunscreens. The cosmetically active agent can include therapeutic agents such as anti-inflammatories or antibiotics, vitamins, steroids, extracts, enzymes, essential oils, or other agents that have a therapeutic effect on keratinous tissue. The cosmetic adjuvant can be an emollient, a moisturizer, a fiber, a preservative, a chelator, a fragrance, a neutralizing agent, or any combination thereof.

Keratinous tissue is defined herein as a keratin-containing tissue, such as hair or skin, or other tissues having keratin.

The powders and fillers can be polyamide particles, nylon fibers, polyethylene powders, microspheres based on acrylic copolymers, melamine-formaldehyde resin particles, urea-formaldehyde resin particles, poly(tetrafluoroethylene) particles, ethylene-acrylate copolymer powders, expanded powders, starch powders, and silicone resin microbeads.

In some embodiments, the cosmetic composition and adhesive cosmetic composition can be in the form of a non-compressed foundation powder or stick, a compressed foundation powder or stick, a cosmetic paste, mascara, lipstick, lip gloss, lip balm, nail polish, or a cosmetic cream.

IV. METHODS OF USING COSMETIC ADHESIVES

In another aspect, a method of preparing a cosmetic composition for keratinous tissue comprises formulating the cosmetic composition described in Section III.

In some embodiments, a method of adhering a cosmetic composition to keratinous tissue comprises disposing the cosmetic composition described in Section III on one or more keratinous tissue surfaces.

In another embodiment, a method of adhering lash extension hairs to a human subject, comprises applying and attaching lash extension hairs to the human subject's existing eyelashes or other keratinous tissue using the cosmetic composition described in Section III.

In some embodiments, a method of adhering lash extension hairs to a human subject comprises applying the cosmetic composition described in Section III to a lash extension hair; and attaching the lash extension hair to keratinous tissue of the human subject.

In another aspect, a nail polish composition comprises the cosmetic composition described in Section III. The nail polish composition can in some cases further comprise a hardener know to those skilled in the art.

In another aspect, a method of forming a nail polish coating upon a fingernail or toenail surface comprises applying the cosmetic composition described in Section III to a fingernail or toenail surface; and curing the applied composition.

In some embodiments, a method of mechanically and chemically attaching a nail polish coating to a fingernail or toenail surface comprises applying the cosmetic composition described in Section III to a fingernail or toenail surface; and curing the applied composition.

In another aspect, a liquid cosmetic composition comprises the cosmetic composition described in Section III, wherein after the composition has been applied to and dried on keratinous tissue, the liquid cosmetic composition has a refractive index of 1.3 to 1.8.

In another aspect, a method of using a cosmetic composition comprises applying the cosmetic composition described in Section III to a keratinous tissue of a person to form a film on the keratinous tissue. The applied film can be breathable. In some embodiments, the applied film is formed in situ on the keratinous tissue. The in situ formation of the film can occur at room temperature, temperatures higher than room temperature, or temperatures lower than room temperature. The applied film can be elastic, flexible, moisture permeable, oxygen permeable, or any combination thereof.

V. SELECTED EMBODIMENTS

Although the above description and the attached claims disclose a number of embodiments of the invention, other alternative aspects of the invention are disclosed in the following further embodiments.

Embodiment 1. An adhesive composition comprising:
an aqueous solvent; and
a population of first nanoparticles dispersed in the aqueous solvent,
wherein the first nanoparticles are negatively or positively charged; and
wherein the first nanoparticles have an average size in three dimensions of 1 nm to 1000 nm.

Embodiment 2. The composition of embodiment 1, wherein the nanoparticles are spherical or substantially spherical.

Embodiment 3. The composition of embodiment 1, wherein the population of first nanoparticles has an average zeta potential of less than −30 mV or greater than 30 mV.

Embodiment 4. The composition of embodiment 1, wherein the first nanoparticles are formed from a polymer.

Embodiment 5. The composition of embodiment 4, wherein the first nanoparticles are formed from a polyurethane, a polyester, or a polyacrylate.

Embodiment 6. The composition of embodiment 1, wherein the first nanoparticles have a first functional group attached to an exterior surface of the first nanoparticles.

Embodiment 7. The composition of embodiment 6, wherein the first functional group is a dopamine group, a tannin group, a clickable group, an N-Hydroxysulfosuccinimide group, a maleimide group, an ethyleneically unsaturated group, an aldehyde group, or a hydrosilane group.

Embodiment 8. The composition of embodiment 7, wherein the clickable group is an azide group or alkyne group.

Embodiment 9. The composition of embodiment 7, wherein the ethyleneically unsaturated group is an allyl group, acrylate group, or methacrylate group.

Embodiment 10. An adhesive composition comprising:
an aqueous solvent; and
a first polymer dispersed in the aqueous solvent,
wherein the first polymer is negatively or positively charged; and
wherein the first polymer is non-particulate.

Embodiment 11. The composition of embodiment 10, wherein the first polymer has a first functional group attached as a pendant group of the first polymer.

Embodiment 12. The composition of embodiment 11, wherein the first functional group is a dopamine group, a tannin group, a clickable group, an N-Hydroxysulfosuccinimide group, an ethyleneically unsaturated group, an aldehyde group, or a hydrosilane group.

Embodiment 13. The composition of embodiment 12, wherein the clickable group is an azide group or alkyne group.

Embodiment 14. The composition of embodiment 12, wherein the ethyleneically unsaturated group is an allyl group, acrylate group, or methacrylate group.

Embodiment 15. The composition of embodiment 1 further comprising:
a population of second nanoparticles dispersed in the aqueous solvent, the second nanoparticles differing from the first nanoparticles.

Embodiment 16. The composition of embodiment 15, wherein the second nanoparticles are oppositely charged compared to the first nanoparticles.

Embodiment 17. The composition of embodiment 10 further comprising:
a population of second nanoparticles dispersed in the aqueous solvent, wherein the second nanoparticles are oppositely charged compared to the first polymer.

Embodiment 18. The composition of embodiment 1 further comprising:
a second polymer dispersed in the aqueous solvent, the second polymer being non-particulate and oppositely charged compared to the first nanoparticles.

Embodiment 19. The composition of embodiment 10 further comprising:
a second polymer dispersed in the aqueous solvent, wherein the second polymer is non-particulate, wherein the second polymer differs from the first polymer, and wherein the second polymer is oppositely charged compared to the first polymer.

Embodiment 20. The composition of embodiment 15 or embodiment 17, wherein the second nanoparticles are formed from a polymer.

Embodiment 21. The composition of embodiment 15 or embodiment 17, wherein the second nanoparticles have a second functional group attached to an exterior surface of the second nanoparticles.

Embodiment 22. The composition of embodiment 21, wherein the second functional group is a dopamine group, a tannin group, a clickable group, an N-Hydroxysulfosuccinimide group, an ethyleneically unsaturated group, an aldehyde group, or a hydrosilane group.

Embodiment 23. The composition of embodiment 21, wherein the second functional group is selectively reactive with a first functional group attached to an exterior surface of the first nanoparticles.

Embodiment 24. The composition of embodiment 17, wherein the second functional group is selectively reactive with a first functional group attached as a pendant group to the first polymer.

Embodiment 25. The composition of any of the preceding embodiments further comprising a multivalent ion salt.

Embodiment 26. The composition of any of the preceding embodiments, wherein the solids content of the composition is up to 55% by weight solids, based on the total weight of the composition.

Embodiment 27. The composition of any of the preceding embodiments, wherein the composition has a dynamic viscosity of 10,000 cP or less.

Embodiment 28. A method of adhering biological materials, the method comprising:
disposing the composition of any of embodiments 1-27 in between a first surface of a first biological material and a second surface of a second biological material,
wherein the composition adheres the first surface of the first biological material to the second surface of the second biological material.

Embodiment 29. A method of sealing or closing an open region within human body tissue, the method comprising:
disposing the composition of any of embodiments 1-27 in the open region.

Embodiment 30. The method of embodiment 28 or embodiment 29 further comprising:
crosslinking the first nanoparticles or the first polymer of the composition.

Embodiment 31. The method of embodiment 30, wherein the first nanoparticles are crosslinked to themselves or the first polymer is crosslinked to itself.

Embodiment 32. The method of embodiment 30, wherein the composition comprises second nanoparticles and the first nanoparticles are crosslinked to the second nanoparticles or the first polymer is crosslinked to the second nanoparticles.

Embodiment 33. The method of embodiment 30, wherein the composition comprises a second polymer and the first nanoparticles are crosslinked to the second polymer or the first polymer is crosslinked to the second polymer.

Embodiment 34. The method of embodiment 28 or embodiment 29, wherein disposing the composition in between the first surface and the second surface or in the open region is carried out by injecting the composition from a single syringe.

Embodiment 35. The method of embodiment 28 or embodiment 29, wherein disposing the composition in between the first surface and the second surface or in the open region is carried out by injecting a first portion of the composition from a first syringe and injecting a second portion of the composition from a second syringe.

Embodiment 36. The method of embodiment 35, wherein the first and second portions of the compositions are injected simultaneously.

Embodiment 37. The method of embodiment 35, wherein the first and second portions of the compositions are injected sequentially.

Embodiment 38. The method of embodiment 28, wherein disposing the composition in between the first surface and the second surface is carried out by disposing a first portion of the composition on the first surface of the first biological material and disposing a second portion of the composition on the second surface of the second biological material, followed by contacting the first and second surfaces with one another.

Embodiment 39. The method of embodiment 28, wherein disposing the composition in between the first surface and the second surface is carried out by disposing a first portion of the composition and disposing a second portion of the composition on the first surface of the first biological material or on the second surface of the second biological material, followed by contacting the first and second surfaces with one another.

Embodiment 40. The method of any one of embodiments 35-39, wherein the first portion of the composition comprises first nanoparticles that are positively or negatively charged or a first polymer that is positively or negatively charged, and the second portion of the composition comprises second nanoparticles or a second nanoparticle that are charged oppositely compared to the first nanoparticles or the first polymer.

Embodiment 41. The method of embodiment 28 or embodiment 29, wherein disposing the composition in between the first surface and the second surface or in the open region is carried out by disposing the composition on one or more surfaces of an implant and then disposing the implant in between the first surface and the second surface or in the open region.

Embodiment 42. The method of embodiment 28, wherein the composition forms a water-tight seal between the first surface and the second surface.

Embodiment 43. The method of embodiment 29, wherein the composition forms a water-tight seal over the open region.

Embodiment 44. The method of embodiment 28, wherein the first surface and/or the second surface comprises or is formed from bone.

Embodiment 45. The method of embodiment 28, wherein the first surface and/or the second surface comprises or is formed from soft tissue.

Embodiment 46. The method of embodiment 28, wherein the first surface comprises or is formed from bone and the second surface comprises or is formed from soft tissue.

Embodiment 47. The method of embodiment 29, wherein the body tissue comprises or is formed from bone.

Embodiment 48. The method of embodiment 28, wherein the body tissue comprises or is formed from soft tissue.

Embodiment 49. The method of embodiment 28, wherein the body tissue comprises or is formed from bone and soft tissue.

Embodiment 50. A method of performing abdominoplasty, the method comprising:
disposing the composition of any of embodiments 1-27 in between a first surface of a first layer of abdominal tissue and
a second surface of a second layer of abdominal tissue, wherein the composition adheres the first surface of the first abdominal tissue to the second surface of the second layer of abdominal tissue.

Embodiment 51. The method of embodiment 50, wherein disposing the composition in between the first surface and the second surface is carried out by disposing the composition on one or more surfaces of an implant and then disposing the implant in between the first surface and the second surface.

Embodiment 52. A method of performing mastectomy, the method comprising:
disposing the composition of any of embodiments 1-27 in between a first surface of a first layer of breast tissue and a second surface of a second layer of breast tissue, wherein the composition adheres the first surface of the first breast tissue to the second surface of the second layer of breast tissue.

Embodiment 53. The method of embodiment 52, wherein disposing the composition in between the first surface and the second surface is carried out by disposing the composition on one or more surfaces of an implant and then disposing the implant in between the first surface and the second surface.

Embodiment 54. A method of adhering a biological material to an implant, the method comprising:
disposing the composition of any of embodiments 1-27 between a first surface of a first biological material or a first surface of a first medical implant and a second surface of a second medical implant or a second surface of a second biological material, respectively,
wherein the composition adheres the first surface to the second surface.

Embodiment 55. A method of adhering a biological material to an implant, the method comprising:
disposing the composition of any of embodiments 1-27 on one or more surfaces of the implant; and
contacting the one or more surfaces of the implant with the biological material.

Embodiment 56. The method of embodiment 54 or embodiment 55, wherein the implant is a surgical mesh or scaffold.

Embodiment 57. A method of treating a skin disease, disorder, or condition, the method comprising:
applying the composition of any of embodiments 1-27 to a surface of skin of a patient in need thereof.

Embodiment 58. A method of dressing a skin wound of a patient in need thereof, the method comprising:
applying the composition of any of embodiments 1-27 to the wound, thereby forming a liquid bandage from the composition.

Embodiment 59. A method of treating transsphenoidal leaks, the method comprising:
disposing the composition of any of embodiments 1-27 in a cranial space corresponding to a transsphenoidal leak, wherein the composition forms a water-tight seal of the leak.

Embodiment 60. A method of delivering a therapeutic factor to a biological environment, the method comprising:
disposing the composition of any of embodiments 1-27 in the biological environment, wherein the composition further comprises a therapeutic factor dispersed in the aqueous solvent of the composition.

Embodiment 61. A method of sealing an open region of dura matter and an open region of a skull of a patient in need thereof, the method comprising:
disposing the composition of any of embodiments 1-27 in the open region of the dura matter and the open region of the skull,
wherein the composition forms a water-tight seal of the open region of the dura matter and the open region of the skull.

Embodiment 62. The method of embodiment 61, wherein the composition is disposed in the open region of the dura matter and the open region of the skull simultaneously or substantially simultaneously in a single surgical procedure.

Embodiment 63. The method of embodiment 61, wherein disposing the composition in the open regions is carried out by injecting a first portion of the composition from a first syringe and injecting a second portion of the composition from a second syringe.

Embodiment 64. The method of embodiment 63, wherein the first and second portions of the compositions are injected simultaneously.

Embodiment 65. The method of embodiment 63, wherein the first portion of the composition comprises first nanoparticles that are positively or negatively charged or a first polymer that is positively or negatively charged, and the second portion of the composition comprises second nanoparticles or a second polymer that are charged oppositely compared to the first nanoparticles or the first polymer.

Embodiment 66. The method of embodiment 65, wherein the first portion and/or the second portion of the composition further comprises a therapeutically effective amount of an additional therapeutic material.

Embodiment 67. The method of embodiment 66, wherein the second portion of the composition further comprises hydroxyapatite particles.

Embodiment 68. The method of embodiment 67, wherein the first portion of the composition at least partially fills the open region of the dura matter, and the second portion of the composition at least partially fills the open region of the skull.

Embodiment 69. The method of any of embodiments 61-68 further comprising:
crosslinking the composition within one or both of the open regions.

Embodiment 70. A composition comprising a bioadhesive exhibiting delayed hardening or continuous hardening when disposed in a biological environment.

Embodiment 71. The composition of embodiment 70, wherein the delayed hardening is due to an increasing degree of internal crosslinking of the composition over time and/or increasing crosslinking between the composition and one or more surfaces of the surrounding biological environment.

Embodiment 72. The composition of embodiment 70, wherein the increasing degree of internal crosslinking of the composition over time is due to an increasing concentration or availability of a crosslinking initiator in or near the composition.

Embodiment 73. The composition of embodiment 72, wherein the crosslinking initiator comprises a photoinitiator or a click chemistry catalyst.

Embodiment 74. A cosmetic composition comprising:
an aqueous solvent;
a first polymer dispersed in the aqueous solvent; and
a cosmetically acceptable agent comprising one or more of:
a structuring agent,
a gelling agent,
a powder,
a filler,
an emulsifier,
a solid or liquid fatty agent, or
any combination thereof;
wherein the first polymer is negatively or positively charged; and
wherein the first polymer is non-particulate.

Embodiment 75. The cosmetic composition of embodiment 74, wherein the first polymer has a first functional group attached as a pendant group of the first polymer.

Embodiment 76. The cosmetic composition of embodiment 75, wherein the first functional group is a dopamine group, a tannin group, a clickable group, an N-Hydroxysulfosuccinimide group, a maleimide group, an ethyleneically unsaturated group, an aldehyde group, or a hydrosilane group.

Embodiment 77. The cosmetic composition of embodiment 76, wherein the clickable group is an azide group or alkyne group.

Embodiment 78. The cosmetic composition of embodiment 76, wherein the ethyleneically unsaturated group is an allyl group, acrylate group, or methacrylate group.

Embodiment 79. The cosmetic composition of embodiment 74 further comprising:
a population of second nanoparticles dispersed in the aqueous solvent, wherein the second nanoparticles are oppositely charged compared to the first polymer.

Embodiment 80. The cosmetic composition of embodiment 74 further comprising:
a second polymer dispersed in the aqueous solvent, wherein the second polymer is non-particulate, wherein the second polymer differs from the first polymer, and wherein the second polymer is oppositely charged compared to the first polymer.

Embodiment 81. An adhesive cosmetic composition comprising:
an aqueous solvent;
a population of first nanoparticles dispersed in the aqueous solvent; and
a cosmetically acceptable agent comprising one or more of:
a structuring agent,
a gelling agent,
a powder,
a filler,
an emulsifier,
a solid or liquid fatty agent, or
any combination thereof;
wherein the first nanoparticles are negatively or positively charged; and
wherein the first nanoparticles have an average size in three dimensions of 1 nm to 1000 nm.

Embodiment 82. The composition of embodiment 81, wherein the nanoparticles are spherical or substantially spherical.

Embodiment 83. The composition of embodiment 81, wherein the population of first nanoparticles has an average zeta potential of less than −30 mV or greater than 30 mV.

Embodiment 84. The composition of embodiment 81, wherein the first nanoparticles are formed from a polymer.

Embodiment 85. The composition of embodiment 84, wherein the first nanoparticles are formed from a polyurethane, a polyester, or a polyacrylate.

Embodiment 86. The composition of embodiment 81, wherein the first nanoparticles have a first functional group attached to an exterior surface of the first nanoparticles.

Embodiment 87. The composition of embodiment 86, wherein the first functional group is a dopamine group, a tannin group, a clickable group, an N-Hydroxysulfosuccinimide group, an ethyleneically unsaturated group, an aldehyde group, or a hydrosilane group.

Embodiment 88. The composition of embodiment 87, wherein the clickable group is an azide group or alkyne group.

Embodiment 89. The composition of embodiment 87, wherein the ethyleneically unsaturated group is an allyl group, acrylate group, or methacrylate group.

Embodiment 90. The composition of embodiment 81 further comprising:
a population of second nanoparticles dispersed in the aqueous solvent, the second nanoparticles differing from the first nanoparticles.

Embodiment 91. The composition of embodiment 90, wherein the second nanoparticles are oppositely charged compared to the first nanoparticles.

Embodiment 92. The composition of embodiment 81 further comprising:
a second polymer dispersed in the aqueous solvent, the second polymer being non-particulate and oppositely charged compared to the first nanoparticles.

Embodiment 93. The composition of embodiment 90, wherein the second nanoparticles are formed from a polymer.

Embodiment 94. The composition of embodiment 90, wherein the second nanoparticles have a second functional group attached to an exterior surface of the second nanoparticles.

Embodiment 95. The composition of embodiment 90, wherein the second functional group is selectively reactive with a first functional group attached to an exterior surface of the first nanoparticles.

Embodiment 96. The composition of any of embodiments 81-101 further comprising:

a multivalent ion salt.

Embodiment 97. The cosmetic composition of any of embodiments 74-96, wherein the solids content of the composition is up to 55% by weight solids, based on the total weight of the composition.

Embodiment 98. The cosmetic composition of any of embodiments 74-97, wherein the composition has a dynamic viscosity of 10,000 cP or less.

Embodiment 99. The cosmetic composition of embodiments 74-98, wherein the composition is a non-compressed foundation powder or stick, a compressed foundation powder or stick, a cosmetic paste, mascara, lipstick, lip gloss, lip balm, nail polish, or a cosmetic cream.

Embodiment 100. The cosmetic composition of any of embodiments 74-99, wherein the cosmetically acceptable agent further comprises a colorant, a pigment, a photoprotective agent, a secondary film-former, a cosmetically active agent or a cosmetic adjuvant, or any combination thereof.

Embodiment 101. The cosmetic composition of embodiment 100, wherein the cosmetic adjuvant is an emollient, a moisturizer, a fiber, a preservative, a chelator, a fragrance, a neutralizing agent, or any combination thereof.

Embodiment 102. The cosmetic composition of any of embodiments 74-101, wherein the powders and fillers are polyamide particles, nylon fibers, polyethylene powders, microspheres based on acrylic copolymers, melamine-formaldehyde resin particles, urea-formaldehyde resin particles, poly(tetrafluoroethylene) particles, ethylene-acrylate copolymer powders, expanded powders, starch powders, and silicone resin microbeads.

Embodiment 102. A method of preparing a cosmetic composition for keratinous tissue comprising formulating the composition of any of embodiments 74-101.

Embodiment 103. A method of adhering a cosmetic composition to keratinous tissue comprising:
disposing the composition of any of embodiments 74-101 on one or more keratinous tissue surfaces.

Embodiment 104. A method of adhering lash extension hairs to a human subject, comprising:
applying and attaching lash extension hairs to the human subject's existing eyelashes or other keratinous tissue using the composition of any of embodiments 1-27 and 74-101.

Embodiment 105. A method of adhering lash extension hairs to a human subject, comprising:
applying the composition of any of embodiments 1-27 and 74-101 to a lash extension hair;
attaching the lash extension hair to keratinous tissue of the human subject using the composition.

Embodiment 106. A nail polish composition comprising: the composition of any of embodiments 1-27 and 74-101.

Embodiment 107. The nail polish composition of embodiment 106, further comprising a hardener.

Embodiment 106. A method of forming a nail polish coating upon a fingernail or toenail surface comprising:
applying the composition of any of the embodiments of 1-27 and 74-101 to the fingernail or toenail surface; and curing the applied composition.

Embodiment 107. A method of mechanically and chemically attaching a nail polish coating to a fingernail or toenail surface comprising:
applying the composition of any of the embodiments of 1-27 and 74-101 to the fingernail or toenail surface; and curing the applied composition.

Embodiment 108. A liquid cosmetic composition comprising:
a composition of any of embodiments 1-27 and 74-101, wherein after the composition has been applied to and dried on keratinous tissue, the composition has a refractive index of between about 1.3 to 1.8.

Embodiment 109. A method of using a cosmetic composition, comprising:
applying a composition of any of embodiments 1-27 and 74-101 to a keratinous tissue of a person to form a film on the keratinous tissue.

Embodiment 110. The method of embodiment 109, wherein the film is breathable.

Embodiment 111. The method of embodiment 109, wherein the film is formed in situ on the keratinous tissue.

Embodiment 112. The method of embodiment 111, wherein the in situ formation of the film occurs at room temperature.

Embodiment 113. The method of embodiment 109, wherein the film is elastic, flexible, moisture permeable, oxygen permeable, or any combination thereof.

Embodiment 114. The method of embodiment 119, wherein the applied film minimizes, flattens, and/or reduces wrinkles, facial lines, and/or sun-damaged skin.

Embodiment 115. A method of treating a skin ailment comprising:
topically administering to a subject in need thereof, a therapeutically effective amount of a composition comprising:
a primary polyamine (e.g., an aliphatic (as opposed to aromatic) primary polyamine),
a secondary polyamine (e.g., an aliphatic secondary polyamine),
an polyisocyanate (e.g., an aliphatic polyisocyanate),
a primary polyol (e.g., an aliphatic primary polyol),
a secondary polyol (e.g., an aliphatic secondary polyol), and
a ionizable polyol (e.g., an aliphatic ionizable polyol);
wherein the skin ailment comprises at least one of the ailments selected from the group consisting of psoriasis, bites or stings, burns, sores, hemorrhoids, anal sphincter muscle tears, and cuts and scrapes; and
wherein the composition further comprises an antibacterial, antifungal and/or antiviral medicament, and
wherein at least one of the primary polyamine, the secondary aromatic polyamine and the polyol reacts with the polyisocyanate to form a poly(urea-urethane) prepolymer.

Some embodiments described herein are further illustrated in the following non-limiting examples.

Example 1

Functional Diols with Alkyne Group (D1, X, Y=—O—, $R_6$=—H) and Azide Groups (D6, X=—O—)

Propargyl 2,2-bis(hydroxylmethyl) propionate (D1, X, Y=—O—, $R_6$=—H) was synthesized according to Lu et al., *J. Polym. Sci. Part A: Polym. Chem.* 2007, 45, 3204-3217, and Shi et al., Biomaterials 2008, 29, 1118-1126. Briefly, certain amount of 2, 2-bis (hydroxymethyl) propionic acid and KOH were added to dried N, N-dimethylformamide (DMF), the mixture was stirred at 100° C. until a transparent solution was formed. The reaction temperature was then reduced to 45° C., followed by the addition of propargyl bromide for further reaction. After removing DMF and excess propargyl bromide under vacuum at 80-120° C., the crude product was dissolve in DI water, and extracted with dichloromethane (DCM) or chloroform, the combined organic phase was then dried by anhydrous MgSO$_4$ or Na$_2$SO$_4$, filtered and the solvent was removed by rotary evaporation, the final product (yellow liquid) was then put under vacuum for at least 3 days before use.

2, 2-Bis(azidomethyl)propane-1,3-diol (D6, X=—O—) was synthesized according to the process described in Zhang et al., Macromolecules 2011, 44, 1755-1759, and Xu et al., Macromolecules 2011, 44, 2660-2667. Briefly, certain amount of 2, 2-bis(bromomethyl) propane-1, 3-diol and sodium azide (NaN$_3$) were mixed in DMF. The mixture was stirred at 120° C. overnight. After removing DMF, the crude product was then dissolved in another solvent, the solid byproducts were filtered and the solvent was removed by rotary evaporation. The crude product was then dissolved in a solvent, and extract by saturated NaCl solution. The organic phase was separated and dried by anhydrous MgSO$_4$ or Na$_2$SO$_4$, filtered and the solvent was removed by rotary evaporation, the final product (yellow liquid) was then put under vacuum for at least 3 days before use.

Example 2

WPU with Positive Charge (WPU$^+$) and Dopamine (DP) Functionalized WPU with Positive Charge (WPU$^+$-DP)

WPU$^+$ and WPU$^+$-DP were prepared with the following components and amounts:

TABLE 1

WPU$^+$ and WPU$^+$-DP reaction components.

| Raw materials | WPU$^+$ | | WPU$^+$-DP | |
|---|---|---|---|---|
| | Amount/g | Wt % (%) | Amount/g | Wt % (%) |
| Isophorone diisocyanate (IPDI) | 10.03 | 31.3 | 10.03 | 30.79 |
| Poly(ε-caprolactone) diol, 994 Da | 17.89 | 55.91 | 17.89 | 54.91 |
| Poly(ethylene glycol) diol, 1000 Da | 2.00 | 6.25 | 2.00 | 6.14 |
| Pentaerythritol (PTTO) | 0.10 | 0.3 | 0.10 | 0.30 |
| 1, 4-Butanediol (BDO) | 0.42 | 1.31 | 0.42 | 1.29 |
| N-Methyl-diethanolamine (MDEA) | 1.20 | 3.75 | 1.00 | 3.07 |
| Dopamine hydrochloride | 0 | 0 | 1.14 | 3.50 |
| Hydrochloric acid (HCl) | 0.36 | 1.13 | 0 | 0 |
| Total polymer | 32.00 | 100.00 | 32.58 | 100.00 |
| Water | 48 | — | 50 | — |
| Solid content, % | 40.00% | | 39.45% | |

WPU$^+$ was synthesized by reacting polyol and polyisocyanate. N-methyl-diethanolamine (MDEA) was used as a chargeable diol and was converted by hydrochloric acid (HCl) into quaternary ammonium salt to make the obtained polyurethane water dispersible. Briefly, certain amount of poly(ε-caprolactone) (ε-PCL) diol (weight average molecular weight (Mw)=994 Da), poly(ethylene glycol) (PEG) diol (Mw=1000 Da), and pentaerythritol (PTTO) were charged into a 100-mL two-neck round-bottom flask. The mixture was then melted and dried under vacuum (40 mmHg) at 90° C. for 2 hours with stirring. After reducing the temperature to 60° C., isophorone diisocyanate (IPDI) and tin(II) 2-ethylhexanoate (Sn(OCt)$_2$) were added in and the reaction was continued at 60° C. for 1 hour. 10 mL of dried acetone was added to dissolve the mixture when the stir bar stop stirring, the stirring speed was kept at around 300 rpm. Then 1, 4-butanediol (BDO) and N-methyl-diethanolamine (MDEA) was added in with another 10 mL of dried acetone, and the reaction was continued at 60° C. for another hour. After reaction, the polymer solution was removed to a 250-mL beaker, and 10 mL 1M HCl was added in the beaker under stirring, then 38 mL distilled (DI) water was slowly dropped in the beaker, and simultaneously, the polymer solution was dispersed into water using a high shear dispersing machine under a shearing speed of 1000 to 2000 rpm for 5 minutes. Then acetone was removed using a rotary evaporator and WPU$^+$ dispersion with a calculated solid content of 40.0 wt % was obtained.

WPU$^+$-DP was synthesized through a similar process as WPU$^+$, the difference is after the reaction between polyol and polyisocyanate, the obtained branch polyurethane capped with isocyanate groups was further react with dopamine to obtain dopamine modified PU, which was then dispersed into water to give WPU$^+$-DP dispersion. Briefly, ε-PCL diol (Mw=994 Da), PEG diol (Mw=1000 Da), and PTTO were charged into a 100-mL two-neck round-bottom flask. The mixture was then melted and dried under vacuum (40 mmHg) at 90° C. for 2 hours with stirring. After reducing the temperature to 60° C., IPDI and Sn(OCt)$_2$ were added in and the reaction was continued at 60° C. for 1 hour. 10 mL of dried acetone was added to dissolve the mixture. Then BDO and MDEA was added in with another 10 mL of dried acetone, and the reaction was continued for another hour. Dopamine hydrochloride (6 mmol) and dried acetone were then added in to react for another 4 hours. And 50 mL DI water was slowly dropped in the obtained polymer solution under a high shear dispersing machine (such as mechanical stirrer). Then acetone was removed using a rotary evaporator and WPU$^+$-DP dispersion with a calculated solid content of 39.5 wt % was obtained.

Example 3

WPU with Negative Charge (WPU$^-$) and Tannic Acid Functionalized WPU with Negative Charge (WPU$^-$-DP)

Waterborne polyurethane with negative charge (WPU$^-$) and WPU$^-$ modified with tannic acid (WPU$^-$-TA) were prepared with the following components and amounts:

TABLE 2

| | WPU⁻ | | WPU⁻-TA | |
|---|---|---|---|---|
| Raw materials | Amount (g) | Wt % (%) | Amount (g) | Wt % (%) |
| Isophorone diisocyanate (IPDI) | 10.03 | 30.76 | 10.03 | 29.75 |
| Poly(ε-caprolactone) diol, 994 Da | 17.89 | 54.86 | 17.89 | 53.07 |
| Poly(ethylene glycol) diol, 1000 Da | 2.0 | 6.13 | 2.0 | 5.93 |
| Dimethylol propionic acid (DMPA) | 1.27 | 3.89 | 0.90 | 2.67 |
| 1, 4-Butanediol (BDO) | 0 | 0 | 0.60 | 1.79 |
| Tannic acid (TA) | 0 | 0 | 0.85 | 2.52 |
| Dimethylaminoethanol (DMAE) | 0.84 | 2.58 | 0.60 | 1.78 |
| Ethylene diamine (EDA) | 0.58 | 1.78 | 0.25 | 0.74 |
| Total polymer | 32.61 | 100 | 33.71 | 100 |
| Water | 50 | — | 50 | — |
| Solid content, % | 39.47% | | 40.27% | |

Waterborne polyurethane with negative charge (WPU⁻) was synthesized through a reaction between polyol and polyisocyanate, dimethylol propionic acid (DMPA) was used as a chargeable diol and was converted into negative charged group by treating with dimethylaminoethanol (DMAE) to make the obtained polyurethane water dispersible. Briefly, ε-PCL diol (Mw=994 Da) and PEG diol (Mw=1000 Da) were charged into a 100-mL two-neck round-bottom flask. The mixture was then melted and dried under vacuum (40 mmHg) at 90° C. for 2 hours with stirring. IPDI and Sn(OCt)$_2$ were added in and the reaction was continued at 60° C. for 1 hour. Then DMAP was added and the reaction was continued at 60° C. for another hour. After reaction, DMAE was added in under stirring. Then 50 mL DI water was slowly dropped in the beaker, and simultaneously, the polymer solution was dispersed into water under stirring for 5 minutes. Ethylene diamine was added in as a chain extender to react with the unreacted —NCO terminal groups. Then solvent was removed and WPU⁻ dispersion with a calculated solid content of 39.47 wt % was obtained.

Tannic acid (TA) modified WPU with negative charge (WPU⁻-TA) was synthesized similar to the above synthesis process of WPU⁻. Briefly, ε-PCL diol (Mw=994 Da) and PEG diol (Mw=1000 Da) were charged into a 100-mL two-neck round-bottom flask. The mixture was then melted and dried under vacuum (40 mmHg) at 90° C. for 2 hours. IPDI and Sn(OCt)$_2$ were added in and the reaction was continued at 60° C. for 1 hour. Then DMAP and BDO were added in, and the reaction was continued at 60° C. for another hour. TA was then added in with 20 mL dried acetone, and the reaction was continued for another 2 hours. After reaction, DMAE was added under stirring. Then DI water was slowly dropped in the beaker and sheared for 5 minutes. EDA was added in as a chain extender to react with the unreacted —NCO terminal groups. Then acetone was removed and WPU⁻-TA dispersion with a calculated solid content of 40.27 wt % was obtained.

Example 4

Positive Charged WPU with Alkyne Groups (WPU⁺-Al) and Negative Charged WPU with Azide Groups (WPU⁻-N$_3$)

Positive charged WPU with alkyne groups (WPU⁺-Al) and negative charged WPU with azide groups (WPU⁻-N$_3$) were prepared with the following components and amounts:

TABLE 3

| | WPU⁺-Al | | WPU⁻-N$_3$ | |
|---|---|---|---|---|
| Raw materials | Amount (g) | Wt % (%) | Amount (g) | Wt % (%) |
| Isophorone diisocyanate (IPDI) | 10.03 | 32.05 | 10.03 | 31.66 |
| Poly(ε-caprolactone) diol, 990 Da | 17.82 | 56.95 | 17.82 | 56.25 |
| Poly(ethylene glycol) diol, 200 Da | 0.4 | 1.28 | 0.4 | 1.26 |
| Pentaerythritol (PTTO) | 0.1 | 0.32 | 0.1 | 0.32 |
| Dimethylol propionic acid (DMPA) | 0 | 0 | 1.1 | 3.47 |
| N-Methyl-diethanolamine (MDEA) | 1.1 | 3.52 | 0 | 0 |
| 1, 4-Butanediol (BDO) | 0.2 | 0.64 | 0.2 | 0.63 |
| Al diol (D1, X, Y = —O—, R$_6$ = —H) | 1.0 | 3.20 | 0 | 0 |
| Azide diol (D6, X = —O—) | 0 | 0 | 1.0 | 3.16 |
| Dimethylaminoethanol (DMAE) | 0 | 0 | 0.73 | 2.30 |
| Hydrochloric acid (HCl) | 0.34 | 1.09 | 0 | 0 |
| Ethylene diamine (EDA) | 0.3 | 0.96 | 0.3 | 0.95 |
| Total polymer | 31.29 | 100 | 31.68 | 100 |
| Water | 48 | — | 48 | — |
| Solid content, % | 39.46% | | 39.76% | |

The synthesis of positive charged WPU with alkyne functional group (WPU⁺-Al) was similar to that of WPU⁺, propargyl 2,2-bis(hydroxylmethyl) propionate (D1, X, Y=—O—, $R_6$=—H, synthesis process is shown in Example 1) was used as functional diol with alkyne group (Al diol), and added in the polyurethane synthesis. $WPU^+$-Al dispersion with a calculated solid content of 39.46 wt % was obtained.

The synthesis of negative charged WPU with azide functional group ($WPU^-$-$N_3$) was similar to that of $WPU^-$, 2,2-bis(azidomethyl)propane-1,3-diol (D6, X=—O—, synthesis process is shown in Example 1) was used as functional diol with azide group (azide diol), and added in the polyurethane synthesis. $WPU^-$-$N_3$ dispersion with a calculated solid content of 39.76 wt % was obtained.

Clickable diol with alkyne group can also be introduced into WPU with negative charge to obtain $WPU^-$-Al, and similarly, clickable diol with azide group can also be introduced into WPU with positive charge to obtain $WPU^+$-$N_3$.

Example 5

Synthesis of Clickable Diol with Propiolate (PL, —COC≡CH) Group and Negative Charged WPU with Propiolate Groups ($WPU^-$-PL)

Figure 10:
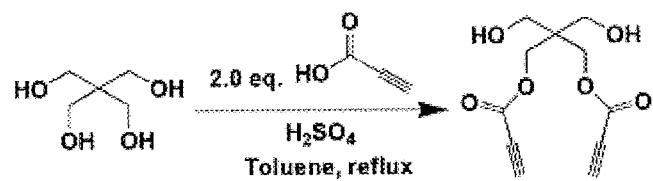
FIG. 10 shows a synthesis of a clickable diol with a propiolate (PL, —COC≡CH) group.
Figure 11:
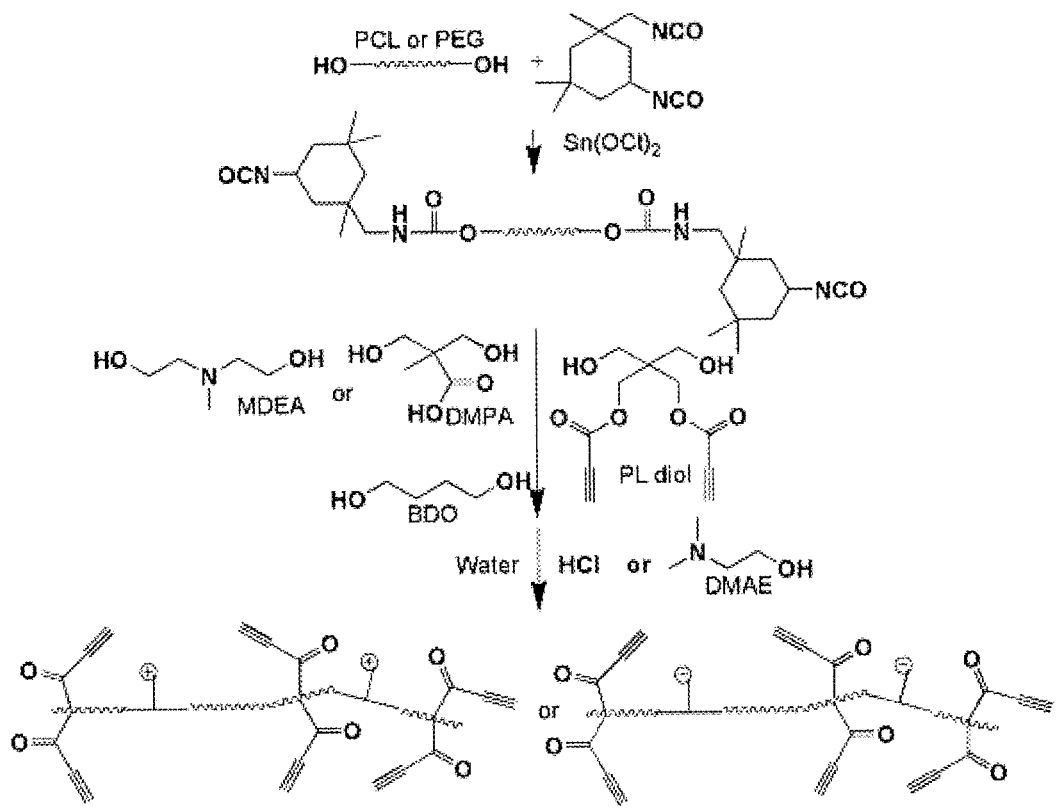
FIG. 11 shows introduction of the clickable diol with the propiolate described in FIG. 10 into $WPU^+$ or $WPU^-$.

Referring to FIG. 10, clickable diol with PL group (PL diol, D5) was synthesized similar to literatures (Tsotsalas M, et. al. *J Am Chem Soc* 2014, 136, 8-11; and Guo J, et. *Biomaterials*, 2017, 112, 275-286.). Briefly, pentaerythritol (PTTO) and propiolic acid were dissolved in 120 mL toluene. Sulfuric acid ($H_2SO_4$) was added as a catalyst. The mixture was heated to 125° C. to reflux for 24 hours. After reaction, toluene was removed. Crude product was re-dissolved in ethyl acetate. The solution was washed with sodium bicarbonate ($NaHCO_3$) solution and a brine solution. The organic layer was dried over anhydrous $MgSO_4$, filtered, and the remaining solvent was removed by rotary evaporation, the final product was obtained as slightly yellow oil (91% yield). PL diol can be introduced into WPU with positive or negative charge (FIG. 11).

Clickable diol with PL group was used as a mall molecular diol and introduced into WPU with negative charge to obtain WPU-PL, using the following components and amounts:

TABLE 4

$WPU^-$-PL reaction components.

| Raw materials | $WPU^+$-Al | |
|---|---|---|
| | Amount (g) | Wt % (%) |
| Isophorone diisocyanate (IPDI) | 10.03 | 30.98 |
| Poly(ε-caprolactone) diol, 990 Da | 17.82 | 55.03 |
| Poly(ethylene glycol) diol, 200 Da | 0.4 | 1.24 |
| Dimethylol propionic acid (DMPA) | 1.1 | 3.40 |
| 1, 4-Butanediol (BDO) | 0.2 | 0.62 |
| PL diol (D5) | 1.8 | 5.56 |
| Dimethylaminoethanol (DMAE) | 0.73 | 2.25 |
| Ethylene diamine (EDA) | 0.3 | 0.93 |
| Total polymer | 32.38 | 100 |
| Water | 49 | — |
| Solid content, % | | 39.79% |

The synthesis of $WPU^-$-PL was similar with that of $WPU^-$, PL diol (D5) was used as functional diol with PL group, and added in the polyurethane synthesis. Briefly, ε-PCL diol (Mw=990 Da) and PEG diol (Mw=200 Da) were charged into a 100-mL two-neck round-bottom flask. The mixture was then melted and dried and the temperature was reduced the 60° C. IPDI and $Sn(OCt)_2$ were added in and the reaction was continued at 60° C. for 1 hour. DMPA, BDO and PL diol were added in with acetone, and the reaction was continued at 60° C. for another 2 hour. After reaction, DMAE was added and then DI water was slowly dropped under stirring for 5 minutes. EDA was added in as a chain extender to react with the unreacted —NCO terminal groups. Then acetone was removed using a rotary evaporator and $WPU^-$-PL dispersion with a calculated solid content of 39.79 wt % was obtained.

Example 6

Waterborne Injectable Citrate-Based Mussel-Inspired Bioadhesives Using PEG-PPG-PEG as Diol and Treated with $CaCO_3$ (iCMBA-EPE-$Ca^{2+}$)

iCMBA-EPE-$Ca^{2+}$ was prepared with the following components and amounts:

TABLE 5 iCMBA-EPE-$Ca^{2+}$ reaction components.

| Raw materials | iCMBA-EPE-$Ca^{2+}$ Amount (g) |
|---|---|
| Citric acid (CA) | 9.22 |
| PEG-PPG-PEG (1100 Da) | 44 |
| Dopamine•HCl | 2.28 |
| Calcium carbonate ($CaCO_3$) | excess |

Waterborne iCMBA-EPE-$Ca^{2+}$ was synthesized by a facial one-pot catalyst-free and solvent-free polycondensation reaction between citric acid (CA), poly(ethylene glycol)-poly(propylene glycol)-poly(ethylene glycol) (PEG-PPG-PEG) diol, and dopamine, according to our previous work (Yang J, et al. *Adv. Mater.* 2004, 16, 511-516.), following by treating the obtained polymer with excess calcium carbonate ($CaCO_3$) to convert the side carboxyl groups on the polymer chain into ions to make it waterborne (FIG. 14).

Example 7

Application of WPU as Liquid Bandage

WPU, either $WPU^+$ or $WPU^-$, with or without functional groups, such as the ones synthesized in above examples, can be used as liquid bandage for small cut, scrapes, burns, rashes and skin irritations to protect and promote wound healing after solvent evaporation. Liquid bandage is a kind of wound dressing. Solid bandages are always unable to fully cover the wound area especially when the wound is in joint area. Due to the elasticity and flexibility, excellent adhesion to the skin, the liquid form of liquid bandage is able to be applied to complex contour of body surfaces and provide more reliable and long-lasting barrier to wound from outside dust and microbes. The water-proof property as well as the water vapor/air transmissible property of polyurethane-urea liquid bandage are also beneficial for wound healing process. Compared to the commercially available sting solvent-based liquid bandage, such as New Skin (3M), WPU liquid bandage, as water-based formulation, is non-sting and more user-friendly.

Example 8

Crosslinking of WPU$^+$-DP and WPU$^-$-TA by 2% Sodium Periodate (NaIO$_4$, PI) and Mechanical, Water Absorption Tests WPU$^+$-DP or WPU$^-$-TA was crosslinked by 2 wt % PI and water was evaporated to make a uniform polymer film, at the same time polymer film without crosslinking was also prepared. The mechanical property and water absorption (swelling ratio) property of polymer films with and without crosslinking were tested. PI can be directly added to the WPU$^+$-DP or WPU$^-$-TA solution or can be first encapsulated into another particles or carriers to mix with WPU$^+$-DP or WPU$^-$-TA solution. The latter method (PI in nanoparticles) serves as a way to further slow down the release of PI to post-crosslinking WPU$^+$-DP or WPU$^-$-TA.

The mechanical properties were tested according to ASTM D412A using Instron mechanical test machine (Norwood, MA). The polymer film samples at both dry were cut into strips (25 mm×6 mm×1.5 mm, length×width×thickness), placed in the mechanical tester, and pulled to failure at a rate of 500 mm/min. The water absorption (water swelling ratio) was measured by the mass differential before and after incubation of the polymer film in water as described previously (Mehdizadeh M, et. *Biomaterials*, 2012, 33, 7972-7983; Guo J, et. *Biomaterials*, 2016, 85, 204-217.). The swelling ratio was then calculated using the following equation:

$$\text{Swelling ratio } (\%) = \frac{W_s - W_d}{W_d} \times 100.$$

Figure 16A:
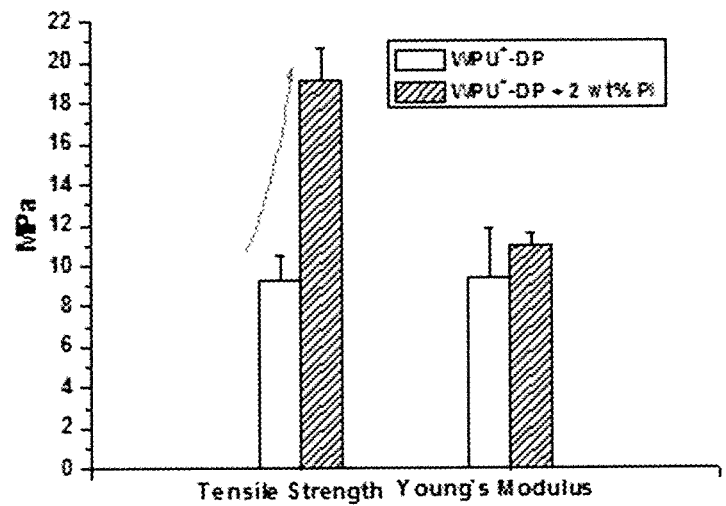
FIGS. 16A-16D graphically show mechanical and water absorption data of $WPU^+$-DP polymer films with and without PI crosslinking.
Figure 16B:
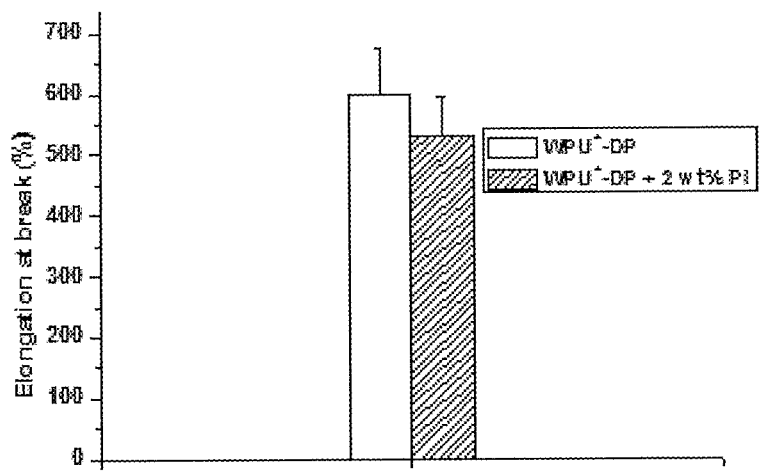
Figure 16C:
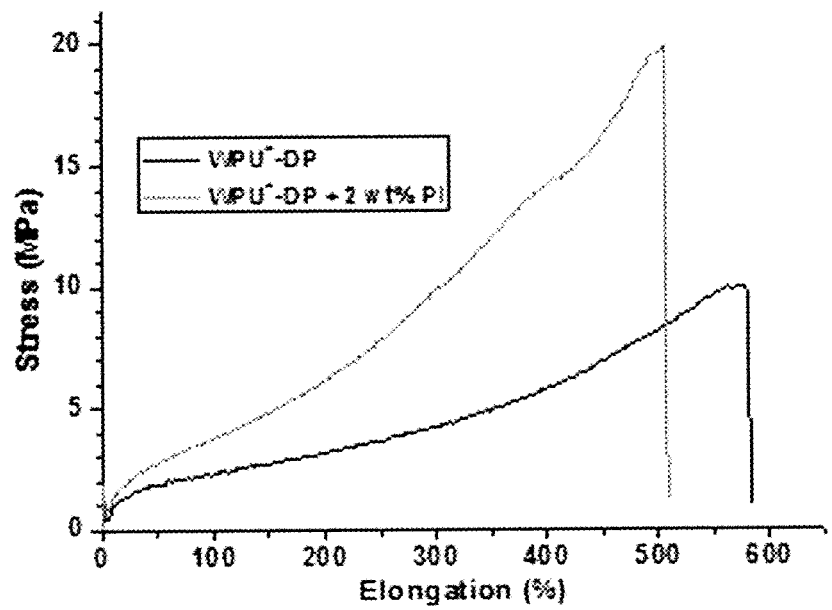
Figure 16D:
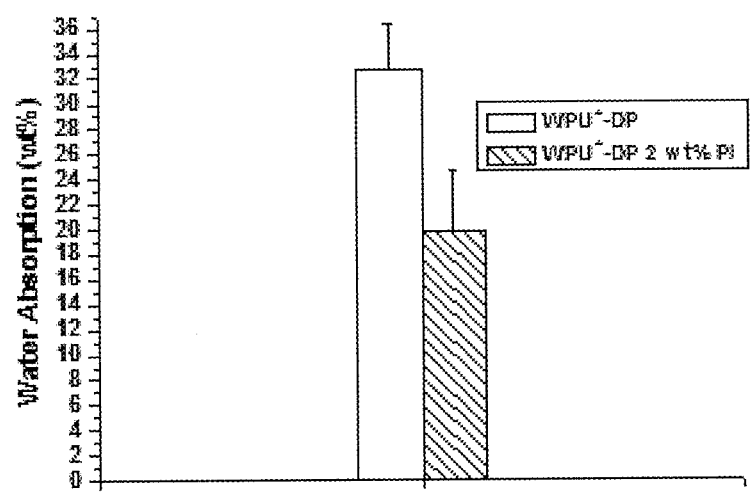
Figure 17A:
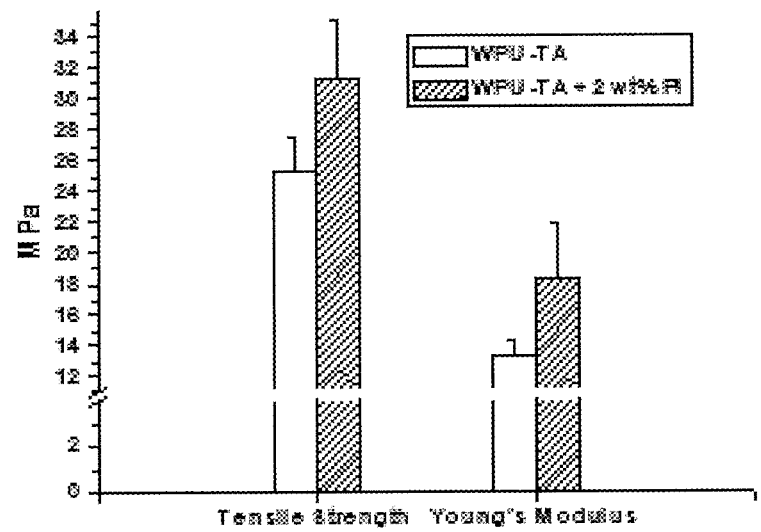
FIGS. 17A-17D graphically show mechanical and water absorption data of $WPU^-$-TA polymer films with and without PI crosslinking.
Figure 17B:
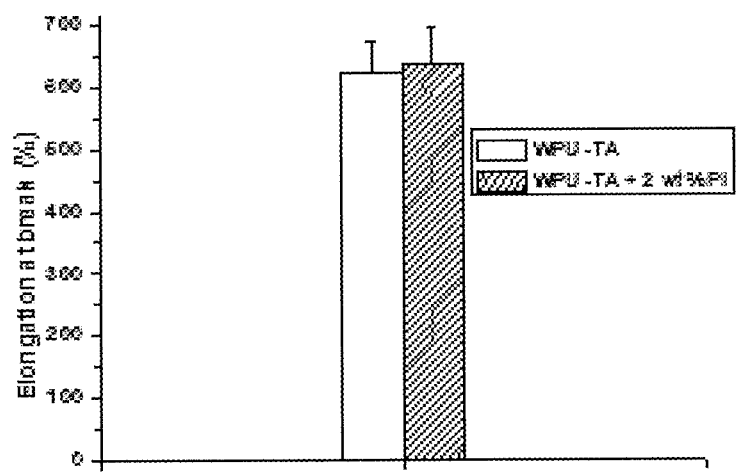
Figure 17C:
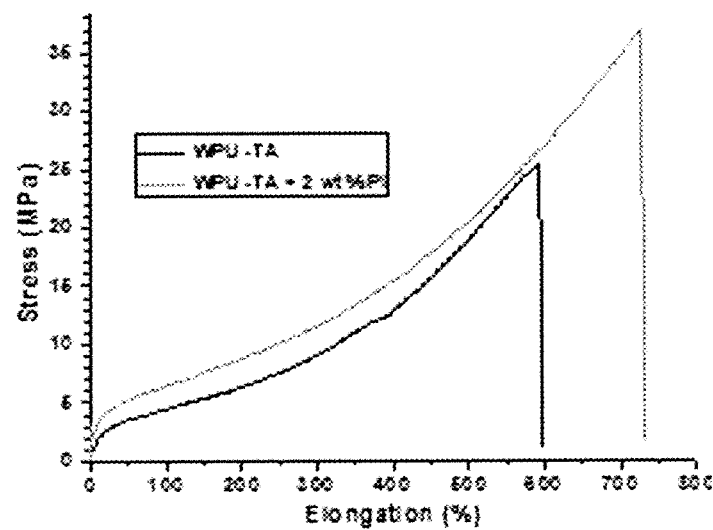
Figure 17D:
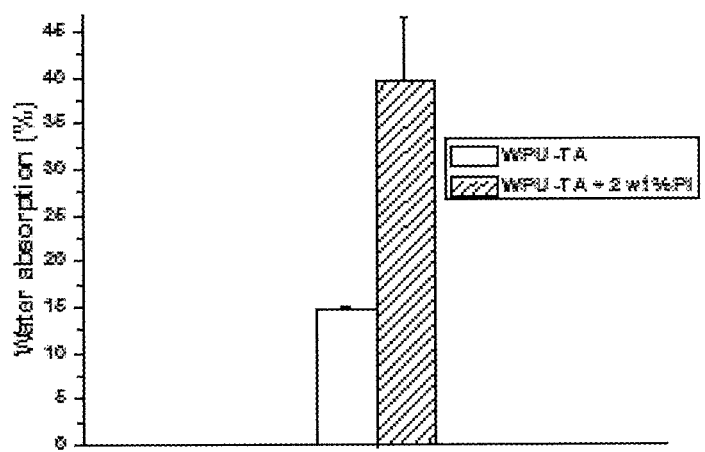

Here $W_d$ represents the weight of dried polymer film, and $W_s$ represents the network weight after the dried polymer film was suspended in water for 24 hours. The mechanical and water absorption data of WPU$^+$-DP and WPU$^-$-TA polymer films with and without PI crosslinking is shown in FIGS. 16A to 17D. FIG. 16A shows the tensile strength and Young's modulus change of WPU$^+$-DP polymer films before and after crosslinking by 2 wt % PI; FIG. 16B shows the elongation change; FIG. 16C shows the representative tensile curves; and FIG. 16D shows the water absorption (also known as water swelling ratio) change. FIG. 12 shows the mechanical strength and water absorption ratio change of WPU$^-$-TA (synthesis process shown in FIG. 4 and Example 3) polymer film before and after crosslinking with 2 wt % sodium periodate (PI) (Example 7). FIG. 17A shows the tensile strength and Young's modulus change of WPU$^-$-TA polymer films before and after crosslinking by 2 wt % PIF; FIG. 17B shows the elongation change; FIG. 17 C shows the representative tensile curves; and FIG. 17D shows the water absorption (water swelling ratio) change. The phenomenon of water absorption increase after WPU$^-$-TA was crosslinked by PI may be caused by the increase of hydrophilicity of tannic acid moiety after oxidation (see Example 9).

Example 9

English Ivy-Inspired Tissue Adhesive Composed by WPU$^+$ and WPU, Crosslinking by Ion Interaction and the Gel Time Test English ivy-inspired tissue adhesives can be realized by mixing WPNDs/polymer solution with opposite charges together. For example, the mixing of WPU$^+$ and WPU$^-$. WPU$^+$ and WPU$^-$ polymer dispersions, with a solid content of 40 wt % and 39.47 wt % respectively, were synthesized according the processes described in Examples 2 and 3 respectively. The AB formulation tissue adhesive was designed to contain WPU$^+$ and WPU$^-$ polymer dispersions with a 1/1 (w/w) ratio. The gel time test was conducted using a tilting test according to the previous literatures (Guo J, et al. *Biomaterials*, 2016, 85, 204-217; Guo J, et. *Biomaterials*, 2017, 112, 275-286.). The gel time record started from the mixing of 1 g WPU+ and 1 g of WPU$^-$ in a 10-mL plastic tube, the time of the mixture stop flowing down when the tube was tilted upside down was recorded as gel time or set time. The setting of these tissue adhesive formulations is often very fast, and can be set in less than 10 s.

Example 10

Dual Crosslinkable Tissue Adhesive Composed by WPU$^+$-Al and WPU$^-$-N$_3$ Crosslinked by Ion Interaction, or Ion Interaction and Click Reaction, the Lap Shear Strength Test and Water Absorption Test WPU$^+$-Al and WPU$^-$-N$_3$ with a solid content of 39.46 wt % and 39.76 wt % respectively, were synthesized according the processes described in Example 4. For this WPU$^+$-Al and WPU$^-$-N$_3$ AB formulation, the crosslinking process only by using ion interaction is the same as that of WPU$^+$ and WPU$^-$ formulation described in Example 7.

For the crosslinking of WPU$^+$-Al and WPU$^-$-N$_3$ by ion interaction and click reaction, copper catalyst was used. Copper sulfate (CuSO$_4$) and sodium L-ascorbate (NaLAc) were pre-dissolved in WPU$^+$-Al and WPU$^-$-N$_3$ respectively to give component A and B, Cu(I) ion that used as the catalyst for 1, 3-dipolar copper-catalyzed azide-alkyne cycloaddition (CuAAC, click reaction) was formed in situ upon the mixing of component A and B. Ion crosslinking can be finished in several seconds, while click reaction takes a little longer time. Therefore ion interaction can be used to provide an initial adhesion and polymer crosslinking and click reaction can serve as a secondary crosslinking to slowly improve cohesion and adhesion strength after ion interaction crosslinking. The biphasic crosslinking mechanism to improve adhesion and cohesive strength in a relayed manner is unique. Copper sulfate (CuSO$_4$) and sodium L-ascorbate (NaLAc) may also be first encapsulated into carriers such as particles before mixing with WPU$^+$-Al and WPU$^-$-N$_3$ thus to further achieve a slower release of catalysts for WPU$^+$-Al and WPU$^-$-N$_3$ crosslinking via click chemistry.

The lap shear strength of WPU$^+$-Al and WPU$^-$-N$_3$ AB formulation tissue adhesive, crosslinked by ion interaction with/without click reaction, was measured according the method of ASTM standard F2255-05 and literature (Mehdizadeh M, et. *Biomaterials*, 2012, 33, 7972-7983.). Briefly, foil slides with a 50×25×0.1 mm were used as specimen holders. And strips of porcine-derived, acellular small intestine submucosa (SIS) material (OASIS, HealthPoint Ltd. Fort Worth, TX) with 40×4 mm dimension were adhered onto foil slides using superglue (Glorilla, Impact-tough formula) and were allow to dry for ~1 hour. Then acellular SIS material attached foil slides were pre-soaked in phosphate buffered saline (PBS) at 25° C. for 1 hour before testing. Component A and B were then applied on and smeared evenly on two slides with one component on one slide, and the two slides were overlapped together with a contact area of 25×10 mm. The adhered strips were then placed in a humid chamber with a humidity of 50±5% for 2 hours. The lap shear strength of bonded strips specimens were subsequently measured using Instron mechanical tester (Norwood, MA) fitted with a 10 N load cell at a constant crosshead speed of 5 mm/min. the data was recorded, for each sample, at least 6 specimens were tested and the results were averaged.

Figure 18A:
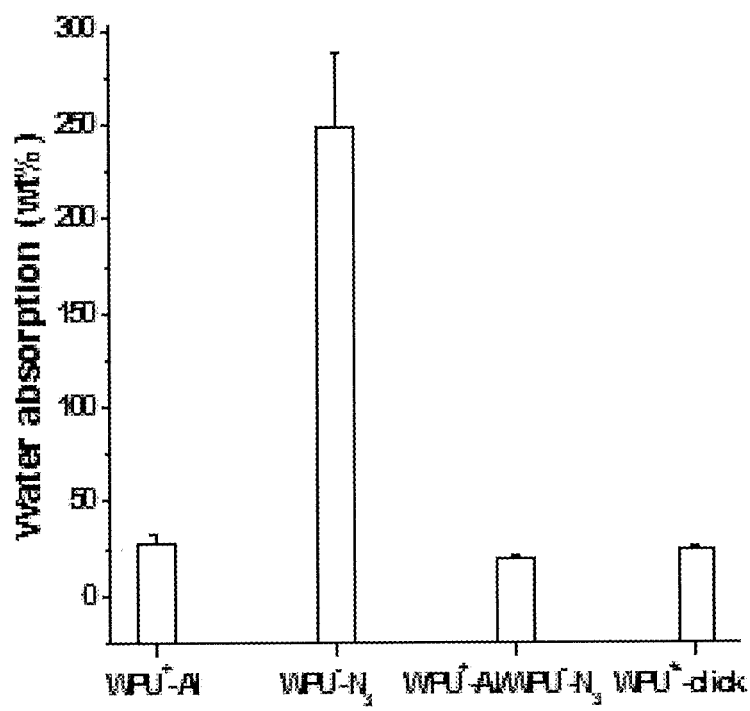
FIG. 18A shows water absorptions of $WPU^+$-Al and $WPU^-$-$N_3$ formulations crosslinked by ion interaction and ion interaction plus click reaction.
Figure 18B:
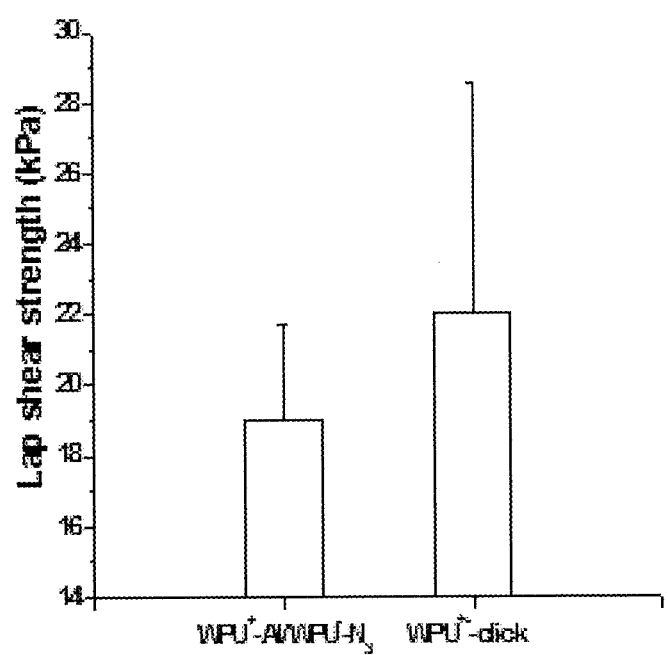
FIG. 18B shows lap shear strengths of $WPU^+$-Al and $WPU^-$-$N_3$ formulations crosslinked by ion interaction and ion interaction plus click reaction.

The water absorption (swelling ratio) properties of WPU$^+$-Al and WPU$^-$-N$_3$ crosslinked by ion interaction, ion interaction and click reaction, was tested and calculated according the same process described in Example 6. The water absorption and lap shear strength test results are shown in FIGS. 18A and 18B.

Example 11

Antimicrobial Property of WPU$^+$ and WPU Dispersions and WPU$^+$, WPU$^-$, and Ion Interaction Crosslinked WPU$^+$+WPU$^-$ Polymer Films The antimicrobial property of WPU$^+$ and WPU$^-$ dispersions was tested using Gram-positive and Gram-negative bacteria, *Staphylococcus aureus* (*S. aureus*, ATCC No. 6538) and *Escherichia coli* (*E. coli*, ATCC No. 8739) as models, according to United States Pharmacopeia (USP) <51> (Antimicrobial effectiveness testing) and literatures (Guo J, et. *Biomaterials*, 2016, 85, 204-217; Guo J, et. *Biomaterials*, 2017, 112, 275-286). Briefly, freshly cultured microorganism suspensions are centrifuged at 5000 rpm for 10 minutes to remove the broth media. 2 mL of test WPU polymer dispersions is added to make the microorganism suspension with a final concentration in the range of 1×10$^{-1}$×10$^6$ CFU/mL (CFU: colony forming unit). At the same time, a control sample is prepared by dispersing the centrifuged microorganisms in 2 mL broth media. A DI water (non-sterile) sample was prepared by dispersing the centrifuged microorganisms in 2 mL DI water. The initial microorganism concentration in CFU/mL was determined by plate-count method, plate counts was conducted using duplicate plates. Then the microorganisms containing samples in the sealed vials are incubated at 32.5±2.5° C. and sampled at day 1 and day 4. The number of viable microorganisms CFU/ml present at each of these sampling intervals is determined by the plate-count method. Using the calculated concentrations of CFU/mL at the start of the test, calculate the change in log$_{10}$ values of the concentration of CFU/mL for test sample at day 1 and day 4, and express the changes in terms of log reduction values (LRVs) according to the following equation:

Log reduction value(LRV)=Log$_{10}N_0$-Log$_0N_t$

Here, N$_0$ is the average number of microorganism at the start of the test, N$_t$ is the average number of microorganism at time t. For each sample, at least five parallel experiments are conducted and the calculated results are averaged.

The antimicrobial property of WPU$^+$, WPU$^-$, and ion crosslinked WPU$^+$+WPU$^-$ polymer films was also tested according ASTM F1608-00 and ATCC Test Method 100-2012: Antimicrobial finishes on textile materials, using *S. aureus* and *E. coli* as microorganism models. First, WPU$^+$, WPU$^-$, and WPU$^+$+WPU$^-$ polymer films were prepared by casting polymer dispersions or dispersion mixture with 2 g total solid into a Teflon dish with diameter of 60 mm. Then polymer film samples (Φ55 mm) are stacked and placed into sterile petri dishes (Φ100 mm). Sterile petri dishes without any sample are set as control. 1 mL bacteria suspension with a concentration of 1×10$^5$ CFU/mL is placed onto the top of the film, and allowed to wick through the sample stack. The inoculated samples was incubated for 24 hour at 32.5±2.5° C. During the incubation, two sterile cotton balls absorbed with sterile water are placed at the side of the sample to maintain the humidity. 24 hours later, sterile broth is added to each container and the containers are shaken for 1 minute to release the inoculum from the test samples into broth media. Serial dilutions are made followed by plate incubation. After incubation, the recovered colonies are counted and used to determine percentage reductions. Percentage reductions are determined by comparing each test sample after the contact time to the control sample immediately after inoculation. The calculation equation for percentage reduction is listed below:

$$\text{Percentage reduction } (\%) = \frac{N_c \times T_c - N_s \times T_s}{N_c \times T_c} \times 100\%$$

Here, N$_c$ is the colony numbers for control, N$_s$ is the colony numbers for test sample; T$_c$ is the dilution times for control, and T$_s$ is the dilution times for test sample. The results of the test showed a reduction in the number of *S. aureus* and *E. coli*.

Example 12

Biphasic Glue (BP Glue) for the Treatment of Cerebrospinal Fluid (CSF) Leak to Seal Dura and Skull Simultaneously Aleo BME™'s biphasic glue (BP Glue) is a technology composed of biodegradable injectable citrate-based mussel-inspired bioadhesive (iCMBA), hydroxyapatite (HA), and English ivy inspired, waterborne biodegradable polymers such as polyurethane (WPU) adhesive. iCMBA was transferred into waterborne iCMBA with negative charge and calcium ion as counter ion (iCMBA-Ca$^{2+}$) by treating with CaCO$_3$, as described in Example 5. WPU with positive (WPU$^+$) or negative (WPU$^-$) charge both can be used to form ion interaction with iCMBA-Ca$^{2+}$.

Figure 19:
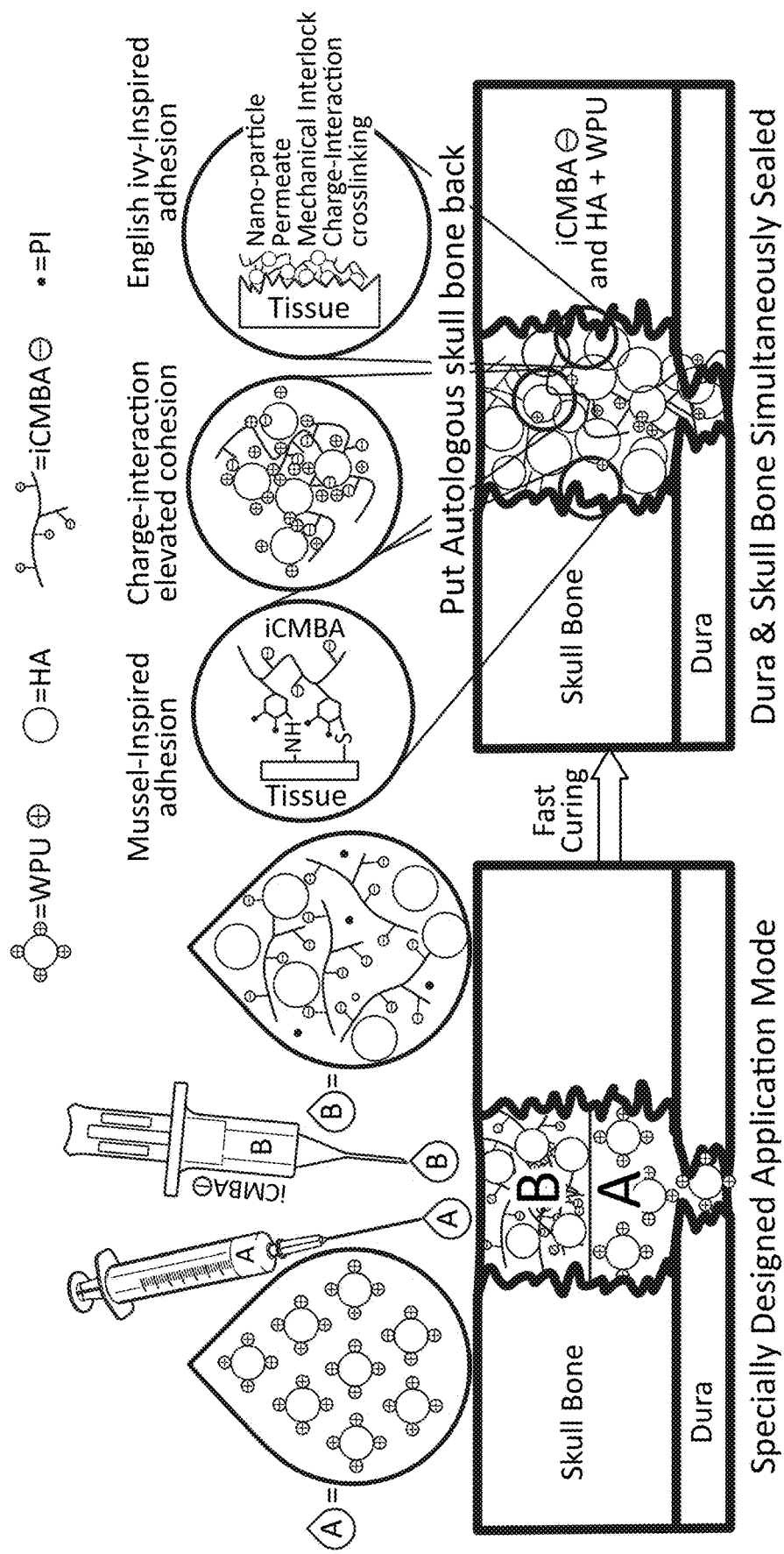
FIG. 19 is an illustrative view of an adhesive composition being used to repair a cerebrospinal fluid (CSF) leak repair by sealing dura and skull defects simultaneously.
Figure 20:
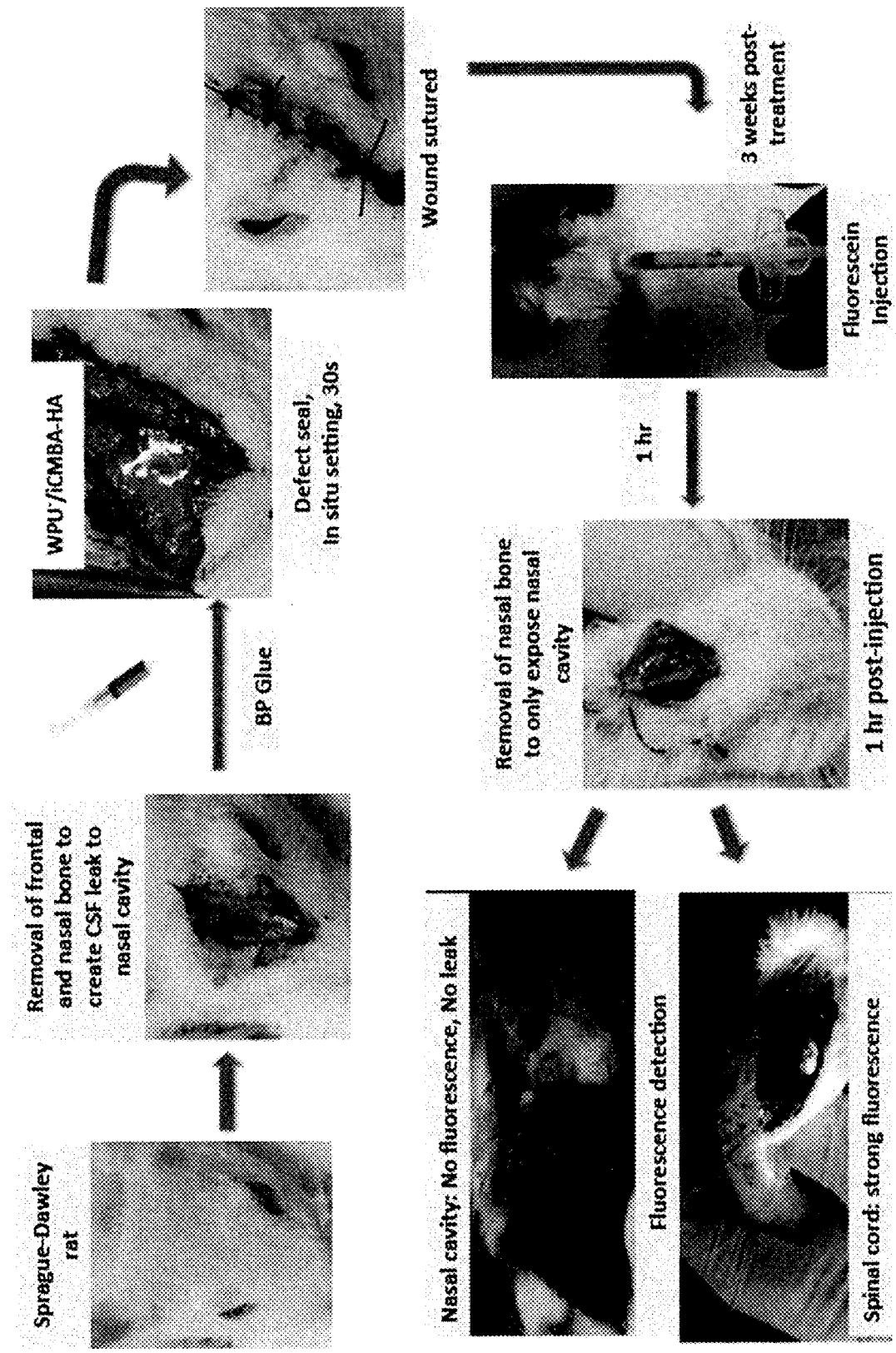
FIG. 20 shows the experimental process of an adhesive composition being used as a sealant for CSF leak prevention in a CSF rhinorrhea model.

For proof of concept, a CSF rhinorrhea model on Sprague-Dawley rat was used to evaluate the feasibility of using BP Glue as a sealant for CSF leak prevention. The implantation, post-surgical fluorescein injection, and fluorescence-based leak detection are shown in FIG. 20. Briefly, the cribriform plate that separates the olfactory bulb from the nasal mucosa anteriorly was penetrated with a metal-tip tool to open the space between the brain and nasal region, creating a significant CSF leak. BP Glue, composed of iCMBA-Ca$^{2+}$ (30 wt % in water), WPU$^+$ or WPU$^-$ (solid content ~40 wt %), and HA (30% to the weight of total solid), was applied in the defect using disposable pipettes. Component A, composed by WPU$^+$ or WPU$^-$, was applied first, and component B, including iCMBA-Ca$^{2+}$, HA and a sodium periodate initiator (PI), was applied later. And then component A and B were mixed together. The working protocol (FIGS. 19 and 20) of BP Glue for dura and bone repair involves application of the A component on top of the leaky dura to allow WPU nanoparticles to interact and penetrate the dural tissue, much as English ivy begins to first adhere to a wall. The B component is then layered upon component A and along the edges of the skull defect. The mixing of A and B will result in rapid gelation within 20 seconds. The previously removed skull plate may then be placed in the defect and any excess mixed gel that may be present will be squeezed out along the edges. The PI initiated iCMBA crosslinking facilitates the bonding of skull plate with the surrounding bone to promote bone fusion. The gelation of A and B accelerates the coalescence of WPU nanoparticles on the surface of dura to establish a mechanically interlocking interface.

Three weeks following implantation, 50 μL of fluorescein was injected into the cistema magna to cause fluorescence throughout the central nervous system. The spinal cord was then analyzed under black light to determine localization of fluorescein in the CSF, demonstrating successful fluorescein injection in the CNS. The rats were sacrificed and the nasal mucosa was subsequently dissected and analyzed under black light for fluorescence. The nasal mucosa of the control rats in which the cribriform defect had not been repaired with BP Glue exhibited intense fluorescence in the mucosa. The mucosa of the rats that were treated with the BP Glue showed no fluorescence, demonstrating effective repair of the CSF leak. Other formulations, including $WPU^-+WPU^+$/HA, $WPU^++WPU^-$/HA, $WPU^++WPU^-$, et. al. were also tested.

Example 13

Cosmetic Application of Adhesive Composition

WPU+ and WPU$^-$ polymer dispersions, with a solid content of 40 wt % and 39.47 wt % respectively, were synthesized according the processes described in Example 2 and 3 respectively. WPU+ and WPU$^-$ polymer dispersions can be used as nail polish, eyelash extension adhesives, and keratinous tissue coatings or skin simulants. For example, WPU+ and WPU− polymer dispersions alone or in combination can be applied on nails to form dry nail polish with 3 min after applications or applied as an adhesive for eyelash extension. The WPU nail polish is elastic and peelable and the eyelash can be adhered well on the eyelash using the WPU adhesives.

Example 14

Burst Strength of WPU+ and WPU− Polymer Dispersions

WPU+ and WPU$^-$ polymer dispersions ("$WPU^{+/-}$ dispersion"), with a solid content of 40 wt % and 39.47 wt % respectively, were synthesized according the processes described in Example 2 and 3 respectively. A burst strength test was conducted according to ASTM F2392-04 using the $WPU^{+/-}$ dispersion and were compared with the burst strengths of DuraSeal® and Tisseel®.

In general, cranial CSF pressures average approximately 15 mm Hg and spinal CSF pressures average approximately 30 mm Hg, with pressure spikes that may reach at least 45 mm Hg. Following the general procedure outlined in the ASTM test, an approximate 1 mm thick layer of $WPU^{+/-}$ dispersion sealant was able to withstand an average burst pressure well over three times the hyper physiological levels that may be generated in the spine, with an average burst pressure of 160 mm Hg. All failures from $WPU^{+/-}$ dispersion sealant were cohesive, in that the sealant material itself failed, demonstrating very strong tissue adherence, while the DuraSeal® and Tisseel® showed low average burst pressure of 8.3 and 3 mm Hg, respectively. However, the failures from DuraSeal® and Tisseel® were adhesive rather than cohesive, where the failure was the separation of the material from the tissue itself ("adhesion"), rather than failure of the material itself ("cohesion"). This demonstrates that in contrast to $WPU^{+/-}$ dispersion sealant's strong tissue adherence, DuraSeal® and Tisseel® (fibrin glue) exhibit weak tissue adherence.

Figure 21:
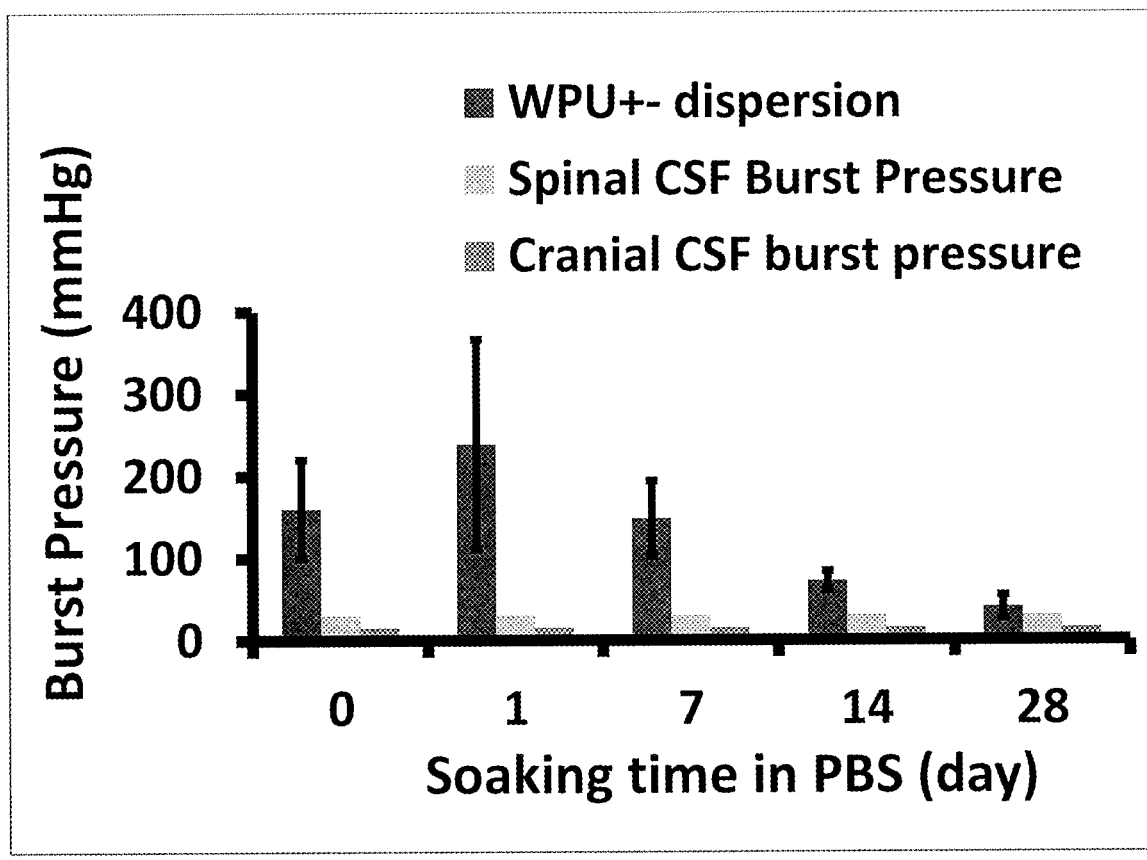
FIG. 21 shows the comparison of burst pressure of WPU+/− dispersion sealants with the spinal CSF pressure and the cranial CSF pressure.

Although initial burst pressure measurements do indicate the intraoperative strength of a sealant, a hydrogel must maintain a high level of performance post-operatively until the neodura can sufficiently contain CSF on its own. To determine the ability of $WPU^{+/-}$ dispersion sealant to maintain a high level of performance once implanted, the approximately 1 mm thick hydrogel sealant spanning the 3 mm diameter hole in the collagen casing was incubated in 37° C. PBS pH 7.4 for up to 8 weeks before it was mounted on the test fixture. One day after soaking, $WPU^{+/-}$ dispersion sealant reached its maximum burst strength performance, averaging 230 mm Hg. Over the course of three to four weeks, the sealant continued to maintain pressures above physiological levels that may be experienced in the spine demonstrating that $WPU^{+/-}$ dispersion can withstand representative spikes in CSF pressure up to 45 mm Hg for approximately three weeks, as shown in FIG. 21.

Example 15

Lap-Shear of WPU$^+$ and WPU$^-$ Polymer Dispersions

WPU+ and WPU− polymer dispersions ("$WPU^{+/-}$ dispersion"), with a solid content of 40 wt % and 39.47 wt % respectively, were synthesized according the processes described in Example 2 and 3 respectively. A lap-shear test was conducted according to ASTM F2255-05 using the $WPU^{+/-}$ dispersion and were compared with the lap-shear of Tisseel®.

Under the ASTM protocols, $WPU^{+/-}$ dispersion sealant showed 6 folds greater wet porcine tissue lap shear strength (35.35±7.11 kPa) than fibrin glue (5.47±1.47 kPa).

Example 16

Hydrolytic and Enzymatic Degradation of WPU+ and WPU− Polymer Dispersions

WPU+ and WPU− polymer dispersions ("$WPU^{+/-}$ dispersion"), with a solid content of 40 wt % and 39.47 wt % respectively, were synthesized according the processes described in Example 2 and 3 respectively. Accelerated hydrolytic degradation rates of $WPU^{+/-}$ dispersion sealant and its component polymers were evaluated by measuring the mass loss for up to 8 weeks. Before tests, adhesive sealant and its component polymers were dried under vacuum. 50-mg dry samples (n=6) were incubated in 1 ml phosphate buffered saline (PBS) on incubator at 60° C. At each time point, samples were removed from the buffer, rinsed in deionized water, dried under vacuum for 24 h, and weighed. The medium was not changed until the targeted time point to minimize phase separation errors resulting from disintegration of the scaffold at later time points. At each time point, pH values of medium were measured.

Degradation of polyurethane is usually significantly faster under in vivo conditions compared to in vitro conditions, suggesting that enzymatic or oxidative reactions mediate degradation in vivo. For enzymatic degradation, materials were incubated in the presence of cholesterol esterase (CE). Short-term in vitro degradation rates were evaluated under static conditions and the enzyme media were replaced every 3 or 4 days (which was necessary to maintain enzyme activity) and the mass loss was measured at predetermined times for 4 weeks. 50-mg samples (n=6) were incubated in 1 ml phosphate buffered saline (PBS) containing CE at 37° C. The enzyme cholesterol esterase (CE) concentration, determined from previous literature as well as by the solubility limits of the enzymes in the media, was 1 U/mL.

A number of enzymes were studied for polyether-polyurethanes (PEU) degradation. Although enzymes like elastase have been shown to be effective for degradation of polyurethane, cholesterol esterase (CE) was the enzyme showing the highest activity toward these polymers. Medium that contained high CE microenvironment representative of the macrophage-material interface had a more significant effect on the polyurethane degradation rates. The differences in trending mass loss between the hydrolysis and enzymatic degradation medium were quite large. In hydrolysis, 4 week accelerated hydrolysis at 60° C. is plotted to be equivalent to 1-year normal hydrolysis at room temperature. The predicted full mass loss of WPU$^{+/-}$ dispersion at current formulations takes about two and half year in normal condition. However, the trend of enzymatic degradation indicates the predicted full mass loss of WPU$^{+/-}$ dispersion would be taken place at around 400 days, which is much faster than normal hydrolysis. The above results suggest that WPU$^{+/-}$ dispersion can maintain long stability (>2 years) but can in some instances degrade faster in vivo, an important character as a water-born degradable medical device which requires long shelf-life but relatively faster in vivo degradation depending on their applications.

Example 17

Particle Size and Zeta Potential of WPU+ and WPU− Polymer Dispersions

WPU+ and WPU⁻ polymer dispersions ("WPU$^{+/-}$ dispersion"), with a solid content of 40 wt % and 39.47 wt % respectively, were synthesized according the processes described in Example 2 and 3 respectively. Dynamic light scattering measurement was performed using the zetasizer Nano ZS (Malvern Instruments, UK). The analysis yields the z-average of the sample, which is an intensity weighted mean diameter of the bulk population and the polydispersity index, which is a measure for the width of the size distribution.

Particle size was found to play a role in determining the polymeric solutions' stability and the rate at which a strong mechanical interlocking is formed between the WPU$^{+/-}$ dispersion sealant and the natural tissue. WPU$^{+/-}$ dispersion sealant showed an average particle size of 120.9 nm in the WPU+ nanodispersion and an average of 76.5 nm in the WPU⁻ nanodispersion. The nanoparticles in WPU$^{+/-}$ dispersion sealant have a zeta potential in the range of ±30~±60 mV, which is ideal for maintaining stable dispersion.

Particle packing theory has been demonstrated as classical theory in cement/concrete industry. The various performance attributes such as strength, workability, dimensional stability and durability against adverse environmental conditions, and can be achieved by rationally proportioning the particle size distribution, especially for multi-phases system. In this disclosure, particle size of A and B components in WPU$^{+/-}$ dispersion can also significantly influence the mechanical (adhesive and cohesive) properties of the sealant, and the particle packing theory can be used to direct the design of WPU$^{+/-}$ dispersion in the AB formulation.

Figure 22B:
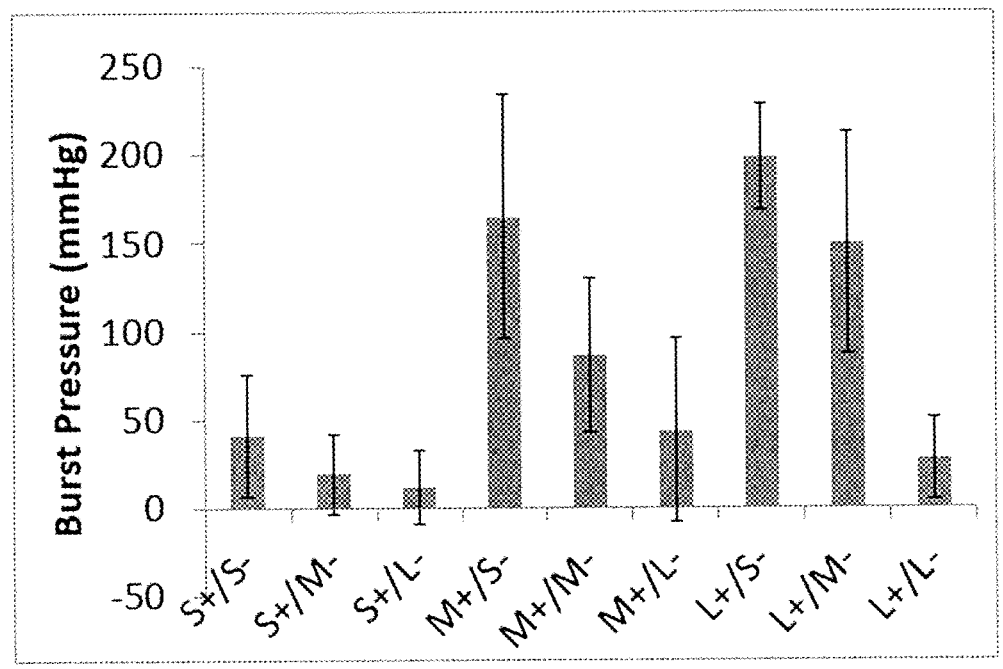
FIG. 22B shows influence of mismatched particle sizes on burst strength of an adhesive composition (S+: particle size=120.9 nm, zeta potential=55 mV; S−: particle size=76.52 nm, zeta potential=−52 mV; M+: particle size=146.2 nm, zeta potential=18 mV; M−: particle size=113.4 nm, zeta potential=−34 mV; L+: particle size=367.1 nm, zeta potential=46 mV; L−: particle size=120 nm, zeta potential=−24 mV)

FIG. 22B illustrates burst pressures of mismatched particle packing of WPU+ with a larger size and WPU⁻ with a smaller size, where S+ has a particle size=120.9 nm, zeta potential=55 mV; S− has a particle size=76.52 nm, zeta potential=−52 mV; M+ has a particle size=146.2 nm, zeta potential=18 mV; M− has a particle size=113.4 nm, zeta potential=−34 mV; L+ has a particle size=367.1 nm, zeta potential=46 mV; and L− has a particle size=120 nm, zeta potential=−24 mV.

As illustrated in FIG. 22B, mismatched particle packing of WPU+ and WPU− provides a closed packing structure that facilitates better fusion and packing among particles, which greatly increases the density and mechanical strength of the WPU+/− dispersion sealant. While WPU$^{+/-}$ dispersion sealants with lower size differences showed improved burst strength, WPU$^{+/-}$ dispersion sealants with larger size differences showed the higher burst strength. The three highest burst strengths among the formulations investigated comprised formulations with size and zeta potential differences of 367−77=290 nm and 46+52=98 mV for L+/S−, 367−113=254 nm and 46+34=80 mV for L+/M−, and 146−77=69 nm and 18+52=70 mV for M+/S−, respectively. The formulations with negative particle sizes higher than 100 nm (113 nm for M− and 120 nm for L−) yielded significantly reduced burst pressure (L+/S− vs. L+/M−; S+/S− vs. S+/M−; M+/S− vs. M+/L−). The formulations with positive particle sizes less than 140 nm (S+) all yielded very low burst pressure (<50 mmHg). M+/M− with size difference of 146−113=33 nm and zeta potential difference of 18+34=52 mV still yielding a considerably strong burst pressure of 87 mmHg. However, S+/M− with particle size difference of 120−113=7 nm and zeta potential difference of 55+34=89 mV yielded very low burst pressure of 19.5 mmHg. Therefore, the above results surprisingly suggest that particle sizes and particle size differences are important factors determining sealant performance in terms of burst pressure.

For instance, particle size differences of less than 30 nm yield decreasing burst pressures, whereas particle size differences of larger than 30 nm yield increasing burst pressures. Even more surprising is, at least for the specific compositions tested, the highest burst pressures where achieved when positive particles had a size around 140 nm, and when negative particles had a size lower than 100 nm. Equally surprising is, at least for the specific compositions tested, is that burst pressures were lower when the negative particles had sizes around 140 nm, and the positive particles had a size lower than 100 nm.

Example 18

Water Uptake and Dimensional Changes of WPU+ and WPU− Polymer Dispersions

WPU+ and WPU− polymer dispersions ("WPU$^{+/-}$ dispersion"), with a solid content of 40 wt % and 39.47 wt % respectively, were synthesized according the processes described in Example 2 and 3 respectively. To measure water uptake, sealant samples were created by pipetting A-B solutions (WPU+ and WPU−) into a Teflon mold (Length×width×thickness=9.5×7.8×2.5 mm) to self-cure into hydrogels for 15 min. The resultant hydrogel samples are used immediately after setting as "fresh as-prepared sealant samples" for incubation in PBS (pH 7.4) at 37° C. for 1, 5, 12 days and water update (percent swelling) were recorded and calculated. The hydrogel samples were also completely dried (as dry sealant samples) via vacuum drying and then incubated in PBS for 1, 5, 12 days and then water update (percent swelling) were recorded and calculated. Although direct measurements of the change in dimension were difficult to measure due the irregular shape of samples after setting the WPU$^{+/-}$ dispersions, the following formula was used to relate the percent swelling to the percent change in dimension by assuming uniform dimensional change in each axis and a sample density approximating 1.0 g/cc:

$$\{[\% \text{ Swelling}_t/100\%+1]^{1/3}-1\}100\%=\% \Delta S_t$$

where % Swelling$_t$=percent swelling as a function of time t, and % $\Delta S_t$=percent change in dimension (S) as a function of time t.

In general, once the surgical sealant is applied to dura tissues, the sealant should have minimal swelling to avoid potential inflammatory response and other neurological complications when applied to defective dural tissues. For example, synthetic polymers like the polyethylene glycol (PEG)-based DuraSeal (for dural sealing) have high swelling ratios (~400% weight changes, which is equivalent to about 637% dimensional changes), which pose a serious risk to CSF leak and the maintenance of intracranial pressure. It is worth noting that a recent case report showed that the application of DuraSeal resulted in a serious post-surgical complication, DuraSeal-hematoma to the patient who underwent delayed functional deterioration. Magnetic resonance imaging (MRI) demonstrated that the hydrogel-based sealant entrapped extradural bleeding causing spinal cord compression.

Figure 23:
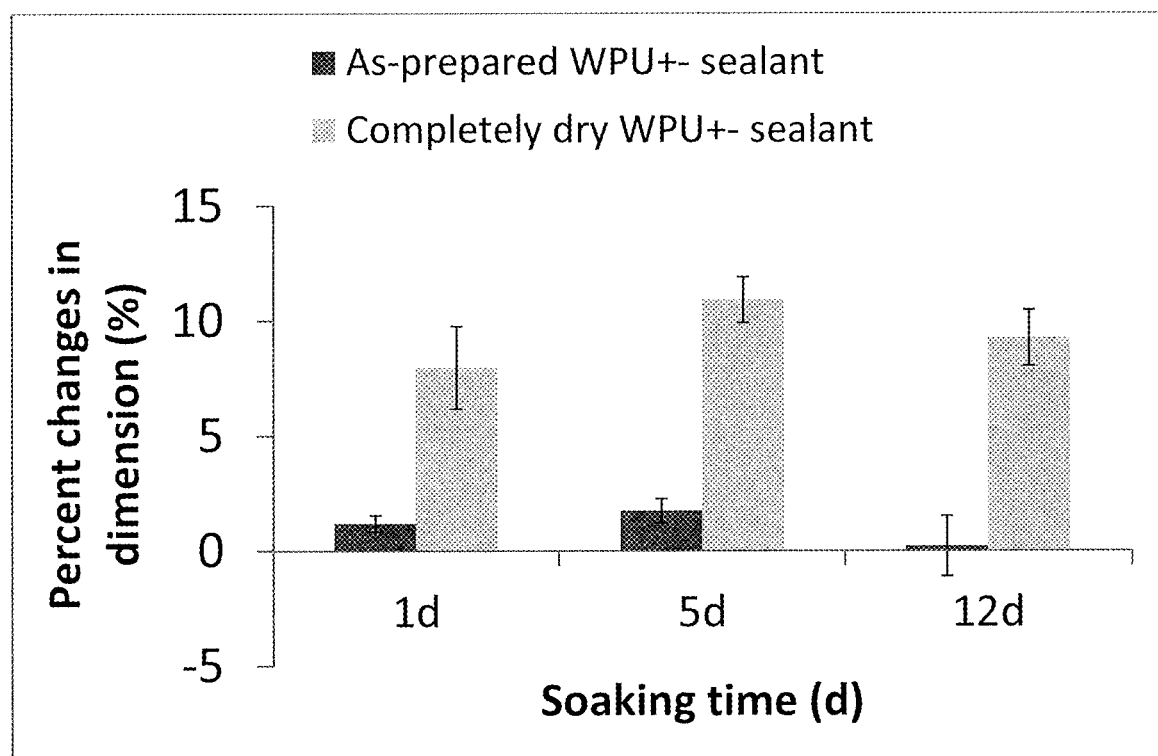
FIG. 23 shows dimensional changes of as-prepared and completely dry WPU+/− dispersion sealants over 12 days.

In contrast, WPU$^{+/-}$ dispersions described herein show minimal water uptake (weight percentage changes) and dimensional changes of 5.3% and 1.7% for the as-prepared sealants and 36% and 10.9% for completely dry sealant film of the investigated WPU$^{+/-}$ dispersion sealants, respectively, which is illustrated that FIG. 23. As shown in FIG. 23, the WPU$^{+/-}$ dispersion sealants are distinguished from conventional PEG-based adhesives or sealants due to minimal swelling and the sustained burst strength in water. Such physical properties can make the WPU$^{+/-}$ dispersion sealants ideal for many surgical applications.

Example 19

In Vitro Cytotoxicity of WPU+ and WPU− Polymer Dispersions

WPU+ and WPU− polymer dispersions ("WPU$^{+/-}$ dispersion"), with a solid content of 40 wt % and 39.47 wt % respectively, were synthesized according the processes described in Example 2 and 3 respectively. In Vitro cytotoxicity was conducted using the indirect contact method described in ISO 10993-12.

An eluent extracted from article specimens at different time points were co-cultured with cell layer in the culturing well. Mouse fibroblasts L-929 cells cultured with the elution show normal proliferation among groups with larger than 70% cell viability compared to control group. The test article is considered non-cytotoxic if the percentage of viable cell is equal to or greater than 70% of the untreated control according to ISO 10993. Notably, the group of WPU sealant cured overnight shows higher cell viability compared to the other groups, owing to less uncured particles being extracted from the WPU$^{+/-}$ dispersion sealant. The longer curing time induces higher cell viability.

The invention claimed is:

1. An adhesive composition comprising:
   an aqueous solvent;
   a population of positively charged first nanoparticles dispersed in the aqueous solvent, the first nanoparticles having an average size; and
   a population of negatively charged second nanoparticles dispersed in the aqueous solvent, the second nanoparticles having an average size;
   wherein the average size of the first nanoparticles is in the range of 1 nm to 1000 nm; and
   wherein a difference between the average size of the first nanoparticles and the average size of the second nanoparticles is at least 30 nm.

2. The adhesive composition of claim 1, wherein the average size of the first nanoparticles is larger than the average size of the second nanoparticles.

3. The adhesive composition of claim 1, wherein the average size of the first nanoparticles is smaller than the average size of the second nanoparticles.

4. The composition of claim 1, wherein:
   the average size of one of the first nanoparticles and the second nanoparticles is 70 nm to 1000 nm; and
   the average size of the other of the first nanoparticles and second nanoparticles is 70 to 1000 nm.

5. The adhesive composition of claim 1, wherein the first nanoparticles comprise a waterborne polyurethane, a polyester dispersion, or a polyacrylate emulsion.

6. The adhesive composition of claim 1, wherein the second nanoparticles comprise a waterborne polyurethane, a polyester dispersion, or a polyacrylate emulsion.

7. The adhesive composition of claim 1, wherein the first nanoparticles comprise a waterborne polyurethane functionalized with a poly-acid and/or a polyol with ionizable functional groups.

8. The adhesive composition of claim 7, wherein the poly-acid and/or polyol comprise one or more of chitosan, poly(L-lysine), ε-polylysine, polyethylenimine, and polyallylamine.

9. The adhesive composition of claim 1, wherein the second nanoparticles comprise a waterborne polyurethane functionalized with a poly-acid and/or a polyol with ionizable functional groups.

10. The adhesive composition of claim 9, wherein the poly-acid and/or polyol comprise one or more of an ionized citrate-based polymer, carboxymethyl cellulose, carboxymethyl chitosan, carboxymethyl starch, sodium alginate, chondroitin sulfate, and succinyl gelatin.

11. The adhesive composition of claim 1, wherein the first nanoparticles and second nanoparticles intercalates into porous or rough surfaces to form a subsurface mechanical interlocking structure, and aggregates on smooth surfaces to form a surface mechanical interlocking structure.

12. The adhesive composition of claim 11, wherein the mechanical interlocking structure is formed without covalent cross-linking between the first nanoparticles and the second nanoparticles.

13. The adhesive composition of claim 1, wherein a solids content of the composition is up to 70% by weight solids, based on the total weight of the composition.

14. The adhesive composition of claim 1, wherein the population of first nanoparticles has an average zeta potential of 10 mV to 65 mV, and the population of second nanoparticles has an average zeta potential of −10 mV to −65 mV.

15. The adhesive composition of claim 1, further comprising one or more of:
   a structuring agent, a gelling agent, a filler, an emulsifier, a solid or liquid fatty agent, a colorant, a pigment, a photoprotective agent, a secondary film-former, an emollient, a moisturizer, a fiber, a preservative, a chelator, a fragrance, a neutralizing agent, or any combination thereof.

16. A method of adhering materials, the method comprising:
- disposing the composition of claim 1 on a first surface of a first material and a second surface of a second material.

17. The method of claim 16, wherein the step of disposing the composition comprises:
- simultaneously disposing a mixture of the first nanoparticle and the second nanoparticle dispersion; or
- sequentially disposing a first dispersion of the first nanoparticles or second nanoparticles, and a second dispersion of the other of the first nanoparticles or second nanoparticles.

18. The method of claim 16, wherein the step of disposing the composition comprises disposing a first portion of the composition to the first surface and a second portion of the composition to the second surface and contacting the first and second surfaces with one another.

19. The method of claim 16, wherein the first material is a first biological tissue and the second material is a second biological tissue, the first biological tissue and the second biological tissue being the same type or different types of biological tissue.

20. The method of claim 16, wherein the first nanoparticles and second nanoparticles intercalates into porous or rough surface features of the first surface and/or second surface to form a subsurface mechanical interlocking structure, and aggregates on smooth surface features of the first surface and/or second surface to form a surface mechanical interlocking structure.

* * * * *